(12) United States Patent
Sugaya et al.

(10) Patent No.: US 12,479,083 B2
(45) Date of Patent: Nov. 25, 2025

(54) INFORMATION PROCESSING APPARATUS, INFORMATION PROCESSING METHOD, ROBOT SYSTEM, MANUFACTURING METHOD FOR ARTICLE USING ROBOT SYSTEM, PROGRAM, AND RECORDING MEDIUM

(71) Applicant: CANON KABUSHIKI KAISHA, Tokyo (JP)

(72) Inventors: Satoshi Sugaya, Kanagawa (JP); Hironobu Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 18/470,974

(22) Filed: Sep. 20, 2023

(65) Prior Publication Data

US 2024/0100688 A1   Mar. 28, 2024

(30) Foreign Application Priority Data

Sep. 27, 2022   (JP) .................... 2022-153926

(51) Int. Cl.
  B25J 9/00   (2006.01)
  B25J 9/16   (2006.01)
  G06T 19/00   (2011.01)

(52) U.S. Cl.
  CPC .............. B25J 9/0081 (2013.01); B25J 9/163 (2013.01); B25J 9/1671 (2013.01); G06T 19/006 (2013.01)

(58) Field of Classification Search
  CPC ........ B25J 9/0081; B25J 9/163; B25J 9/1671; B25J 9/1664; B25J 9/1605; G06T 19/006; G06T 19/00; G05B 19/42; G05B 2219/39438; G05B 2219/40099; G06F 30/12; G06F 30/20
  See application file for complete search history.

(56) References Cited

U.S. PATENT DOCUMENTS

| | | | |
|---|---|---|---|
| 11,027,428 B2 | 6/2021 | Nishitani | |
| 2014/0236565 A1* | 8/2014 | Kuwahara | B25J 9/1671 703/22 |
| 2016/0332297 A1* | 11/2016 | Sugaya | B25J 9/1671 |
| 2020/0290204 A1 | 9/2020 | Hirabayashi | |
| 2021/0154845 A1 | 5/2021 | Kokubun | |

FOREIGN PATENT DOCUMENTS

| | | |
|---|---|---|
| EP | 3136350 A1 | 3/2017 |
| EP | 3363604 A2 | 8/2018 |
| EP | 3093108 B1 | 6/2022 |
| JP | 2003114605 A | 4/2003 |
| JP | 2009289156 A | 12/2009 |
| JP | 2014161921 A | 9/2014 |
| JP | 2021008033 A | 1/2021 |

* cited by examiner

Primary Examiner — Bao Long T Nguyen
(74) Attorney, Agent, or Firm — Canon U.S.A., Inc. IP Division

(57) ABSTRACT

An information processing apparatus that executes a simulation by using a virtual model. The information processing apparatus includes a processing unit. The processing unit is configured to display the virtual model and an operating portion on a display unit, the operating portion being used by a user to operate the virtual model, and change setting information on the operating portion in response to input of the user.

31 Claims, 35 Drawing Sheets

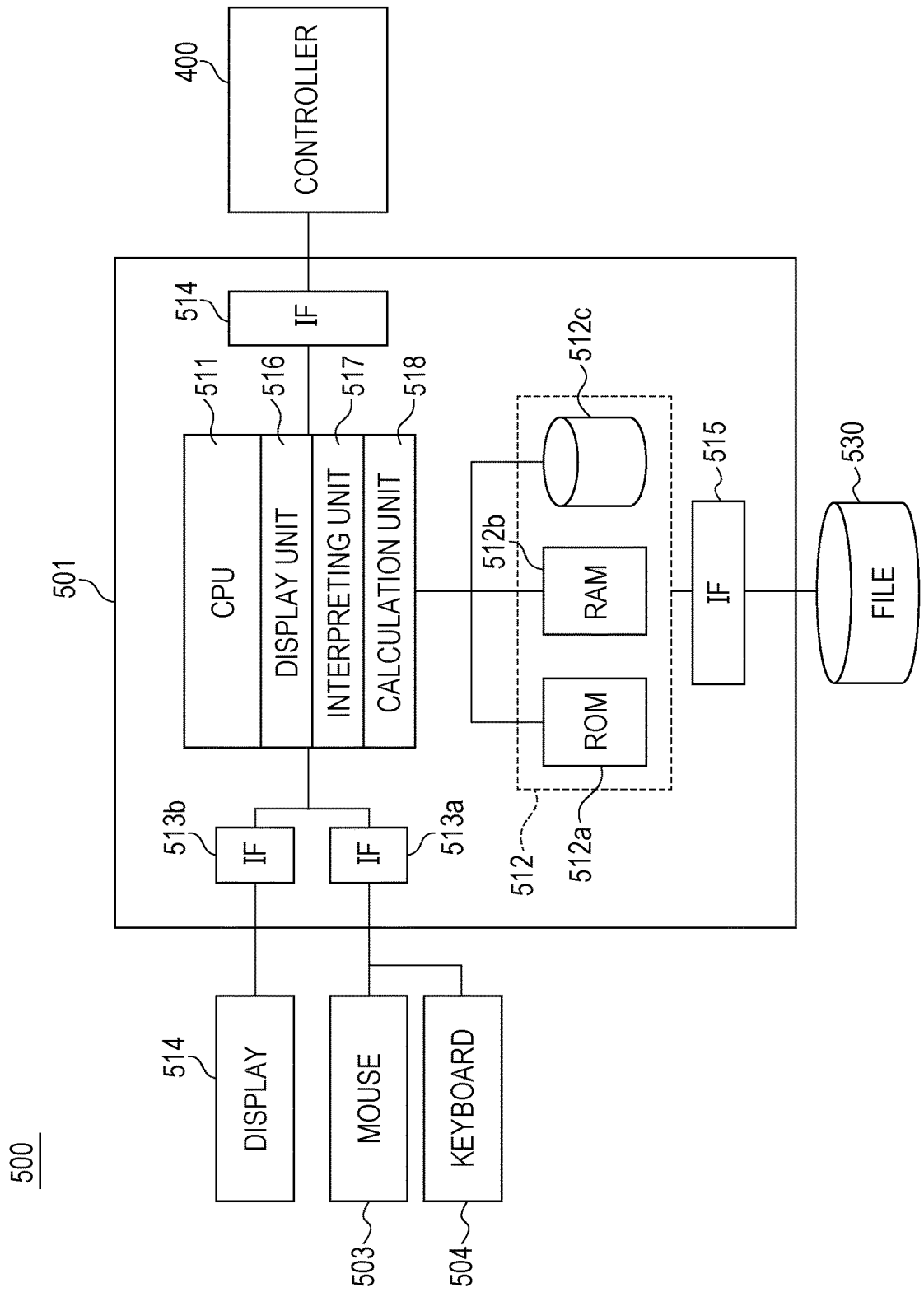

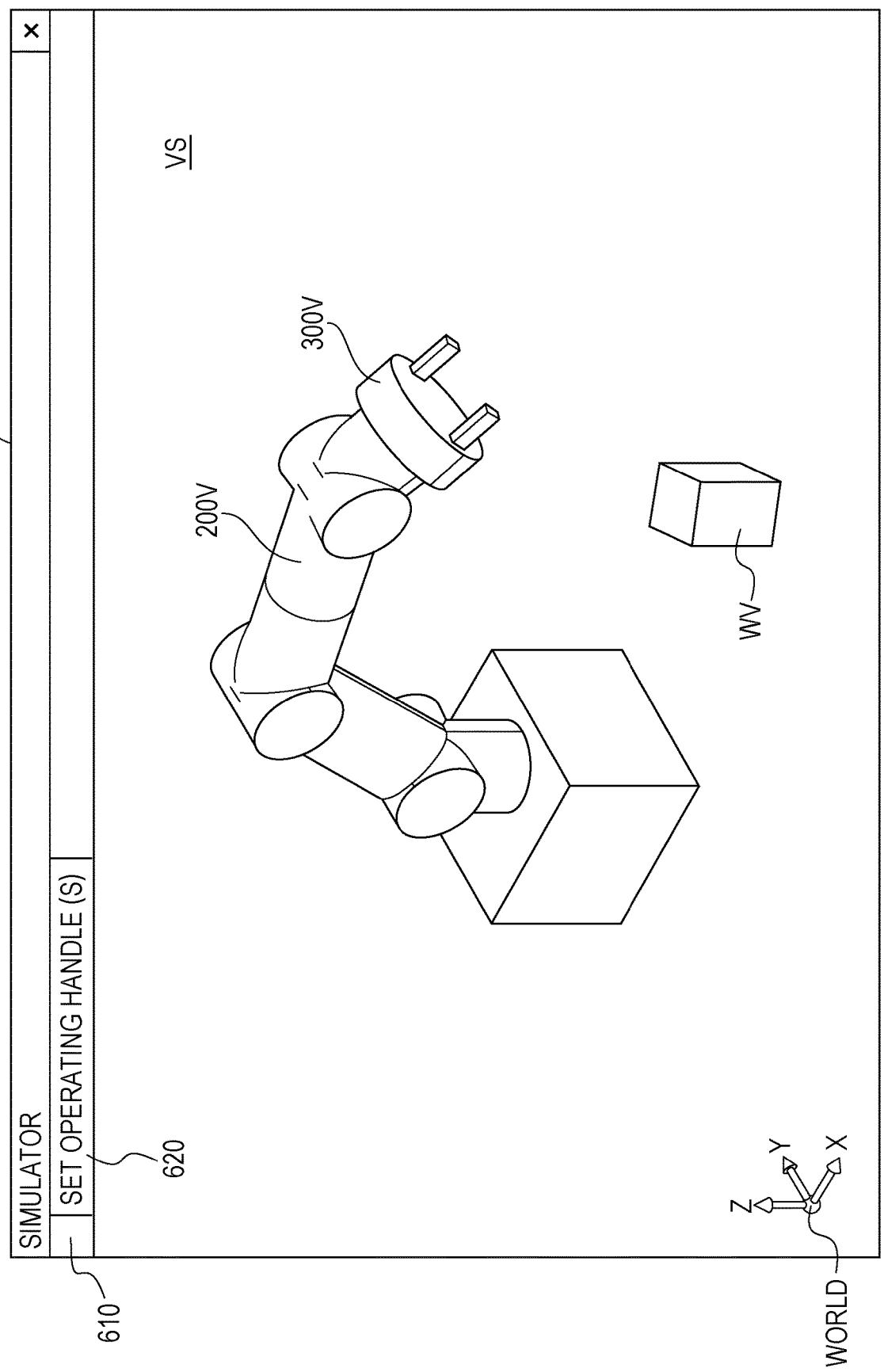

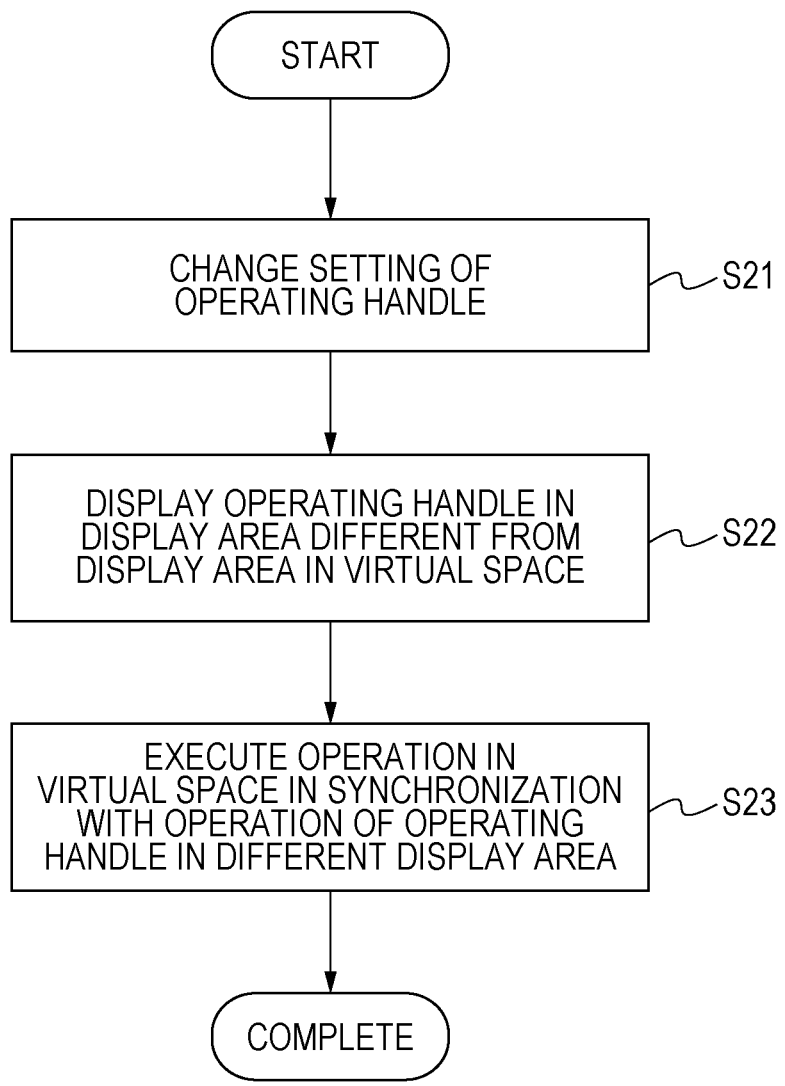

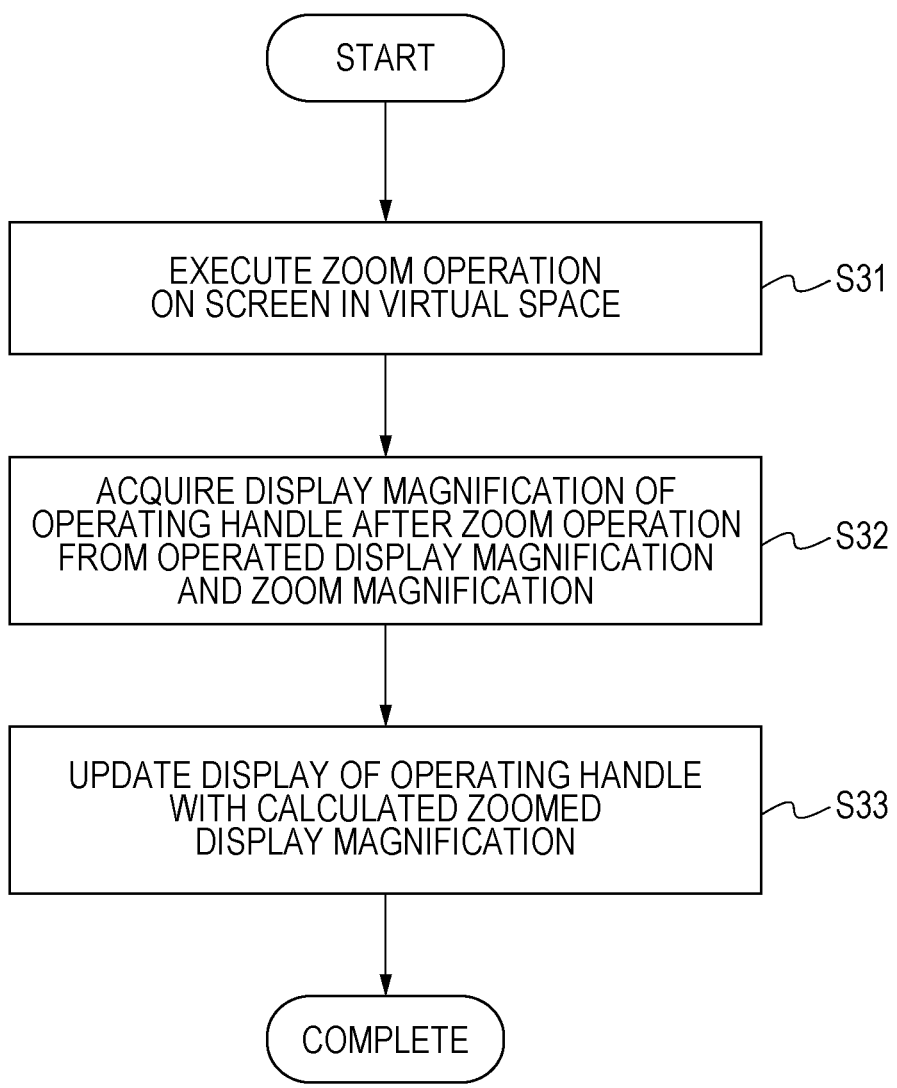

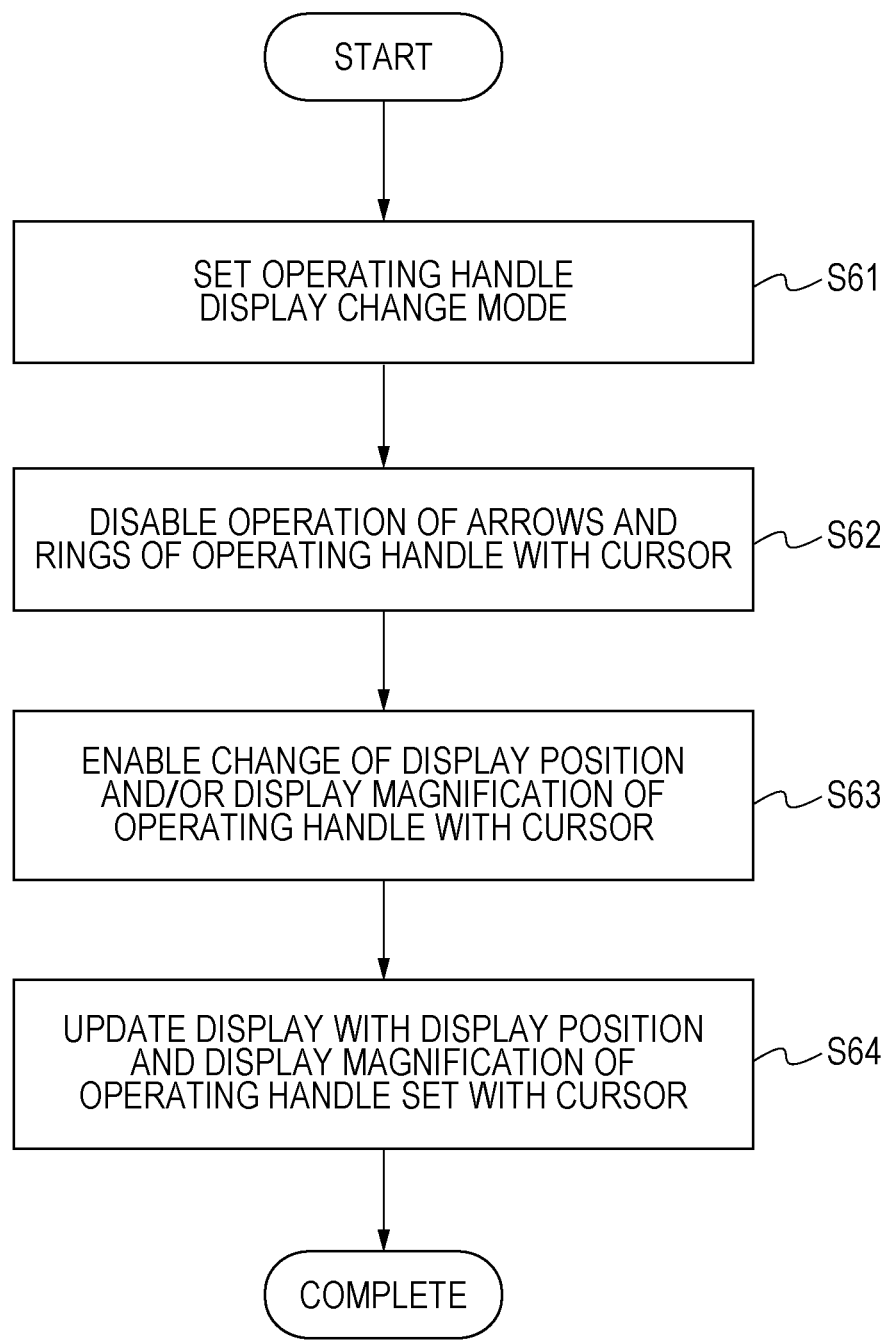

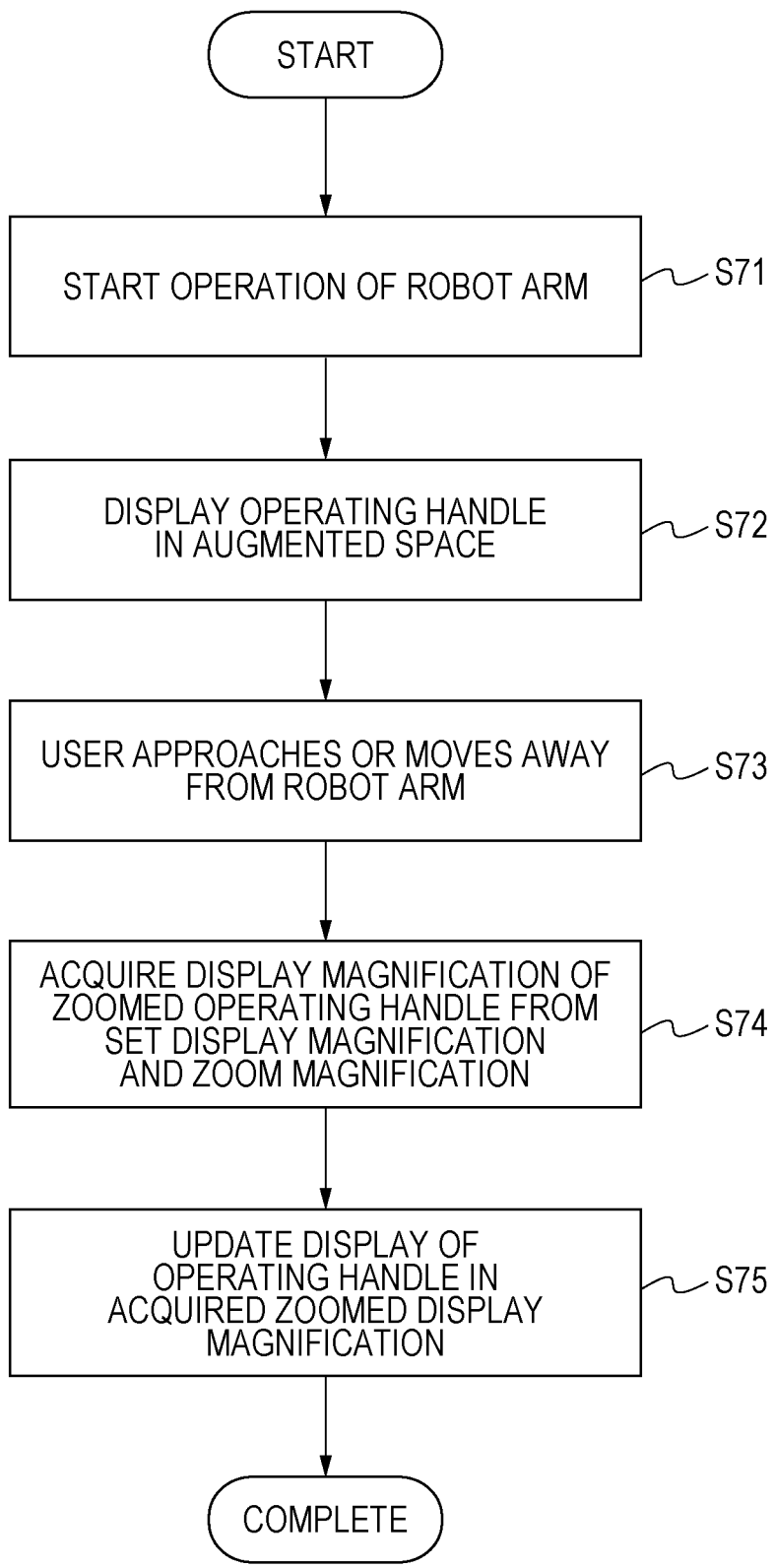

INFORMATION PROCESSING APPARATUS, INFORMATION PROCESSING METHOD, ROBOT SYSTEM, MANUFACTURING METHOD FOR ARTICLE USING ROBOT SYSTEM, PROGRAM, AND RECORDING MEDIUM

BACKGROUND

Field of the Disclosure

The present disclosure relates to information processing.

Description of the Related Art

Hitherto, in setting work (also referred to as teaching work) for the operation of a robot, a robot simulator capable of checking the operation of a robot beforehand without using the real machine of the robot is used. Examples of the setting work include work to set a tool center point (hereinafter, TCP) that is a representative point of an end effector part of the robot and create a teaching point that is coordinates of a move destination of the TCP and then create a program for causing the robot to operate by using the TCP and the teaching point. In such a robot simulator, models of a robot and surrounding environments are arranged in a virtual space, and simulations are performed by, for example, moving the model (TCP) of the robot and the models of the surrounding environments to teach the operation of the robot. There is a function that is an operating handle (operating portion) as a device for a user to move the model of the robot and the models of the surrounding environments. Japanese Patent Laid-Open No. 2014-161921 describes a function of displaying operating handles respectively at axes of the robot and a position of the TCP.

SUMMARY

According to embodiments of the present disclosure, an information processing apparatus executes a simulation by using a virtual model. The information processing apparatus includes a processing unit. The processing unit is configured to display the virtual model and an operating portion on a display unit, the operating portion being used by a user to operate the virtual model, and change setting information on the operating portion in response to input of the user.

Further features of the present disclosure will become apparent from the following description of embodiments with reference to the attached drawings.

BRIEF DESCRIPTION OF THE DRAWINGS

FIG. 4 is a control block diagram of the information processing apparatus according to the first embodiment.
FIG. 5 is a diagram showing an example of a simulation screen according to the first embodiment.
FIG. 13 is a control flowchart according to a third embodiment.
FIG. 16 is a control flowchart according to a fourth embodiment.
FIG. 25 is a control flowchart according to a seventh embodiment.
FIG. 34 is a control flowchart according to the ninth embodiment.

DESCRIPTION OF THE EMBODIMENTS

Figure 1:
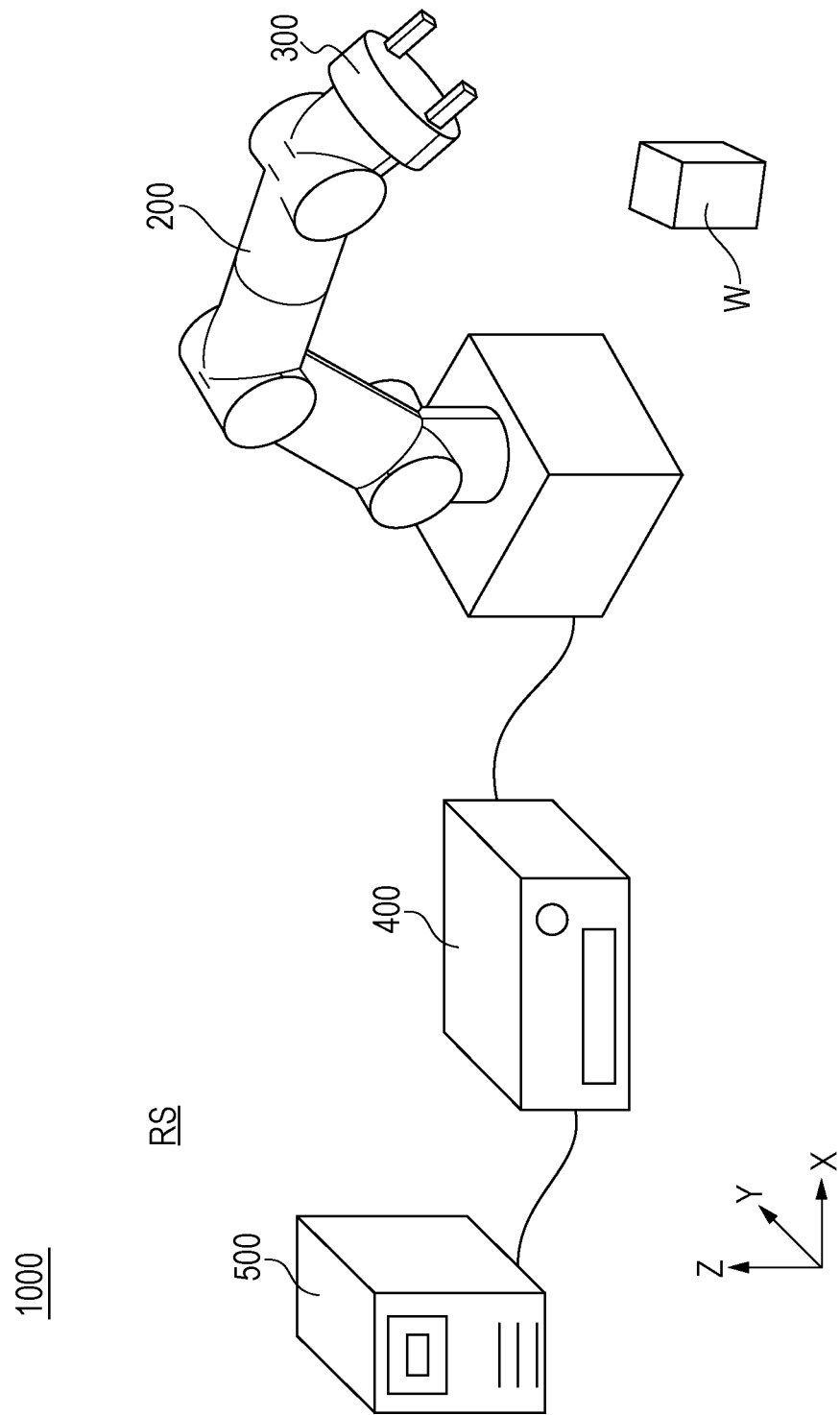
FIG. 1 is a diagram illustrating a robot system according to a first embodiment.

In Japanese Patent Laid-Open No. 2014-161921, there is an inconvenience that, depending on the display state of the operating handle, for example, the models of the surrounding environments overlap the display position of the operating portion, the models of the surrounding environments make it difficult to visually check or access the operating handle and, as a result, make it difficult to operate the operating portion.

Hereinafter, embodiments of the present disclosure will be described with reference to the attached drawings. The embodiments described below are only illustrative, and, for example, the configuration of detailed parts may be modified as needed by persons skilled in the art without departing from the purport of the present disclosure. Numeric values described in the present embodiments are reference numeric values and do not limit the present disclosure. In the following drawings, the arrows X, Y, Z in the drawings represent the overall coordinate system of a robot system. Generally, an XYZ three-dimensional coordinate system represents a world coordinate system of an overall installation environment. Other than that, for the sake of convenience of control, a local coordinate system may be used as needed for a robot hand, a finger, a joint, or the like. In the present embodiments, the world coordinate system that is the overall coordinate system is represented by XYZ, and the local coordinate system is represented by xyz.

First Embodiment

FIG. 1 is a diagram illustrating the schematic configuration of a robot system 1000 according to the present embodiment.

FIG. 1 schematically shows the robot system 1000 in a real space RS. The robot system 1000 includes a robot arm body 200, a robot hand body 300, a controller 400, and an information processing apparatus 500. In the present embodiment, the controller 400 and the information processing apparatus 500 are respectively made up of different computers. Alternatively, the controller 400 and the information processing apparatus 500 may be made up of one computer.

The robot arm body 200 is a vertical articulated robot arm that includes a base, a plurality of links, a driving source for driving the plurality of links, and a transmission mechanism that, for example, reduces speed when power is supplied from the driving source to operate the links. The robot hand body 300 is supported by the robot arm body 200. The robot hand body 300 is attached to a predetermined area of the robot arm body 200, for example, a distal end part of the robot arm body 200.

The robot hand body 300 can be positioned at a selected position in an XYZ space by the robot arm body 200.

The robot hand body 300 includes fingers capable of holding a workpiece W, a driving source for operating the fingers, and a transmission mechanism that, for example, reduces speed when power is supplied from the driving source to operate the fingers. For example, the workpiece W that is an object to be conveyed is placed around the robot hand body 300, and it is possible to perform an operation to hold the workpiece W and, for example, assemble the workpiece W to another workpiece by the robot arm body 200 and the robot hand body 300. In the present embodiment, the robot arm body 200 may be referred to as a robot or the robot arm body 200 and the robot hand body 300 may be collectively referred to as a robot.

The robot arm body 200 and the robot hand body 300 communicably connected to the controller 400 by wiring lines. The controller 400 and the information processing apparatus 500 are communicably connected to each other by wiring lines. In the present embodiment, the controller 400 and the information processing apparatus 500 are connected by wired communication. Alternatively, the controller 400 and the information processing apparatus 500 may be connected by wireless communication.

The information processing apparatus 500 virtually executes and displays the operations of the robot arm body 200 and the robot hand body 300 at the time when a workpiece W is held by off-line teaching, that is, computer simulation. The controller 400 acquires information on a holding position from the information processing apparatus 500 and generates trajectory data of the robot arm body 200 from the holding position to a position that is a destination of conveyance of the workpiece W. The controller 400 controls the robot arm body 200 and the robot hand body 300 in accordance with the generated trajectory data to perform an operation to convey the workpiece W. In the present embodiment, the robot arm body 200 and the robot hand body 300 perform an operation to convey the workpiece W held and assemble the workpiece W to another workpiece. Thus, it is possible to manufacture industrial products or articles. Calculation of trajectory data may be performed by the information processing apparatus 500.

When the robot arm body 200 and the robot hand body 300 convey a workpiece W, the robot arm body 200 and the robot hand body 300 need to be taught so as not to contact objects therearound. Teaching the robot is setting teaching points for obtaining the trajectory data of the robot arm body 200 and/or the robot hand body 300.

Figure 2:
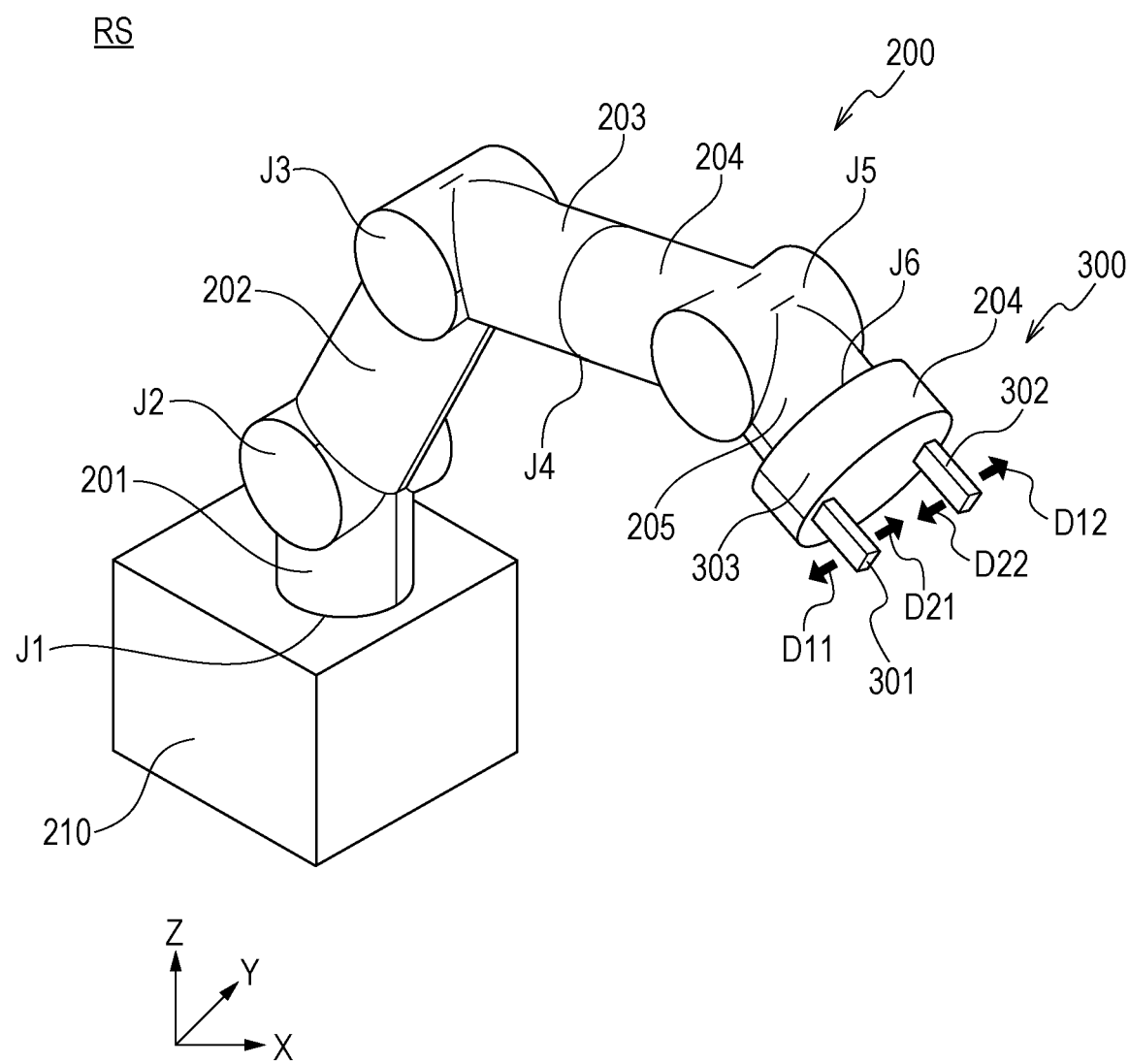
FIG. 2 is a diagram illustrating a robot arm body according to the first embodiment.

FIG. 2 is a diagram for illustrating the configurations of the robot arm body 200 and the robot hand body 300 according to the present embodiment. The robot arm body 200 includes a base 210 and a plurality of links 201, 202, 203, 204, 205 coupled by a plurality of rotationally driven joints J1, J2, J3, J4, J5, J6. The link 201 is coupled to the base 210.

Each of the joints of the robot arm body 200 includes a motor serving as a driving source that drives a corresponding one of the joints, a reduction gear, and an encoder serving as a position detector that detects the rotational angle of the motor. The installation position and output method of the encoder do not matter. The robot hand body 300 is attached to the link 205 that is the distal end part of the robot arm body 200. The robot hand body 300 is capable of rotating with the joint J6. When the joints J1 to J6 of the robot arm body 200 are driven, the robot arm body 200 can be set to various postures.

The robot hand body 300 includes a palm 303 and a plurality of fingers, for example, two fingers 301, 302, supported by the palm 303 so as to be openable and closeable. The two fingers 301, 302 are disposed so as to face each other. The robot hand body 300 has a force control function that operates the fingers 301, 302 with a constant force. The palm 303 of the robot hand body 300 supports the fingers 301, 302 and includes a drive unit (not shown) that linearly operates the pair of fingers 301, 302. The drive unit includes a motor, a conversion mechanism that converts the rotational motion of the motor to linear motion, and the like. When the drive unit is operated, the fingers 301, 302 can be linearly moved in opening directions D11, D12 and closing directions D21, D22, indicated by the arrows in FIG. 2. The drive unit is capable of causing the fingers 301, 302 to generate holding force to hold a workpiece W by generating driving force. The drive unit just needs to cause the fingers 301, 302 to generate holding force so that the workpiece W is not displaced relative to the robot arm body 200.

The number of fingers is two in the present embodiment; however, the number of fingers may be changed as needed by persons skilled in the art. In the present embodiment, the robot hand body 300 operates the fingers by motor drive. Alternatively, the robot hand body 300 may be a pneumatically-driven air gripper or may be configured to hold by absorption or adsorption. The end effector may be not in the form of robot hand but a tool that performs cutting, grinding, or the like of a workpiece. Also, the end effector may be a driver tool that performs screw fastening or the like.

Figure 3:
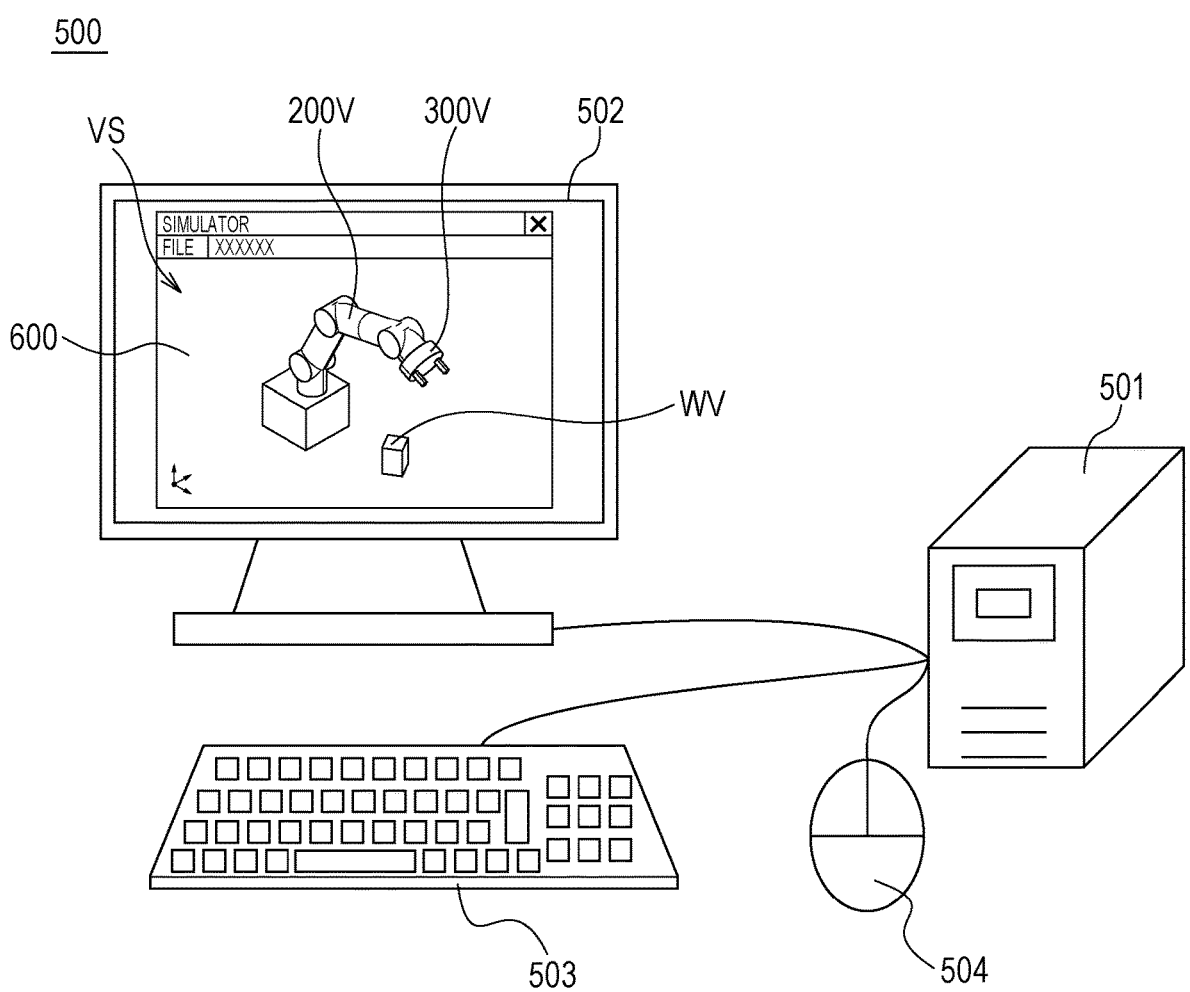
FIG. 3 is a diagram illustrating an information processing apparatus according to the first embodiment.

FIG. 3 is a diagram illustrating the information processing apparatus 500 according to the present embodiment. The information processing apparatus 500 includes an apparatus main body 501, a display 502 that is an example of a display apparatus connected to the apparatus main body 501, and a keyboard 503 and a mouse 504 that are examples of an input device connected to the apparatus main body 501. The apparatus main body 501 uses an operating system (OS) in a general personal computer (PC).

The display 502 displays a simulation screen 600 when the apparatus main body 501 executes application software for implementing a simulation method that is a teaching method. A virtual space VS constructed by the apparatus main body 501 is displayed on the simulation screen 600. A virtual robot arm body 200V, a virtual robot hand body 300V, a virtual workpiece WV, and the like are disposed in the virtual space VS. These are displayed on the display 502 as 2D images or 3D images. Operation to input, edit, or change various pieces of information of the simulator is configured to be performed by the input device, that is, the keyboard 503, the mouse 504, and the like.

The simulation screen 600 displayed on the display 502 is a screen for the user to edit teaching and program and check operations and interference of the robot system 1000. The display 502 may be configured such that a so-called touch panel is laminated on the surface of the display 502. In this case, an input operation equivalent to that of the input device, that is, the keyboard 503, the mouse 504, and the like can be performed by the touch panel. In some cases, the input device may be omitted.

The simulation screen 600 of FIG. 2 is configured to include at least a virtual space screen. The virtual space screen can be configured as a graphical user interface (GUI). In this case, objects that make up the simulation screen 600 (such as menus, input fields for numeric values and text, and virtual representation of the robot) can be configured to be operated by a pointing device such as the mouse 504 (or the above-described touch panel).

Hereinafter, for example, a case where the information processing apparatus 500 is a desktop PC that is a general purpose computer will be described; however, the configuration is not limited thereto. The information processing apparatus 500 may be, for example, a general purpose computer, such as a laptop PC, a tablet PC, and a smartphone, or may be a teaching pendant, or may be a simulator-dedicated computer. Also, the information processing apparatus 500 may be assembled to the controller 400. In other words, the controller 400 may have the functions of the simulator.

The virtual robot arm body 200V is a robot model corresponding to the robot arm body 200. The virtual robot hand body 300V is a robot model corresponding to the robot hand body 300. The virtual workpiece WV is a workpiece model corresponding to the workpiece W. Three-dimensional data of each model is, for example, entered in advance in the apparatus main body 501 as CAD data.

When a worker inputs data to the apparatus main body 501 by operating the keyboard 503 and the mouse 504, the worker is able to cause the apparatus main body 501 to simulate the operations of the robot arm body 200 and the robot hand body 300 in the virtual space VS.

In the present embodiment, the operations of the robot arm body 200 and the robot hand body 300 on the workpiece W are taught by off-line teaching. Determining the operations of the robot arm body 200 and the robot hand body 300 is determining the amounts of rotation of the joints J1 to J6 and the amounts of movement of the fingers 301, 302. However, if the robot hand body 300 itself has a joint and is capable of changing the positions of the fingers 301, 302 in a rotation direction, the amount of rotation of the joint of the robot hand body 300 is also determined. When the fingers 301, 302 in an open state of the robot hand body 300 are moved in a closing direction to be brought into contact with the workpiece W and holding force is applied by the fingers 301, 302, the workpiece W can be held.

Here, a holding position is a relative position of the robot hand body 300 to the workpiece W at the time when the workpiece W is held by the robot arm body 200 and the robot hand body 300. A holding posture corresponds to the posture of the robot arm body 200 at the time when the workpiece W is held by the robot hand body 300 in a state where the workpiece W is positioned with respect to the robot arm body 200. Thus, in a state where the workpiece W is positioned with respect to the robot arm body 200, the robot hand body 300 can hold the workpiece W at a predetermined position by setting the robot arm body 200 to a predetermined posture.

FIG. 4 is a control block diagram showing a control system of the information processing apparatus 500. As shown in FIG. 4, the apparatus main body 501 of the information processing apparatus 500 includes a central processing unit (CPU) 511 as hardware. The apparatus main body 501 further includes a storage device 512 made up of a read only memory (ROM) 512a, a random access memory (RAM) 512b, a hard disk drive (HDD) 512c, and the like.

The apparatus main body 501 further includes an interface 513a for communicating and connecting with the input device, that is, the keyboard 503, the mouse 504, and the like and an interface 513b for communicating and connecting with the display 502. The apparatus main body 501 includes an interface 514 for communication processing with the controller 400. The apparatus main body 501 includes an interface 515 for transmitting and receiving data in form of, for example, a file 530 to and from the controller 400 or an external apparatus, such as another simulator apparatus and the robot. These interfaces each are made up of, for example, a serial bus, a parallel bus, a network interface, or the like.

The ROM 512a is a non-transitory storage device. A basic program that is read by the CPU 511 at start-up of the computer is stored in the ROM 512a. The RAM 512b is a temporary storage device used in arithmetic operation processing of the CPU 511. The HDD 512c is a non-transitory storage device that stores various data, such as arithmetic operation processing results of the CPU 511.

In the present embodiment, a program that functions as application software is stored in the HDD 512c. The CPU 511 functions as an information processing unit capable of simulating the behaviors of a virtual robot, a virtual hand, and a virtual workpiece in a virtual space (described later) by running the program.

In the present embodiment, a non-transitory computer-readable storage medium is the HDD 512c, and a program that functions as application software is recorded on the HDD 512c; however, the configuration is not limited thereto. The program may be recorded on any recording medium as long as the recording medium is a non-transitory computer-readable recording medium. Examples of the recording medium for supplying the program to a computer include a flexible disk, an optical disk, a magneto-optical disc, a magnetic tape, and a nonvolatile memory. A solid state drive (SSD) may be used instead of the HDD.

The CPU 511 controls the overall system of the information processing apparatus 500. Operation processing units of the CPU 511 include a display unit 516, an interpreting unit 517, and a calculation unit 518. The display unit 516 updates display of the simulation screen 600 based on information saved in the storage device 512 and transmits a display command to a display apparatus such as the display 502. The interpreting unit 517 controls operation to the simulation screen 600 with the input device, such as a mouse and a keyboard. The interpreting unit 517 interprets the details of operation input, makes a request of the calculation unit 518 to perform necessary calculation, and makes a request of the display unit 516 to update display based on the calculated result. The calculation unit 518 executes calculation processing related to drawing of models in the virtual space VS (described later) in accordance with the details of operation interpreted by the interpreting unit 517. The calculated result is saved in the storage device 512.

The storage device 512 stores display information of the models and the operating handle that are components displayed on the simulation screen 600. The information stored in the storage device 512 is output in response to a request from the CPU 511 or updated in response to a request from the CPU 511. In response to a request from an external apparatus or a specific operation on the keyboard 503 or the mouse 504, the CPU 511 is capable of transmitting the information saved in the storage device 512 from the interface 515 in form of the file 530. The CPU 511 is capable of reading the file 530 from the outside source via the interface 515 as needed.

For example, at start-up or restoration (recovery) processing of the information processing apparatus 500, the CPU 511 reads the file 530 output in the past from an external apparatus (an external storage device, such as an SSD and a network attached storage (NAS)). Then, the CPU 511 can reproduce a previous storage state by updating the storage device 512. In the present embodiment, a storage area of the storage device 512, storing the components, is selectable. For example, a predetermined area on the RAM 512b or a storage area (corresponding to, for example, a predetermined file) of the HDD 512c may be used. The configuration described above is an example of the overall configuration of the information processing apparatus 500.

FIG. 5 is an example of the simulation screen 600 according to the present embodiment. The virtual space VS and a menu bar 610 are displayed on the simulation screen 600. Virtual objects (virtual models) in the virtual space VS are defined by three-dimensional model data, for example, CAD data, and are visualized and drawn as structures for the sake of convenience. An operating handle setting button 620 (virtual button) for displaying a screen for setting display of the operating handle (described later) is displayed in the menu bar 610.

Virtual objects defined in the virtual space VS shown in FIG. 5 will be described. Virtual objects are defined by three-dimensional model data simulating the robot arm body 200, the robot hand body 300, and the workpiece W shown in FIG. 1 in the virtual space VS. An absolute coordinate system World of the virtual space VS is shown. In the virtual space VS, the virtual workpiece WV that is three-dimensional model data simulating the workpiece W is defined around the virtual robot arm body 200V. The CPU 511 performs teaching on an operation to hold the virtual workpiece WV with the virtual robot arm body 200V and the virtual robot hand body 300V. The virtual space VS shown in FIG. 5 is displayed with a still image or a moving image on the simulation screen 600 of the display 502 shown in FIG. 2.

Figure 6A:
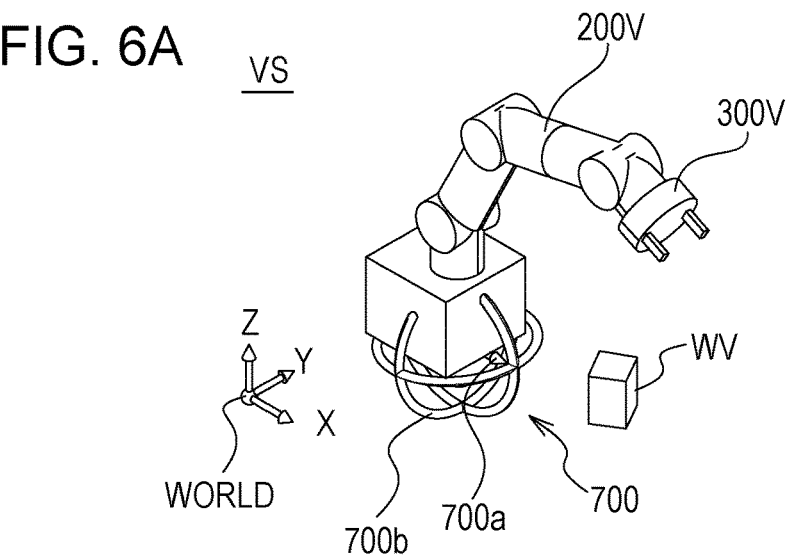
FIGS. 6A to 6C are diagrams on a problem in display of an operating handle.
Figure 6B:
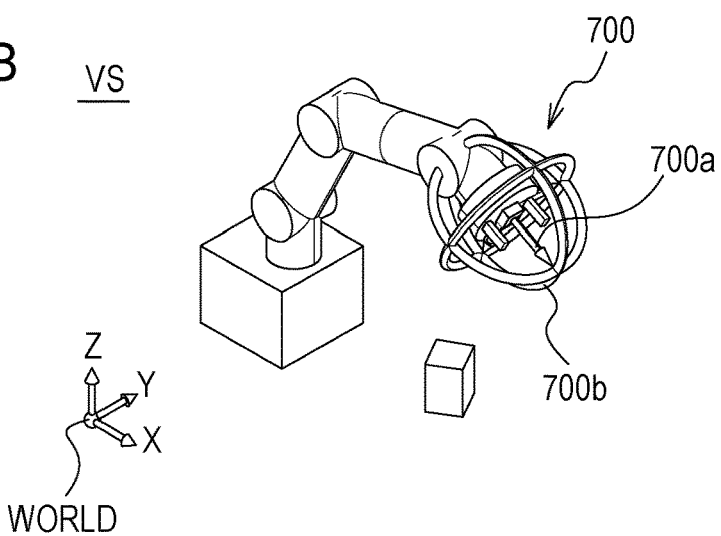
Figure 6C:
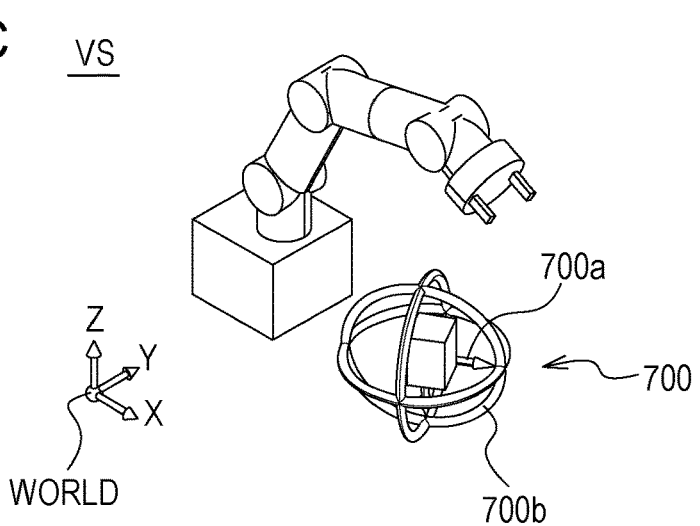

FIGS. 6A to 6C show the operating handle 700 displayed in the virtual space VS according to the present embodiment.

FIG. 6A shows the operating handle 700 displayed in a case where the layout of the virtual robot arm body 200V that is a target to be operated is changed. FIG. 6B shows the operating handle 700 in a case where a tool center point (TCP) of the virtual robot arm body 200V that is a target to be operated is selected and teaching is performed. FIG. 6C shows the operating handle 700 displayed in a case where the layout of the virtual workpiece WV that is a target to be operated is changed.

Here, the operating handle is a function of setting the layout of a virtual model and teaching the robot arm body 200V in the virtual space VS. The operating handle 700 in FIGS. 6A to 6C has arrows 700a extending in orthogonal three-axis directions and rings 700b each used to rotate the model around a corresponding one of the arrows 700a. When any one of the arrows 700a is dragged with the mouse 504, the target model can be translated following the operation. When any one of the rings 700b is dragged with the mouse 504, the target model can be rotated around a corresponding one of the arrows 700a following the operation. With these operations, the layout of the virtual model is changed, the posture of the virtual robot arm body 200V is changed by operating the tool center point (TCP) (not shown), and teaching is performed.

In the state of FIG. 6A, the directions of the operating handle 700 coincide with those of the absolute coordinate system World, and coincide with directions corresponding to the position of the origin of the virtual robot arm body 200V. When the operating handle 700 is operated in this state, the virtual robot arm body 200V and the virtual robot hand body 300V can be translated or rotated while the overall posture remains unchanged. In the state of FIG. 6B, the directions of the operating handle 700 coincide with the directions of the TCP. When the operating handle 700 is operated in this state, the virtual robot hand body 300V can be translated and rotated. Accordingly, the posture of the virtual robot arm body 200V changes to set the virtual robot hand body 300V in the operated position and posture. In the state of FIG. 6C, the directions of the operating handle 700 are inclined at 60° in a clockwise direction on the sheet around the Z direction from the absolute coordinate system World, and coincides with the directions corresponding to the position of the origin of the model of the workpiece WV.

When the operating handle 700 is operated in this state, the workpiece WV can be translated and rotated.

As shown in FIGS. 6A, 6B, and 6C, in the above display state of the operating handle 700, the operating handle 700 is buried in the virtual model in display, and it may be difficult to operate the operating handle 700. In the present embodiment, this is addressed by executing a process of changing setting information at the display position of the operating handle 700. Hereinafter, the process of displaying the operating handle 700 in the present embodiment will be described in detail. In this way, in the specification, setting information in display of the operating handle 700 may be referred to as a display condition.

Figure 7:
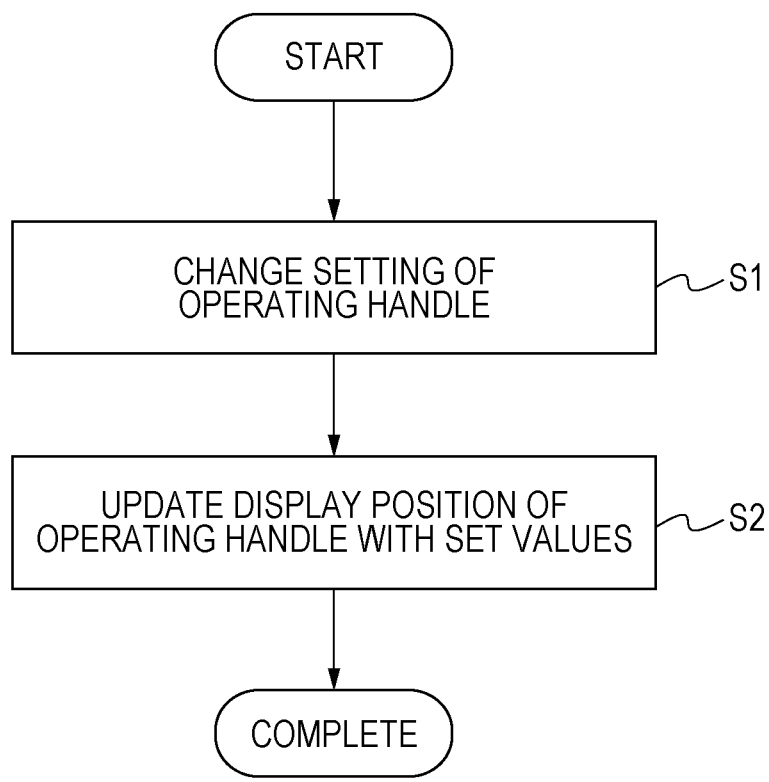
FIG. 7 is a control flowchart according to the first embodiment.
Figure 8A:
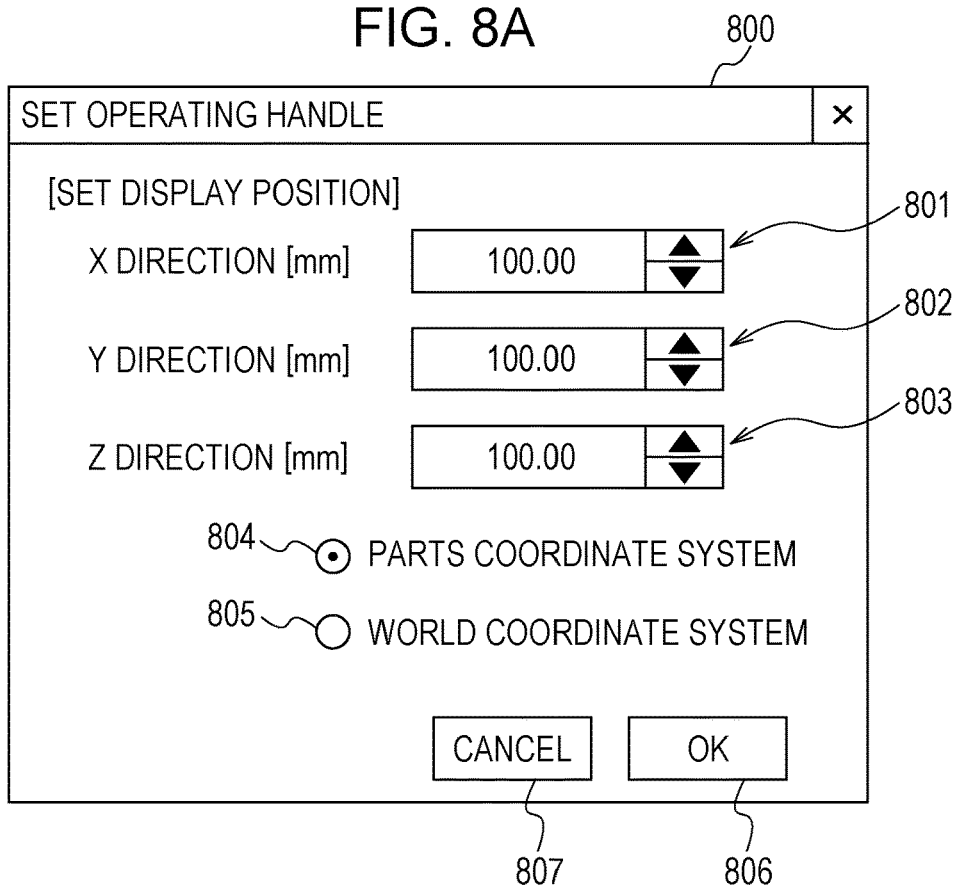
FIGS. 8A and 8B are diagrams showing an example of an operating handle setting screen according to the first embodiment.
Figure 8B:
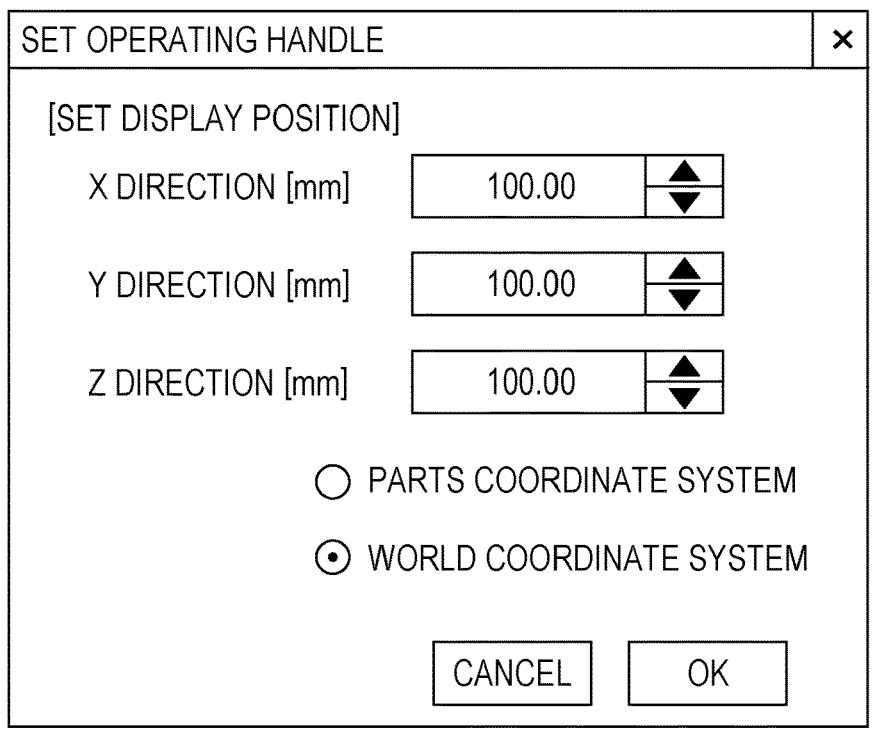

FIG. 7 shows a control flowchart related to display of the operating handle 700 according to the present embodiment. FIGS. 8A and 8B show an operating handle setting screen 800 according to the present embodiment. FIGS. 9A to 9F are diagrams illustrating display of the operating handle 700 of which the display position is changed according to the present embodiment. It is assumed that the control flow in the present embodiment is executed by the CPU 511 of the information processing apparatus 500. The control flowchart in FIG. 7 shows a control flow from the state where the operating handle 700 is displayed.

Initially, the setting of the operating handle 700 is changed in step S1. When the operating handle setting button 620 shown in FIG. 5 is pressed down by the user, the operating handle setting screen 800 shown in FIGS. 8A and 8B is displayed. Only the operating handle setting screen 800 is displayed in FIGS. 8A and 8B. The operating handle setting screen 800 may be displayed in a superimposed manner as a pop-up window (second screen) on the simulation screen 600 or may be displayed in a display area different from the simulation screen 600 in the display 502. FIG. 8A shows the operating handle setting screen 800 in a state where a parts coordinate system is selected. FIG. 8B shows the operating handle setting screen 800 in a state where a world coordinate system is selected.

In FIGS. 8A and 8B, display position setting (numeric value input) of the operating handle and coordinate system selection (radio buttons) that is a reference of position are displayed on the operating handle setting screen 800. These are displayed so that the display position of the operating handle 700 displayed in the virtual space VS is updated with a relative position from a reference position shown in FIGS. 6A to 6C with respect to the directions of the selected coordinate system. An OK button 806 and a cancel button 807 are displayed. When the OK button 806 is pressed down, display of the operating handle 700 is updated in accordance with the input details. When the cancel button 807 is pressed down, the input details are not kept, and the operating handle setting screen 800 is closed.

Position input boxes 801 to 803 for inputting positions in X, Y, and Z directions that are the directions of the coordinate system are provided in display position setting, and the position of the operating handle 700 is changed by inputting numeric values in the position input boxes 801 to 803. Inputting to the position input boxes 801 to 803 may be directly inputting numeric values displayed with the keyboard 503 and the mouse 504 or may be setting with up-down arrow buttons of the position input boxes 801 to 803 with the mouse 504.

Coordinate system selection is radio buttons, and any one of a parts coordinate system button 804 and a world coordinate system button 805 can be selected. When the parts coordinate system button 804 is selected as shown in FIG. 8A, the operating handle 700 is relatively moved in accordance with the input numeric values with respect to the position of the operating handle 700 currently displayed with reference to the XYZ directions (arrows 708a) in the operating handle 700 shown in FIGS. 6A to 6C. Then, the display position of the operating handle 700 is updated. In FIG. 8A, 100 mm is input to each of the position input boxes 801 to 803, and the parts coordinate system button 804 is selected in coordinate system selection.

When the world coordinate system button 805 is selected as in the case of FIG. 8B, the operating handle 700 is relatively moved based on the input numeric values with respect to the position of the operating handle 700 currently displayed with reference to the XYZ directions of the world coordinate system World shown in FIGS. 6A to 6C. Then, the display position of the operating handle 700 is updated. In FIG. 8B, 100 mm is input to each of the position input boxes 801 to 803, and the world coordinate system button 805 is selected in coordinate system selection.

Subsequently, in step S2, display of the operating handle 700 is updated in accordance with the values set in step S1. FIGS. 9A to 9F are diagrams illustrating display of the operating handle 700 of which the display position is changed according to the present embodiment.

Figure 9A:
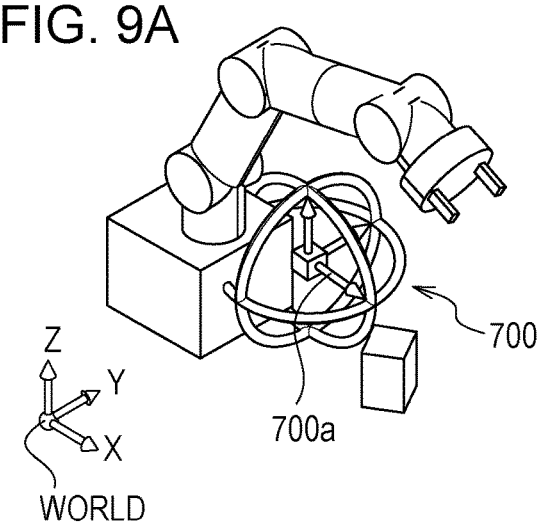
FIGS. 9A to 9F are diagrams related to display of the operating handle according to the first embodiment.
Figure 9B:
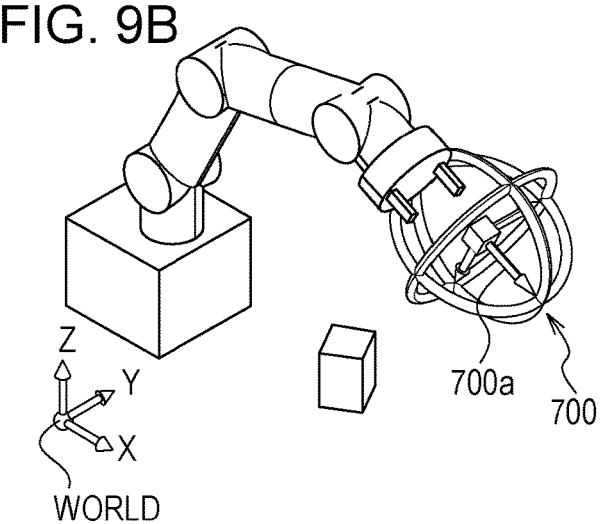
Figure 9C:
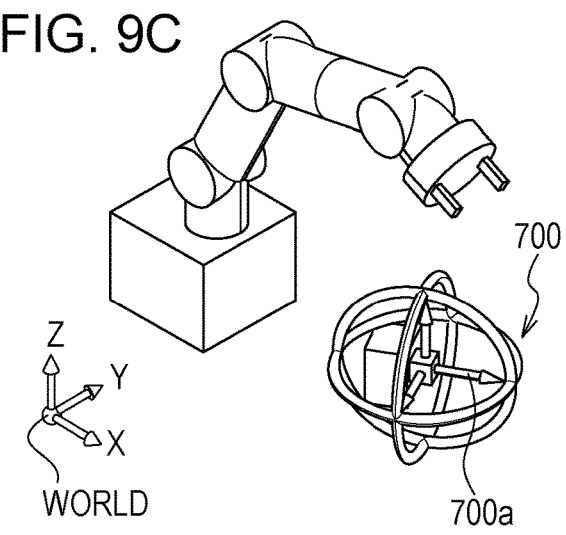

When the display position of the operating handle 700 is updated by selecting the parts coordinate system button 804 as shown in FIG. 8A, the display position of the operating handle 700 is updated as shown in FIGS. 9A to 9C. In FIGS. 9A to 9C, the display position of the operating handle 700 is relatively moved with reference to the XYZ directions (arrows 708a) of the operating handle 700 with respect to the display position of the operating handle 700 displayed in a state of each of FIGS. 6A to 6C. In FIG. 9A, the display position of the operating handle 700 is moved by 100 mm in the X direction, 100 mm in the Y direction, and 100 mm in the Z direction with reference to the XYZ directions (arrows 708a) of the operating handle 700 from the state of FIG. 6A. In FIG. 9B, the display position of the operating handle 700 is moved by 100 mm in the X direction, 100 mm in the Y direction, and 100 mm in the Z direction with reference to the XYZ directions (arrows 708a) of the operating handle 700 from the state of FIG. 6B. In FIG. 9C, the display position of the operating handle 700 is moved by 100 mm in the X direction, 100 mm in the Y direction, and 100 mm in the Z direction with reference to the XYZ directions (arrows 708a) of the operating handle 700 from the state of FIG. 6C.

Figure 9D:
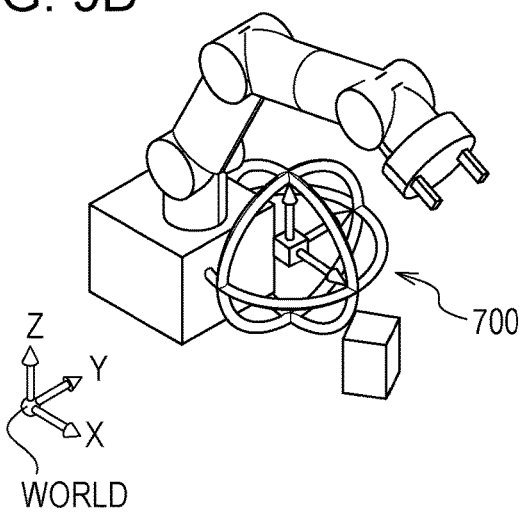
Figure 9E:
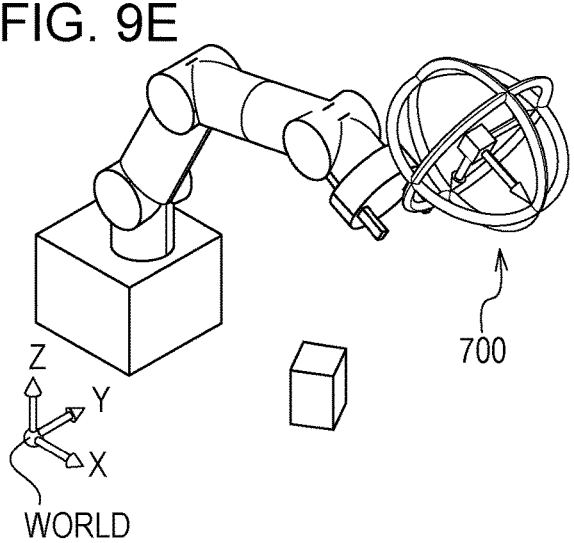
Figure 9F:
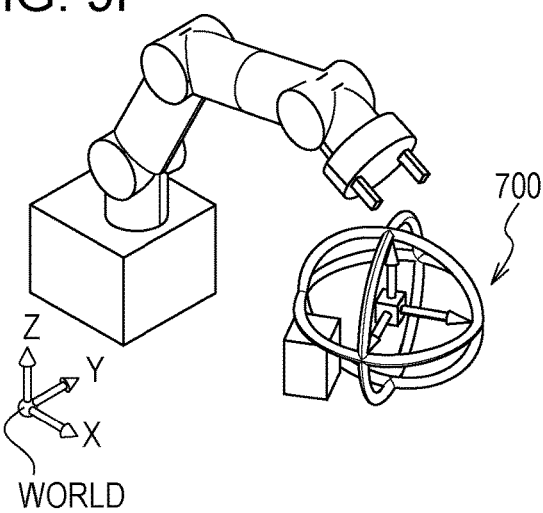

When the display position of the operating handle 700 is updated by selecting the world coordinate system button 805 as shown in FIG. 8B, the display position of the operating handle 700 is updated as shown in FIGS. 9D to 9F. In FIGS. 9D to 9F, the display position of the operating handle 700 is relatively moved with reference to the XYZ directions of the world coordinate system World with respect to the display position of the operating handle 700 displayed in a state of each of FIGS. 6A to 6C. In FIG. 9D, the display position of the operating handle 700 is moved by 100 mm in the X direction, 100 mm in the Y direction, and 100 mm in the Z direction with reference to the XYZ directions of the world coordinate system World from the state of FIG. 6A. In FIG. 9E, the display position of the operating handle 700 is moved by 100 mm in the X direction, 100 mm in the Y direction, and 100 mm in the Z direction with reference to the XYZ directions of the world coordinate system World from the state of FIG. 6B. In FIG. 9F, the display position of the operating handle 700 is moved by 100 mm in the X direction, 100 mm in the Y direction, and 100 mm in the Z direction with reference to the XYZ directions of the world coordinate system World from the state of FIG. 6C.

As described above, according to the present embodiment, as shown in FIGS. 6A to 6C, when the operating handle 700 overlaps the inside of the virtual model of the virtual space VS and is therefore difficult to be operated, the display position of the operating handle 700 can be moved (changed) as shown in FIGS. 9A to 9F. Thus, setting information related to display of the operating handle 700 can be set by the user, so it is possible to make it easy to operate the operating handle 700. When the display position of the operating handle 700 is selectively changed by the user, the operating handle 700 can be displayed at an optimal place for the user, so the operability of the operating handle 700 is improved. Particularly, in Japanese Patent Laid-Open No. 2014-161921, setting information on the operating handle itself is already determined by the simulator like, for example, a specific operating handle is displayed in color with respect to another operating handle or displayed in different size. However, when setting information on the operating handle 700 itself is allowed to be changed by the user as in the case of the present disclosure, the operability of the operating handle 700 is improved.

In the present embodiment, the operating handle setting screen 800 is displayed when the operating handle setting button 620 is pressed down; however, the configuration is not limited thereto. The operating handle setting screen 800 may be displayed from, for example, a shortcut key, such as an icon and a function key of the keyboard 503 or a virtual keyboard. The operating handle setting screen 800 may be constantly displayed. In the operating handle setting screen 800, a coordinate system other than the parts coordinate system or the world coordinate system may be configured to be selected. For example, a coordinate system selectively set by the user may be configured to be selected.

Second Embodiment

Next, a second embodiment of the present disclosure will be described in detail. When the size of the operating handle 700 is constant, operation of the operating handle 700 may be difficult depending on a situation. Therefore, in the present embodiment, a case where a display magnification is changed to change setting information in display of the operating handle 700 will be described.

Hereinafter, basic parts of the hardware configuration, the configuration of the display screen, and the like are the same as those of the above-described embodiment, and the detailed description is omitted. In the following embodiment, like reference signs are assigned to the same or substantially the same members, and the detailed description is omitted.

Figure 10:
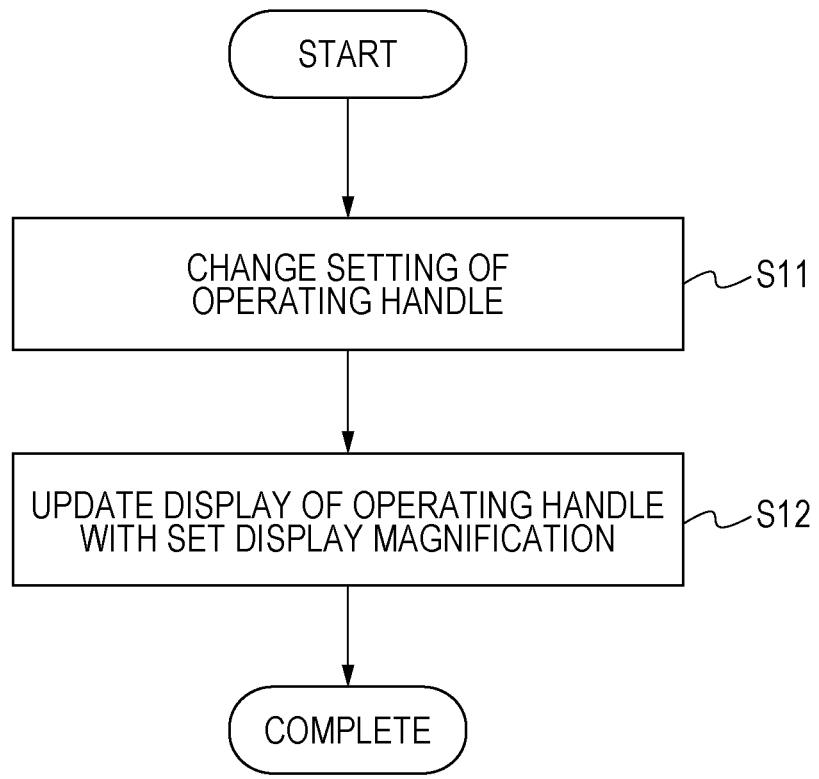
FIG. 10 is a control flowchart according to a second embodiment.
Figure 11:
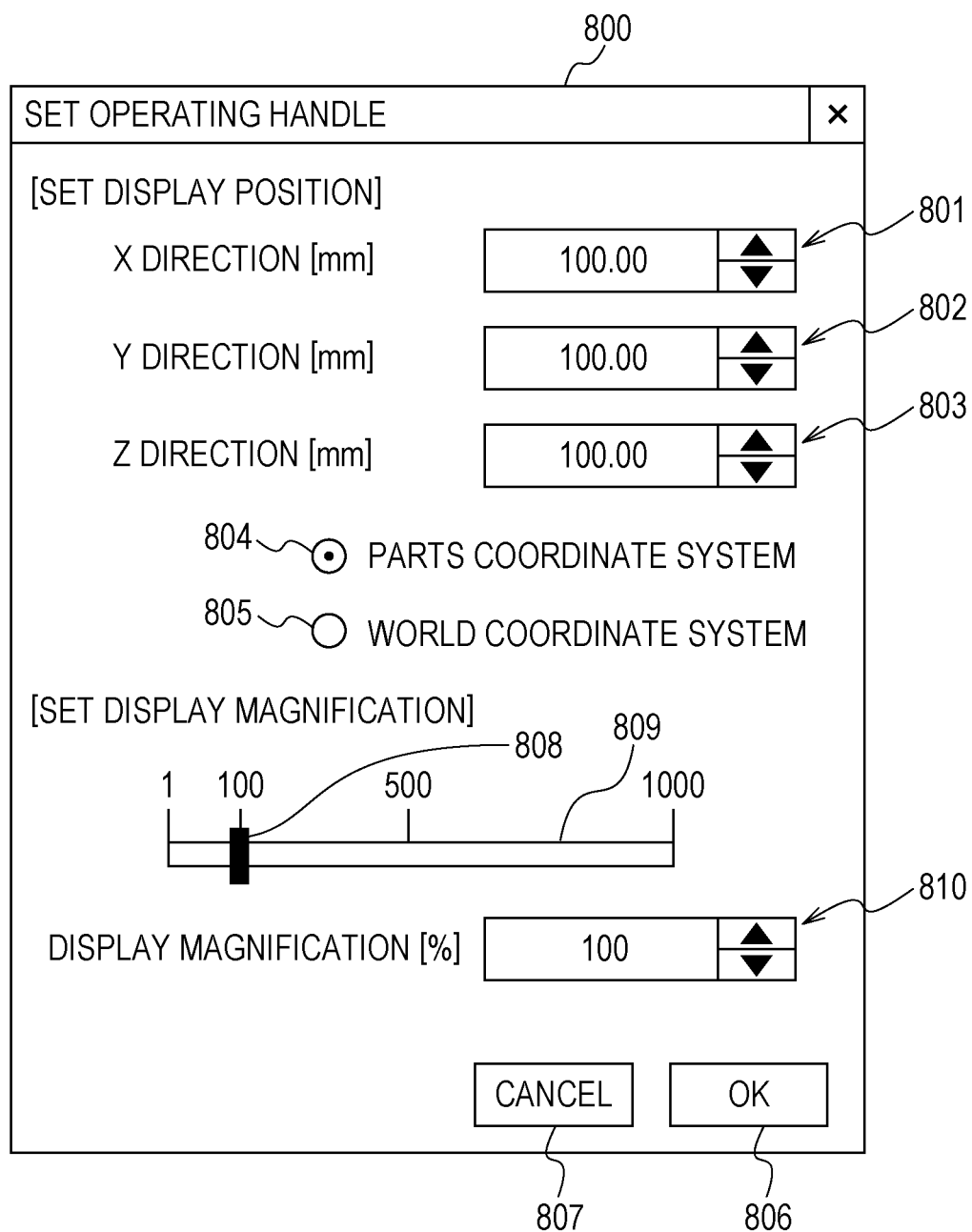
FIG. 11 is a diagram showing an example of the operating handle setting screen according to the second embodiment.
Figure 12A:
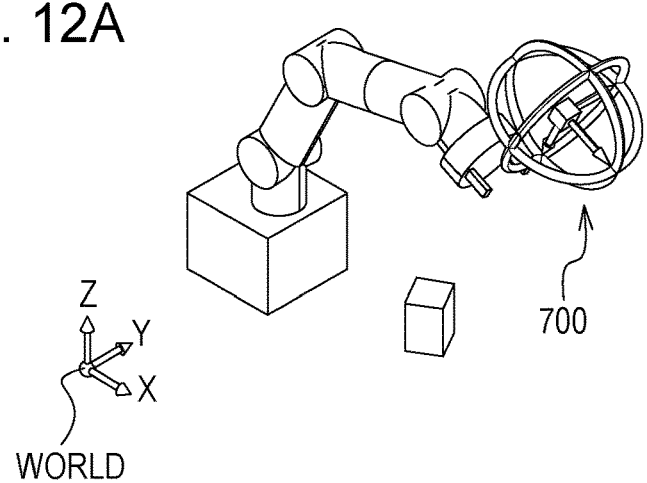
FIGS. 12A to 12C are diagrams related to display of the operating handle according to the second embodiment.
Figure 12B:
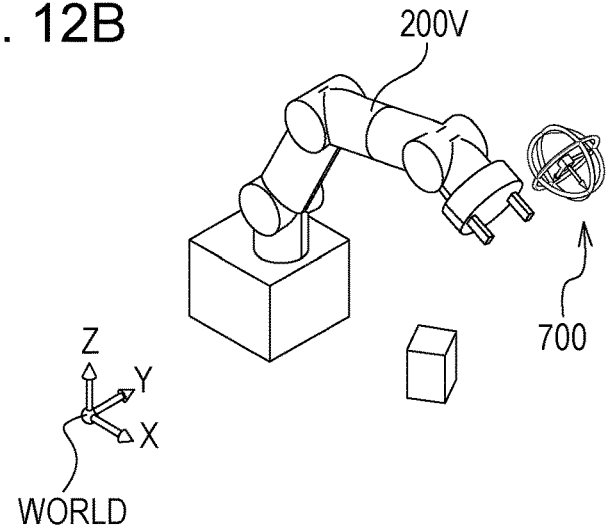
Figure 12C:
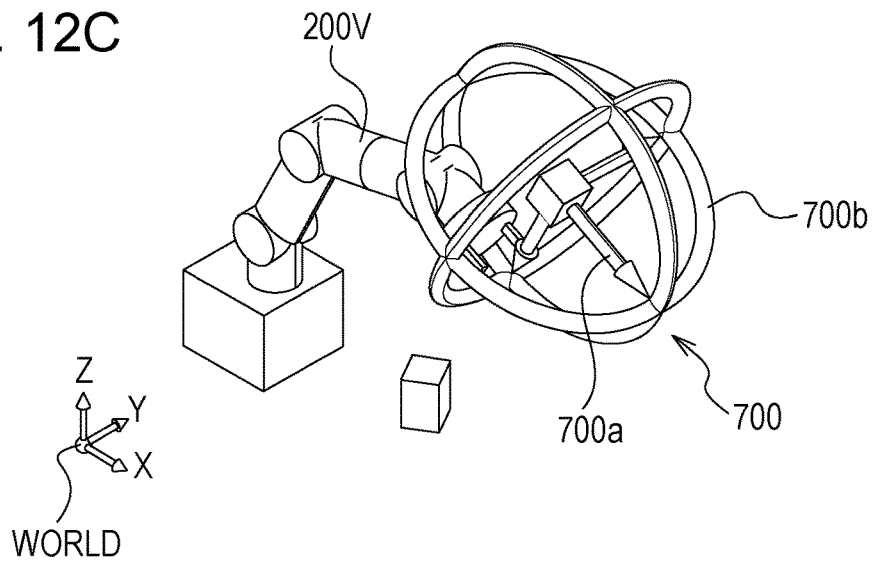

FIG. 10 shows a control flowchart related to display of the operating handle 700 according to the present embodiment. FIG. 11 shows the operating handle setting screen 800 according to the present embodiment. FIGS. 12A to 12C are diagrams illustrating display of the operating handle 700 of which the display magnification is changed according to the present embodiment.

Initially, the setting of the operating handle 700 is changed in step S11. When the operating handle setting button 620 is pressed down by the user, the operating handle setting screen 800 shown in FIG. 11 is displayed. Only the operating handle setting screen 800 is displayed in FIG. 11. The operating handle setting screen 800 may be displayed in a superimposed manner as a pop-up window on the simulation screen 600 or may be displayed in a display area different from the simulation screen 600 in the display 502.

In the operating handle setting screen 800 according to the present embodiment, in addition to the items described in the first embodiment, a slider 808, a bar 809, and a magnification input box 810 are displayed as setting of the display magnification of the operating handle 700. A magnification indicated by the slider 808 in the bar 809 is synchronized with the magnification of the magnification input box 810, and, when the magnification of one is changed, the magnification of the other is also changed. The display magnification of the operating handle 700 is changed by changing the numeric value of the slider 808 or the magnification input box 810. Inputting to the magnification input box 810 may be directly inputting a numeric value displayed with the keyboard 503 and the mouse 504 or may be setting with an up-down arrow button of the magnification input box 810 with the mouse 504.

In the bar 809, only a magnification change of 1[%] to 1000[%], that is, 1/100 times to 10 times, is performed; however, a numeric value lower than or equal to 1[%] or a numeric value higher than or equal to 1000[%] is allowed by inputting a selected numeric value to the magnification input box 810. When a magnification higher than or equal to the magnification indicated by the bar 809 is input to the magnification input box 810, the slider 808 is positioned at any one of the ends and does not move. When, for example, a magnification lower than or equal to 1[%] is input to the magnification input box 810, the slider 808 is positioned at the left-side end of the bar 809 on the sheet and does not move. When, for example, a magnification higher than or equal to 1000[%] is input to the magnification input box 810, the slider 808 is positioned at the right-side end of the bar 809 on the sheet and does not move. In inputting to the magnification input box 810, input of only the range of the magnification indicated by the bar 809 may be allowed. When, for example, a magnification lower than or equal to 1[%] is input to the magnification input box 810, "1" is displayed in the magnification input box 810. When, for example, a magnification higher than or equal to 1000[%] is input, "1000" is displayed in the magnification input box 810. For example, at the up-down arrow button, a numeric value lower than or equal to 1[%] or higher than or equal to 1000[%] is not displayed.

Subsequently, in step S12, display of the operating handle 700 is updated based on the values set in step S11. FIGS. 12A to 12C are diagrams illustrating display of the operating handle 700 of which the display magnification is changed according to the present embodiment.

FIG. 12A shows a state where the display magnification of the operating handle 700 is 100% from the state of FIG. 9E, that is, the state of FIG. 9E as it is. FIG. 12B is a case where the display magnification is set to 40[%] from the state of FIG. 9E and FIG. 12A and the display is updated. When FIG. 9E and FIG. 12A are compared with each other, the operating handle 700 does not overlap the virtual robot arm body 200V, so the visibility of the virtual robot arm body 200V is improved. FIG. 12C is a case where the display magnification is set to 300[%] from the state of FIG. 9E and FIG. 12A and the display is updated. When FIG. 9E and FIG. 12A are compared with each other, the operating handle 700 overlaps the virtual robot arm body 200V, but the sufficiently large arrows 700a and rings 700b in the operating handle 700 are displayed. Therefore, it is possible to allow the user to operate the operating handle 700 without any inconvenience.

As described above, according to the present embodiment, as shown in FIGS. 6A to 6C, when the operating handle 700 overlaps the inside of the virtual model of the virtual space VS and is therefore difficult to be operated, the display magnification of the operating handle 700 can be changed as shown in FIG. 12C. Thus, setting information related to display of the operating handle 700 can be set by the user, so it is possible to make it easy to operate the operating handle 700. When the display magnification of the operating handle 700 is selectively changed by the user, the operating handle 700 can be displayed at an optimal size for the user, so the operability of the operating handle 700 is improved. When the display position and the display magnification of the operating handle 700 are changed together, the operating handle 700 can be displayed so as not to overlap the virtual model as shown in FIG. 12B and to improve the visibility of the virtual model. When setting information on the operating handle 700 itself is allowed to be changed by the user, the operability of the operating handle 700 is improved.

In the present embodiment, the operating handle setting screen 800 is displayed when the operating handle setting button 620 is pressed down; however, the configuration is not limited thereto. The operating handle setting screen 800 may be displayed from, for example, a shortcut key, such as an icon and a function key of the keyboard 503. The operating handle setting screen 800 may be constantly displayed. In the operating handle setting screen 800, in the example of FIG. 11, the display position and display magnification of the operating handle 700 are changed on the same screen. Alternatively, the display position and display magnification of the operating handle 700 may be changed on different screens. The above-described various embodiments and modifications may be implemented in combination with the present embodiment and/or the present modification.

Third Embodiment

Next, a third embodiment of the present disclosure will be described in detail. Depending on work with the simulator, it is presumable that operation of the operating handle 700 is difficult in the virtual space VS. Therefore, in the present embodiment, a case where the operating handle 700 is displayed in an area different from an area in which the virtual space VS is displayed to change setting information in display of the operating handle 700 will be described.

Hereinafter, basic parts of the hardware configuration, the configuration of the display screen, and the like are the same as those of the above-described various embodiments, and the detailed description is omitted. In the following embodiment, like reference signs are assigned to the same or substantially the same members, and the detailed description is omitted.

Figure 14:
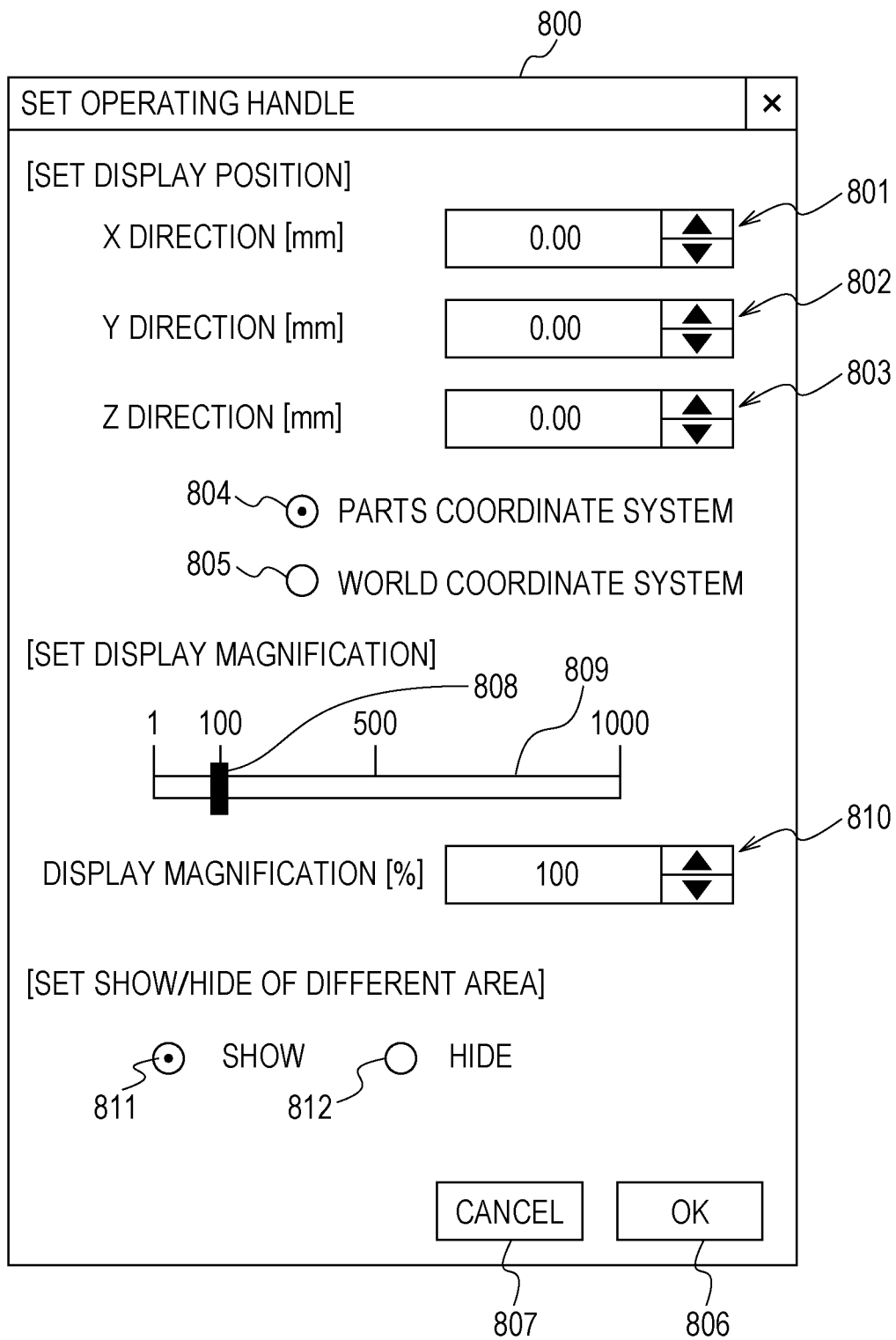
FIG. 14 is a diagram showing an example of the operating handle setting screen according to the third embodiment.
Figure 15:
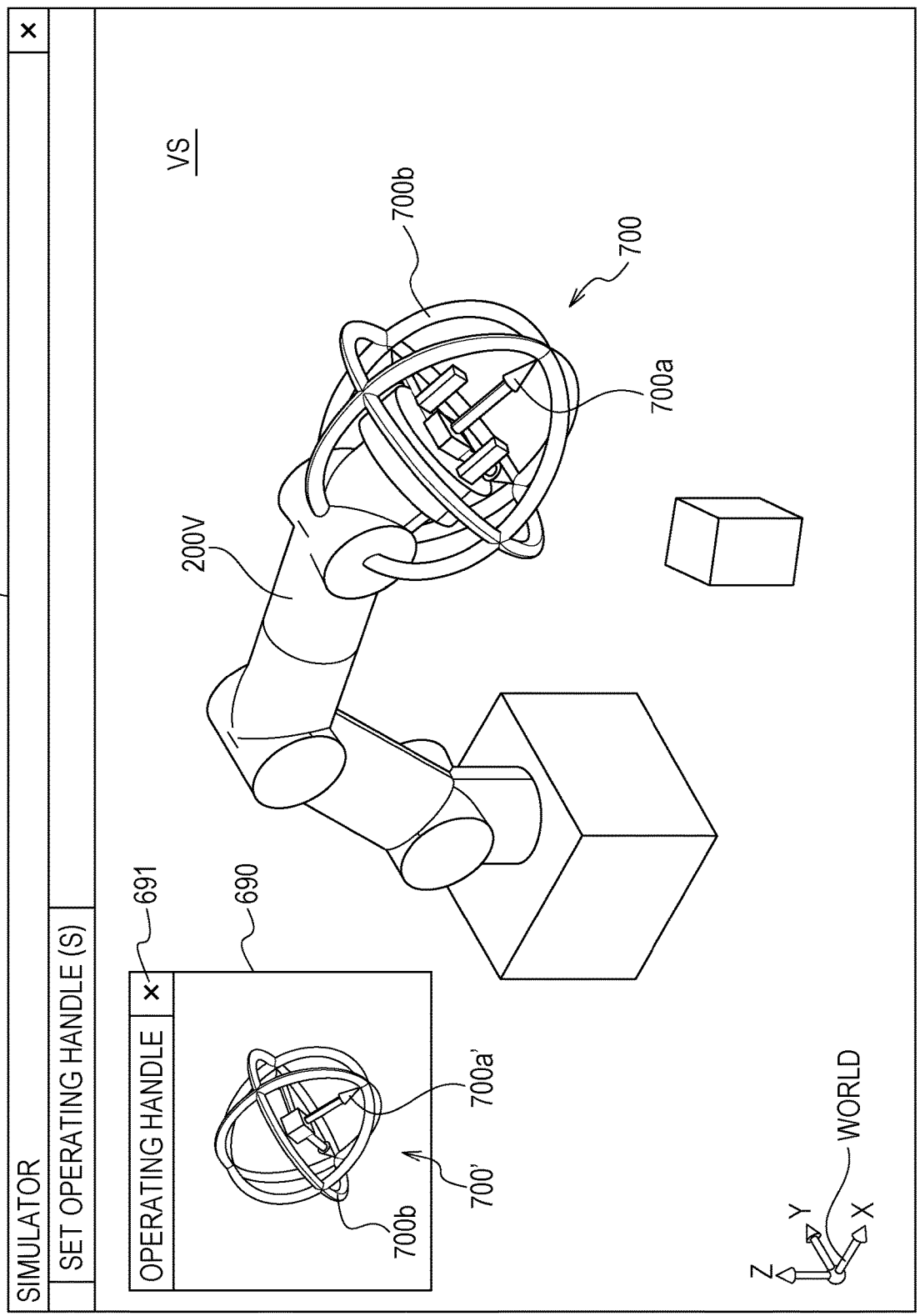
FIG. 15 is a diagram showing an example of the simulation screen according to the third embodiment.

FIG. 13 shows a control flowchart related to display of the operating handle 700 according to the present embodiment. FIG. 14 shows the operating handle setting screen 800 according to the present embodiment. FIG. 15 is a diagram illustrating display of the operating handle 700 of which the display area is changed according to the present embodiment.

Initially, the setting of the operating handle 700 is changed in step S21. When the operating handle setting button 620 is pressed down by the user, the operating handle setting screen 800 shown in FIG. 14 is displayed. Only the operating handle setting screen 800 is displayed in FIG. 14. The operating handle setting screen 800 may be displayed in a superimposed manner as a pop-up window on the simulation screen 600 or may be displayed in a display area different from the simulation screen 600 in the display 502.

FIG. 14 is a diagram illustrating the operating handle setting screen 800 according to the present embodiment. In addition to items described in the above-described various embodiments, radio buttons, that is, a show button 811 and a hide button 812, are displayed as different area display setting. In FIG. 14, the show button 811 is selected.

Subsequently, in step S22, display of the operating handle 700 is updated based on the values set in step S21. FIG. 15 is a diagram illustrating display of the operating handle 700 of which the display area is changed according to the present embodiment.

As shown in FIG. 15, when display update is performed in a state where the show button 811 is selected, an operating handle screen 690 is displayed in an area (screen) different from the area of the simulation screen 600 in which the virtual space VS is displayed. FIG. 15 is a state where, based on the setting values shown in FIG. 14, the display position and display magnification of the operating handle 700 are not changed and update is performed such that an operating handle 700' is displayed in another area (another screen) from the state of FIG. 6B. The operating handle 700' that interlocks with the operating handle 700 is displayed on the operating handle screen 690. A close button 691 is displayed at the upper right of the operating handle screen 690 on the sheet. When the close button 691 is pressed down, the operating handle screen 690 can be closed. In FIG. 15, the operating handle screen 690 is displayed so as to be superimposed on the simulation screen 600; however, the configuration is not limited thereto. For example, the operating handle screen 690 may be displayed in a display area different from the simulation screen 600 in the display 502.

Subsequently, in step S23, the operating handle 700' on the operating handle screen 690 is operated. When the arrows 700a' or the rings 700b' are operated by dragging with the mouse 504, the arrows 700a or the rings 700b displayed in the virtual space VS are operated in synchronization with operation of the arrows 700a' or the rings 700b', and the virtual robot arm body 200V is edited.

In the above-described present embodiment, an operating handle is displayed in an area (screen) different from the simulation screen 600. Thus, it is possible for the user to set setting information related to display of the operating handle 700, and, even when the operating handle overlaps the model in the virtual space, it is possible to perform operation with an operating handle in another area (another screen), so the operability is improved. When setting information on the operating handle 700 itself is allowed to be changed by the user, the operability of the operating handle 700 is improved. The above-described various embodiments and modifications may be implemented in combination with the present embodiment and/or the present modification.

Fourth Embodiment

Next, a fourth embodiment of the present disclosure will be described in detail. If the size of the operating handle 700 is updated in synchronization with zoom operation of the virtual space VS, the operating handle is reduced or enlarged in synchronization with zoom-out and zoom-in, so it may be difficult to operate the operating handle 700. Therefore, in the present embodiment, a mode in which the size of the operating handle 700 is maintained even when zoom operation of the virtual space VS is performed as setting information in display of the operating handle 700 will be described.

Hereinafter, basic parts of the hardware configuration, the configuration of the display screen, and the like are the same as those of the above-described various embodiments, and the detailed description is omitted. In the following embodiment, like reference signs are assigned to the same or substantially the same members, and the detailed description is omitted.

Figure 17A:
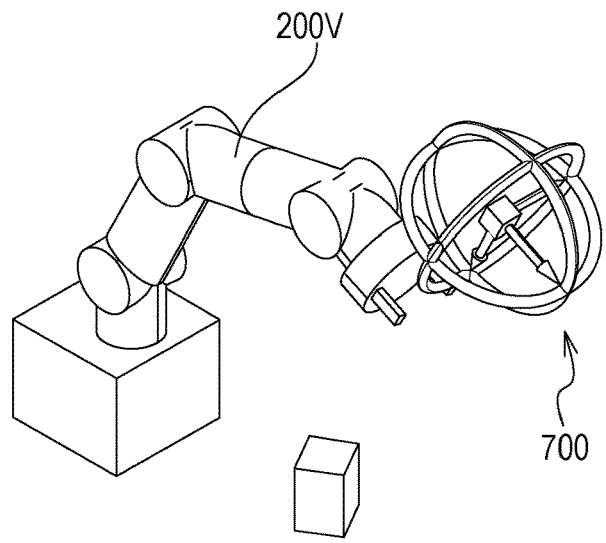
FIGS. 17A to 17C are diagrams related to display of the operating handle according to the fourth embodiment.
Figure 17B:
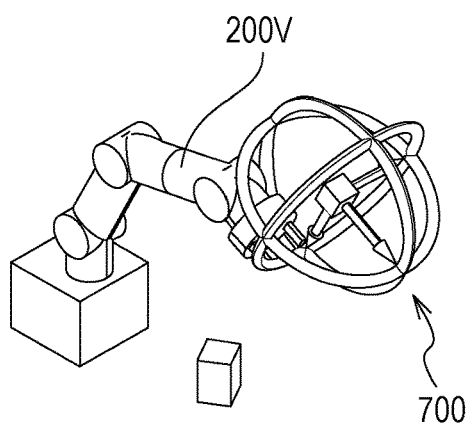
Figure 17C:
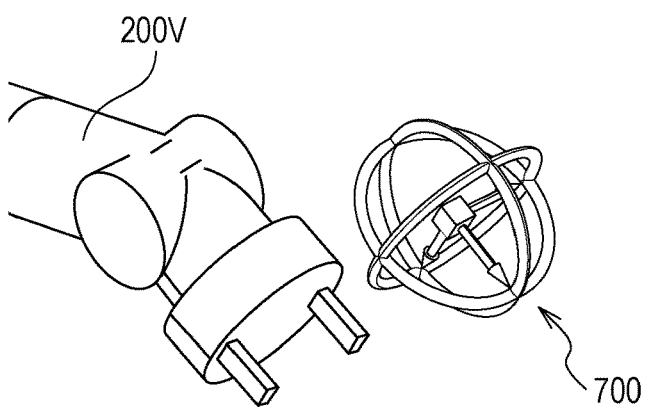

FIG. 16 shows a control flowchart related to display of the operating handle 700 according to the present embodiment. FIGS. 17A to 17C are diagrams illustrating display of the operating handle 700 of which the display magnification is changed according to the present embodiment.

Initially, in step S31, zoom operation of the screen of the virtual space VS is performed. Zoom operation may be performed by using a general wheel operation of the mouse 504, slider operation, numeric value input, or the like. When the display 502 displaying the simulation screen 600 is a touch panel, zoom operation may be performed by pinching out or pinching in through a touch of the user.

Subsequently, in step S32, a zoomed display magnification in the operating handle 700 is acquired in accordance with a set display magnification and a zoom magnification through zoom operation. For the set display magnification, the set display magnification described in the above-described second embodiment is acquired. A default set display magnification is set to 100[%]. A zoom magnification is an input magnification in zoom operation. The display magnification set this time is 100[%]. Then, description will be made on the assumption that a zoom magnification in the case of zoom out in zoom operation is 30[%]. Also, description will be made on the assumption that a zoom magnification in the case of zoom-in is 300[%] in zoom operation.

In step S32, the quotient of a set display magnification divided by a zoom magnification (Set display magnification/Zoom magnification) is calculated including a decimal. Not an integer but a decimal included, minute adjustment of the size through zooming can be performed. In the present embodiment, a case where calculation is performed up to two decimal places will be described. In the case of the present embodiment, since zoom-out operation is the quotient of 100[%] divided by 30[%], that is, 3.33 . . . , the display magnification after zoom operation is 333.33[%]. Since, for zoom-in operation, the quotient of 100[%] divided by 300[%] is 0.33 . . . , the display magnification after zoom operation is 33.33[%].

Subsequently, in step S33, display of the operating handle 700 is updated in accordance with the zoomed display magnification acquired in step S32. FIG. 17A is the state of FIG. 9E and shows the operating handle 700 before zooming. FIG. 17B shows the operating handle 700 displayed in the virtual space VS zoomed out by a zoom magnification of 30[%] from the state of FIG. 17A. FIG. 17C shows the operating handle 700 displayed in the virtual space VS zoomed in by a zoom magnification of 300[%].

The overall virtual model other than the operating handle 700 is smaller than that in FIG. 17B because of zoom-out; however, the operating handle 700 is displayed at a magnification that is the acquired zoomed display magnification of 333.33[%] and is apparently larger than the virtual model. In other words, the size equivalent to the size of the operating handle 700 in the state of FIG. 17A is maintained. Therefore, even when zoom operation is performed, the apparent size on the screen remains unchanged from the operating handle 700 in the state of FIG. 17A.

The overall virtual model other than the operating handle 700 is larger than that in FIG. 17C because of zoom-in; however, the operating handle 700 is displayed at a magnification that is the acquired zoomed display magnification of 33.33[%] and is apparently smaller than the virtual model. In other words, the size equivalent to the size of the operating handle 700 in the state of FIG. 17A is maintained. Therefore, even when zoom operation is performed, the apparent size on the screen remains unchanged from the operating handle 700 of FIG. 17A.

According to the present embodiment, even when zoom operation of the virtual space VS is performed, display is updated such that the size of the operating handle on the screen is apparently unchanged. Thus, it is possible to reduce difficulty in accessing the operating handle due to an excessive reduction in the size of the operating handle resulting from zoom-out. It is also possible to reduce difficulty in accessing the operating handle due to an excessive increase in the size of the operating handle resulting from zoom-in to cause occurrence of part of the operating handle, displayed outside the screen. Thus, it is possible to easily operate the operating handle after zoom operation, so the operability is improved. When setting information on the operating handle 700 itself is allowed to be changed by the user, the operability of the operating handle 700 is improved. The above-described various embodiments and modifications may be implemented in combination with the present embodiment and/or the present modification. In order to allow the user to set whether to maintain the display magnification, a set button or the like may be displayed on the simulation screen 600 or the operating handle setting screen 800.

Fifth Embodiment

Next, a fifth embodiment of the present disclosure will be described in detail. When the operating handle 700 is operated, a cursor is put with the mouse 504 over the model corresponding to the arrows 700a and the rings 700b and dragged. However, when the arrows 700a or the rings 700b are buried inside the virtual model of the robot arm or the workpiece, the operating handle 700 may be not able to be selected. For this reason, in the present embodiment, a mode in which virtual models other than the operating handle 700 are displayed in a transparent mode while the operating handle 700 is displayed as setting information in display of the operating handle 700 to make it easy to operate the operating handle 700 will be described.

Hereinafter, basic parts of the hardware configuration, the configuration of the display screen, and the like are the same as those of the above-described various embodiments, and the detailed description is omitted. In the following embodiment, like reference signs are assigned to the same or substantially the same members, and the detailed description is omitted.

Figure 18:
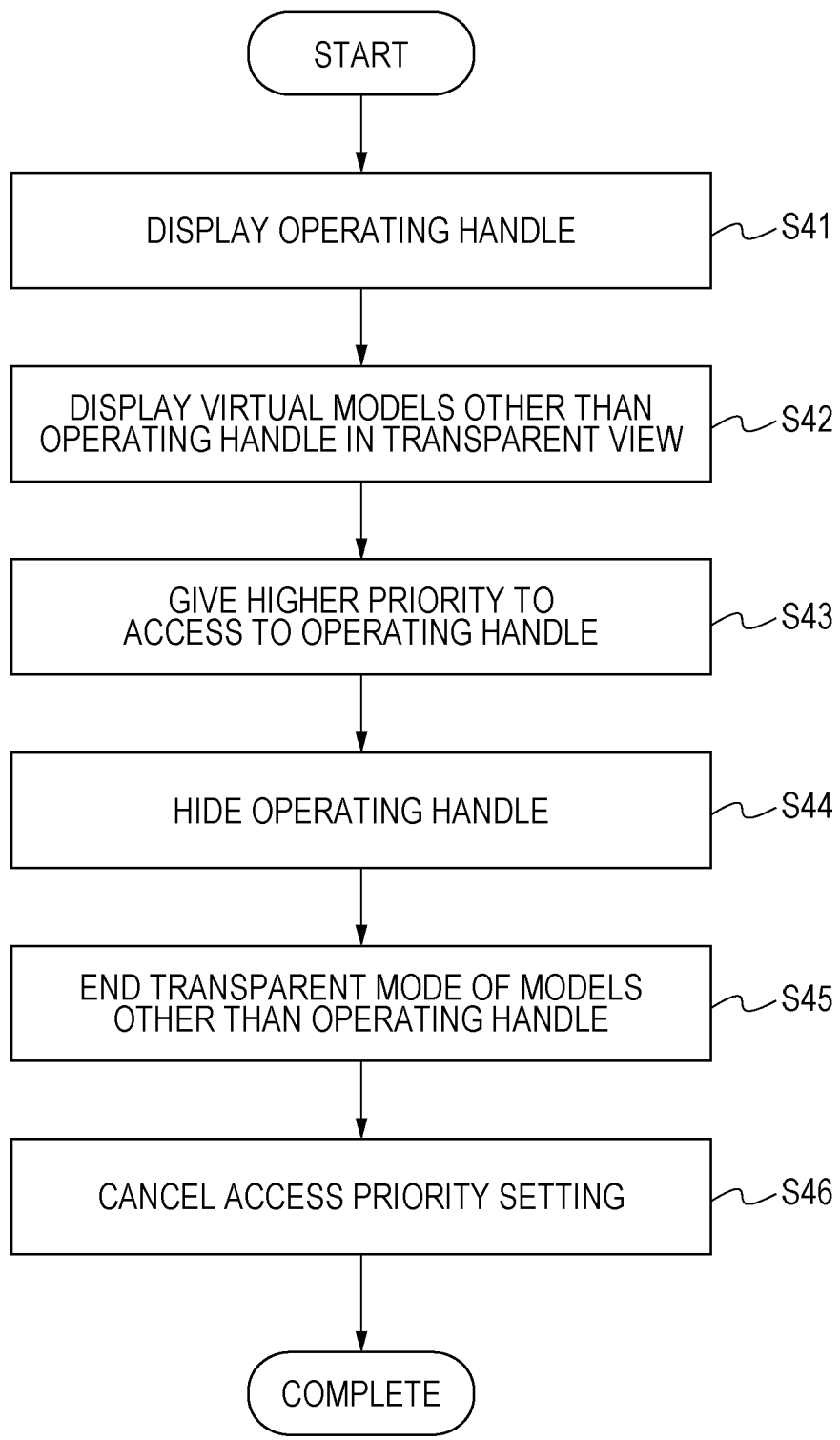
FIG. 18 is a control flowchart according to a fifth embodiment.
Figure 19A:
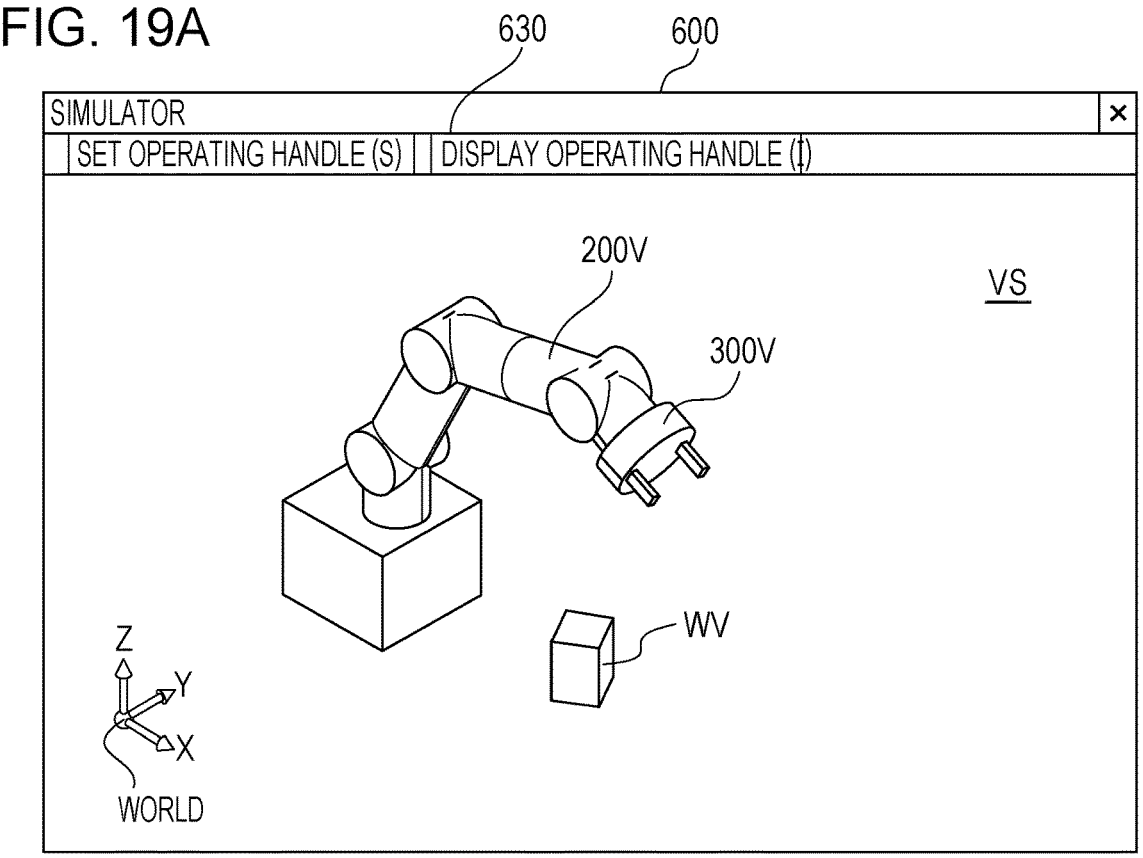
FIGS. 19A and 19B are diagrams related to display of the operating handle according to the fifth embodiment.
Figure 19B:
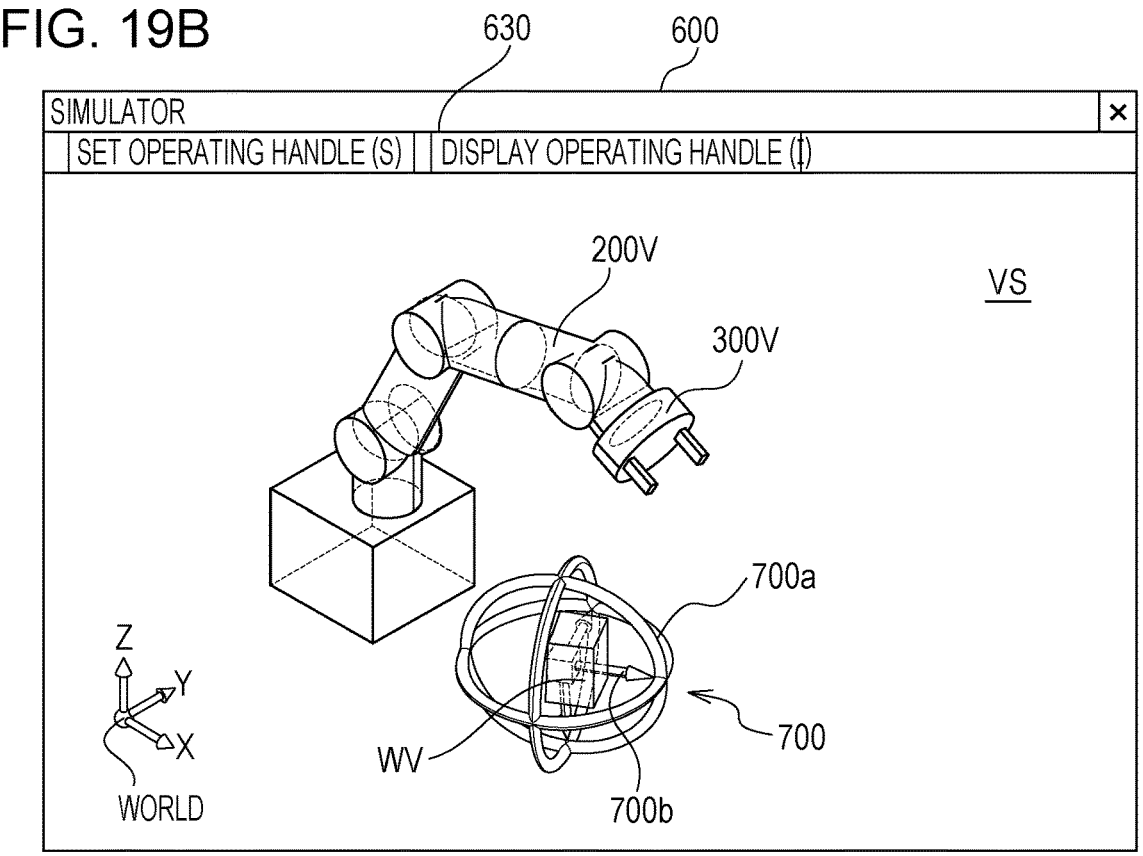

FIG. 18 shows a control flowchart related to display of the operating handle 700 according to the present embodiment. FIGS. 19A and 19B are diagrams illustrating virtual models in a transparent mode according to the present embodiment. FIG. 19A shows the virtual space VS in the simulation screen 600 in a state where the operating handle 700 is not displayed. FIG. 19B shows the virtual space VS in the simulation screen 600 in a state where the operating handle 700 is displayed. As shown in FIGS. 19A and 19B, in the present embodiment, the operating handle display button 630 is displayed on the simulation screen 600.

As shown in FIG. 18, initially, the operating handle 700 is displayed in step S41. When the operating handle display button 630 is pressed down with the mouse 504 in the state of FIG. 19A, the operating handle 700 is displayed in the virtual space VS as shown in FIG. 19B. In the state of FIG. 19B, the operating handle display button 630 is indicated by "HIDE OPERATING HANDLE (I)", and, when the operating handle display button 630 is pressed down in this state, the operating handle 700 is hidden as shown in FIG. 19A. For example, a show/hide state may be switched by an icon or a shortcut key, such as a function key of the keyboard 503. A show/hide state may be switched by clicking the virtual space VS.

Subsequently, in step S42, as shown in FIG. 19B, after the operating handle 700 is displayed, the virtual robot arm body 200V, the virtual robot hand body 300V, and the virtual workpiece WV, which are the virtual models other than the operating handle 700, are displayed in a semi-transparent mode.

Subsequently, in step S43, when a portion where the transparent virtual model overlap the operating handle 700 is accessed from the user, access to the operating handle 700 is given a priority. In the present embodiment, the order of priority is set; however, access to only the operating handle 700 may be accepted.

When display is updated to a transparent mode and access to the operating handle 700 is given a priority, the positions of the arrows 700a and the rings 700b are found even when, for example, the operating handle 700 overlaps the workpiece WV, and the arrows 700a or the rings 700b can be operated with the mouse 504. While the operating handle 700 is being displayed, the transparent mode and access priority state are maintained.

Subsequently, in step S44, when the operating handle display button 630 is pressed down, the operating handle 700 is hidden. Subsequently, the transparent mode of the virtual models other than the operating handle 700 is ended in step S45, and the display state is returned (updated) to the display state of FIG. 19A. The access order of priority set in step S43 is cancelled. When only access to the operating handle 700 is accepted, access to the virtual models is also accepted.

According to the present embodiment, even when the operating handle and the virtual models overlap each other, the virtual models other than the operating handle are set so as to be displayed in a transparent mode while the operating handle is displayed. Thus, it is possible to allow the user to accurately understand the position of the operating handle. It is possible to accurately operate the operating handle by giving a higher priority to access to the operating handle over access to the virtual models. When setting information on the operating handle 700 itself is allowed to be changed by the user, the operability of the operating handle 700 is improved.

In the present embodiment, the description has been made in a state where the operating handle 700 is hidden in FIG. 19A; however, the configuration is not limited thereto. For example, in FIG. 19A, the operating handle 700 may be configured to be displayed in a transparent mode. The above-described various embodiments and modifications may be implemented in combination with the present embodiment and/or the present modification.

Sixth Embodiment

Next, a sixth embodiment of the present disclosure will be described in detail. When teaching of the virtual robot arm body 200V is performed, it is possible to make it easy for the user to understand whether the posture taught is a posture that the robot arm body 200 can make, so it is possible to provide a further highly operable simulation. In the present embodiment, a mode to make it easy for the user to understand whether the posture of the virtual robot arm body 200V is a posture that can be made by the robot arm body 200 through the operating handle 700 will be described.

Hereinafter, basic parts of the hardware configuration, the configuration of the display screen, and the like are the same as those of the above-described various embodiments, and the detailed description is omitted. In the following embodiment, like reference signs are assigned to the same or substantially the same members, and the detailed description is omitted.

Figure 20A:
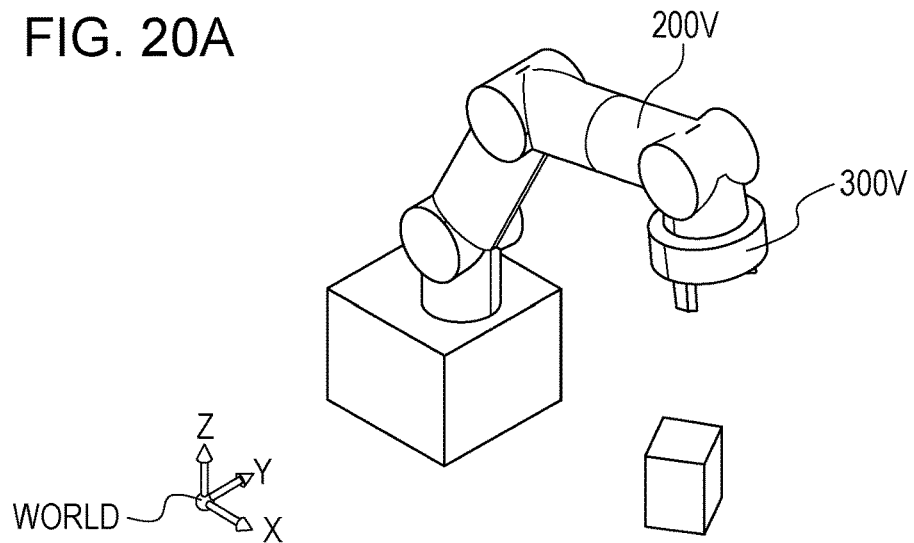
FIGS. 20A to 20C are diagrams related to a singular point of a virtual robot arm body.
Figure 20B:
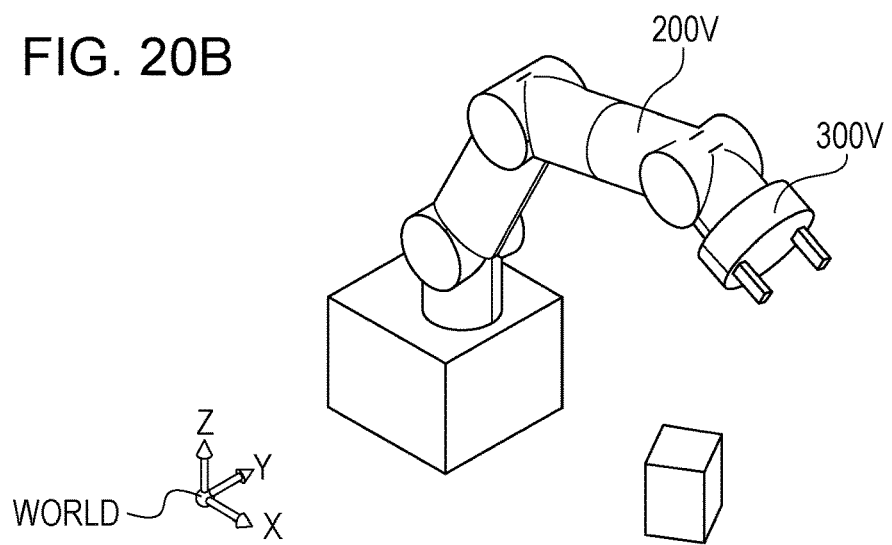
Figure 20C:
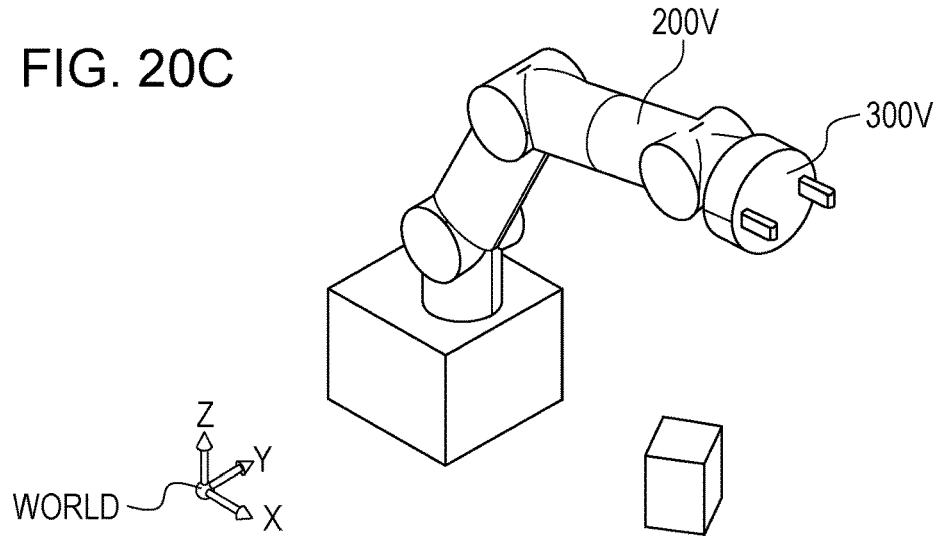

FIGS. 20A to 20C are diagrams showing examples of the posture of a singular point of the virtual robot arm body 200V according to the present embodiment. A singular point is a posture in which the robot arm is uncontrollable from the viewpoint of calculation formula of the posture of the robot arm. Examples of the singular point include the posture of a state where a hand (virtual robot hand body 300V) is extended to the end. FIG. 20A shows a state where the posture of the virtual robot arm body 200V is not a singular point. FIG. 20B shows a state where the posture of the robot arm body 200V is near a singular point. FIG. 20C shows a state where the virtual robot arm body 200V is a singular point. In the present embodiment, the singular point of the state where the hand is extended to the end is described; however, the singular point is not limited thereto. For example, in the case of a six-axis articulated robot, a case where two or more axes are arranged in a straight line is also a singular point.

In the case of FIG. 20A, there are degrees of freedom in up, down, right, and left directions in the virtual robot hand body 300V, and control is possible. However, in the state of FIG. 20C, there are no degrees of freedom in a plane direction with respect to a direction in which the hand is extended. Therefore, if this state is performed in the robot arm body 200 of the real machine, control is impossible due to the singular point. It is important to check for such a singular point at the time of teaching. Hitherto, such a singular point has been mostly found as an error when a program using teaching points obtained by teaching is run on real machines. The present embodiment makes it possible to check the state of a singular point during operation of the virtual robot arm body 200V with the operating handle 700.

Figure 21:
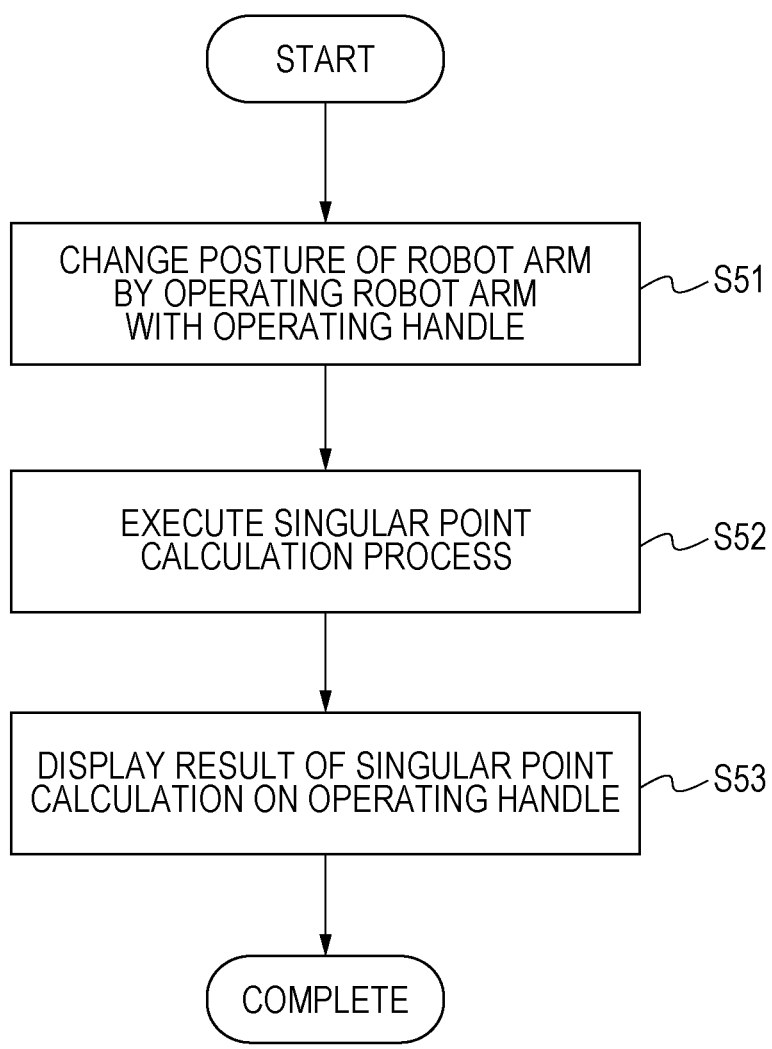
FIG. 21 is a control flowchart according to a sixth embodiment.

FIG. 21 shows a control flowchart related to display of the operating handle 700 according to the present embodiment. FIGS. 22A and 22B and FIGS. 23A and 23B are diagrams related to display of the operating handle 700 with indication of a singular point according to the embodiment.

Initially, in step S51, the user operates the virtual robot arm body 200V and/or the virtual robot hand body 300V with the operating handle 700 to change the posture of the virtual robot arm body 200V.

Subsequently, in step S52, a singular point calculation process is executed. In the singular point calculation process, generally, a Jacobian calculation is performed with the posture at a move destination as input, it is determined whether Jacobian becomes zero (singular point: abnormal) or a value close to 0 (near a singular point: warning), and the result is output. It is determined whether the posture is a singular point or approaching a singular point. For Jacobian calculation, a general technique is used, so the description thereof is omitted. A method of the singular point calculation process may be a method other than Jacobian. For example, in the case of a singular point at which two or more axes are arranged in a straight line, a specific joint angle may be monitored or axes may be monitored by providing a threshold in a certain range from an extension line of a specific axis.

Figure 22A:
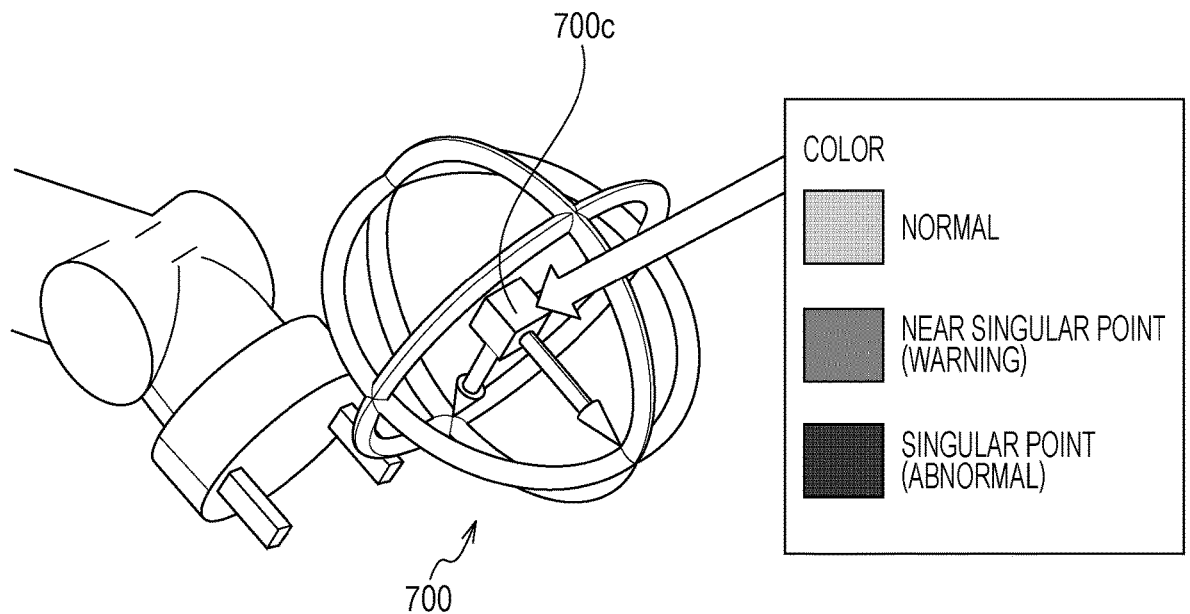
FIGS. 22A and 22B are diagrams related to display of the operating handle according to the sixth embodiment.

Subsequently, in step S52, the result of singular point calculation is indicated on the operating handle 700. FIG. 22A is a diagram at the time of showing the state of the singular point with color on a square model (object) 700c provided at the center of the operating handle 700. In the present embodiment, the arrows 700a may be referred to as first model, the square model 700c may be referred to as second model, and the rings 700b may be referred to as third model. In a normal (neither a singular point nor near a singular point) case, the square model 700c is displayed in a first color (e.g. blue). In a warning (near a singular point) case, the square model 700c is displayed in a second color (e.g. yellow). In an abnormal (singular point) case, the square model 700c is displayed in a third color (e.g. red). Arrangement of colors is not limited thereto. Any color may be used as long as different distinguishable colors are used. The square model 700c may have another shape. A selected shape, such as a triangular shape, a rectangular shape, a trapezoidal shape, a circular shape, and a star shape, may be used. The normal case may be referred to as first phase, the warning case may be referred to as second phase, and the abnormal case may be referred to as third phase.

Figure 22B:
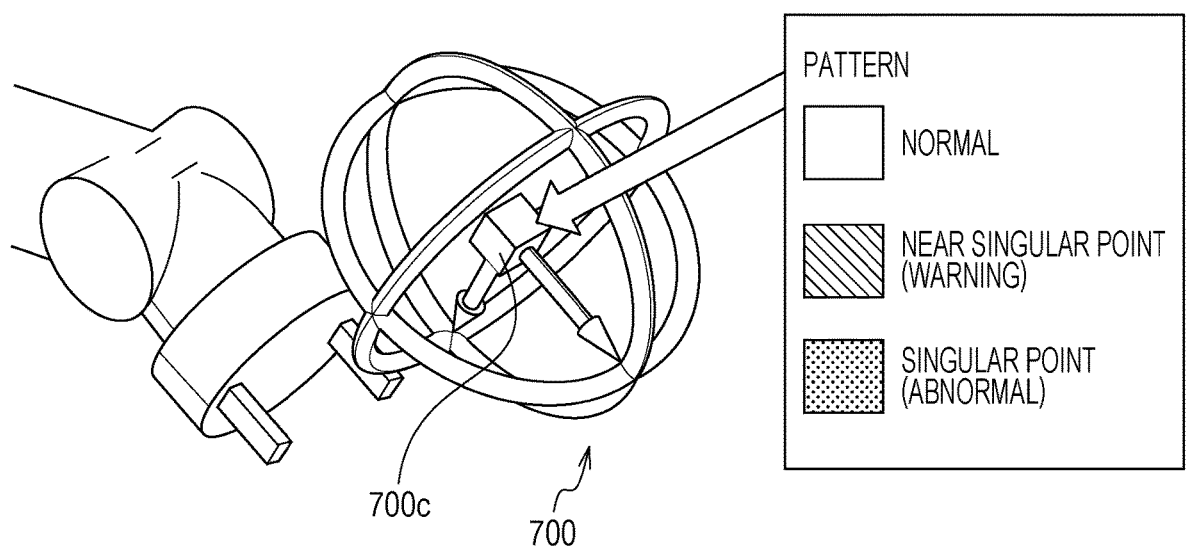

FIG. 22B is a diagram at the time of showing the state of a singular point with a pattern, such as a design pattern, on the square model (object) 700c provided at the center of about the operating handle 700. In the normal (neither a singular point nor near a singular point) case, the square model 700c is displayed in a first pattern which could also be no pattern (plain). In the warning (near a singular point) case, the square model 700c is displayed in a second pattern (e.g. a mesh pattern). In the abnormal (singular point) case, the square model 700c is displayed in a third pattern (in a dot pattern). The pattern is not limited thereto. Any pattern may be used as long as the user is able to identify normal, warning, or abnormal. In the present embodiment, the color and design of the central square model have been described; however, the configuration is not limited thereto. For example, the arrows 700a or the rings 700b may be changed.

Figure 23A:
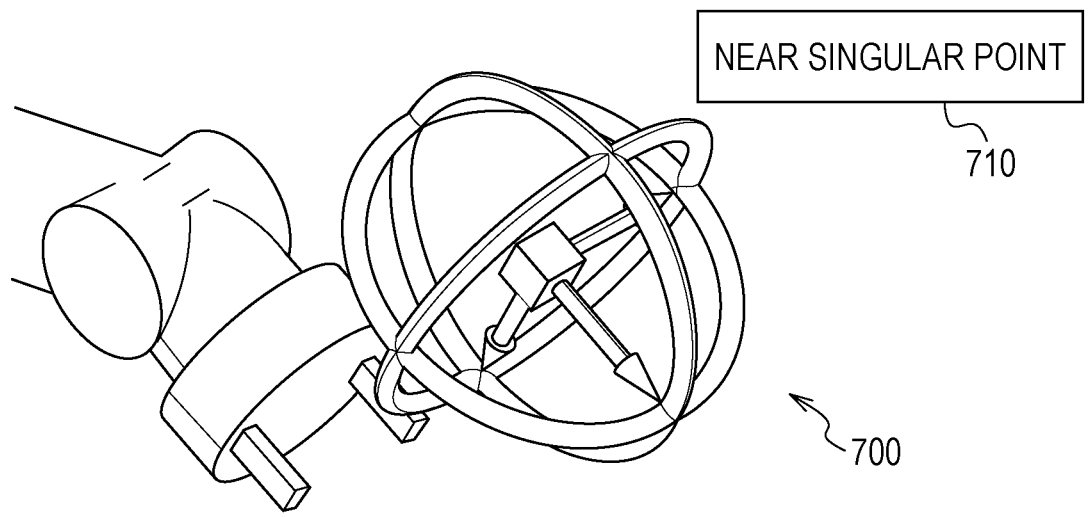
FIGS. 23A and 23B are diagrams related to display of the operating handle according to the sixth embodiment.
Figure 23B:
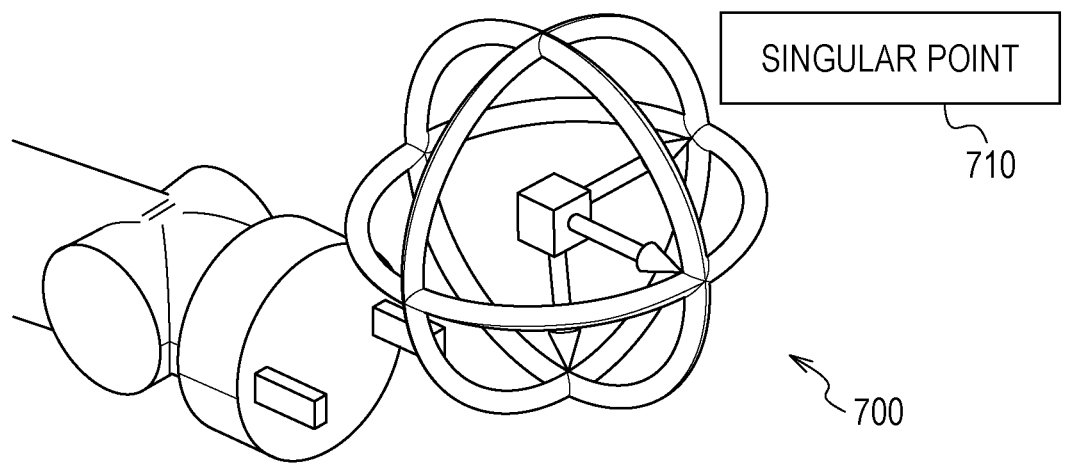

FIGS. 23A and 23B are diagrams illustrating display of the operating handle 700 at the time of indicating the state of a singular point with a pop-up 710 according to the present embodiment. FIG. 23A shows the pop-up 710 in the warning (near a singular point) case. FIG. 23B shows the pop-up 710 in the abnormal (singular point) case. The pop-up 710 is displayed near the operating handle 700 is synchronized (interlocking) with movement of the operating handle 700 in this way. Thus, it is possible to determine the state of the singular point. In the present embodiment, a case where the pop-up 710 is displayed as interlocking with movement of the operating handle 700 is described. The pop-up 710 may be displayed at a predetermined fixed position in the virtual space VS, the simulation screen 600, or in the display 502.

FIGS. 24A to 24D show changes in the display state of the operating handle 700 at the time of changing the posture of the virtual robot arm body 200V and/or the virtual robot hand body 300V with the operating handle 700 in the present embodiment.

Figure 24A:
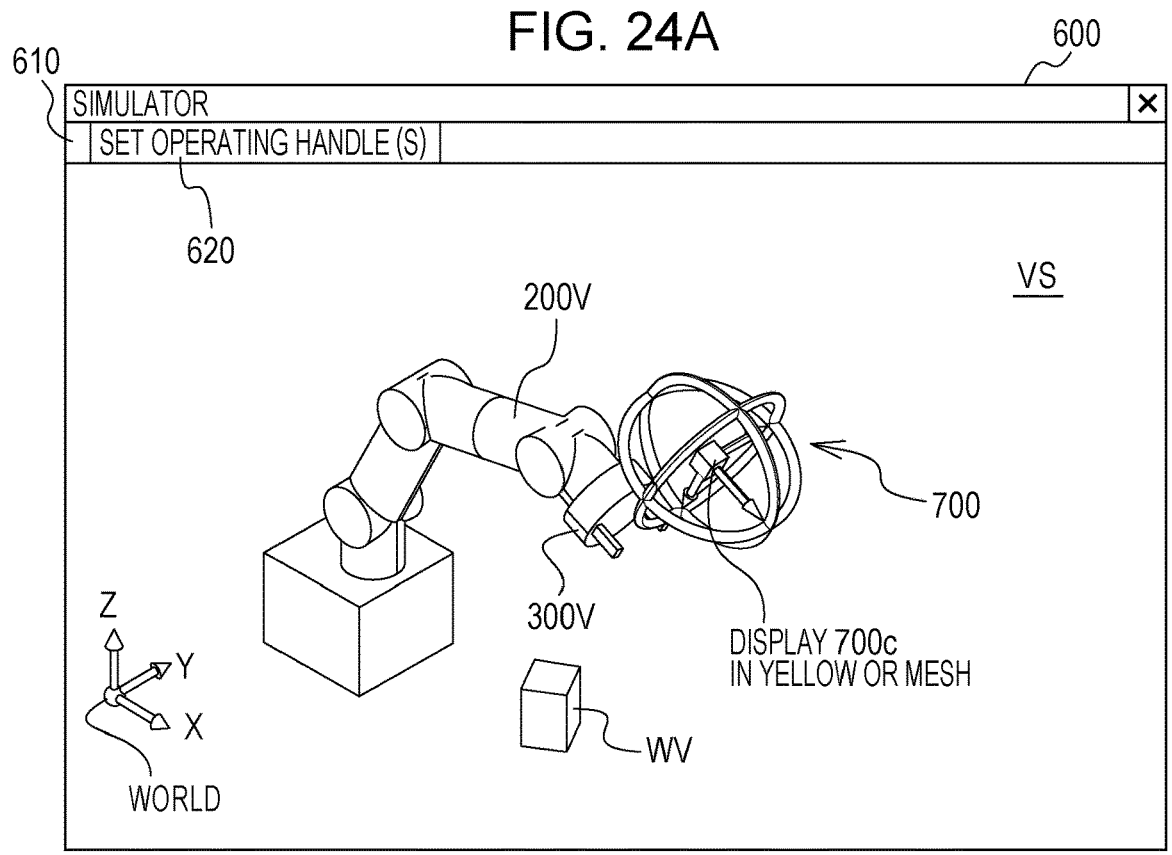
FIGS. 24A to 24D are diagrams related to display of the operating handle according to the sixth embodiment.
Figure 24B:
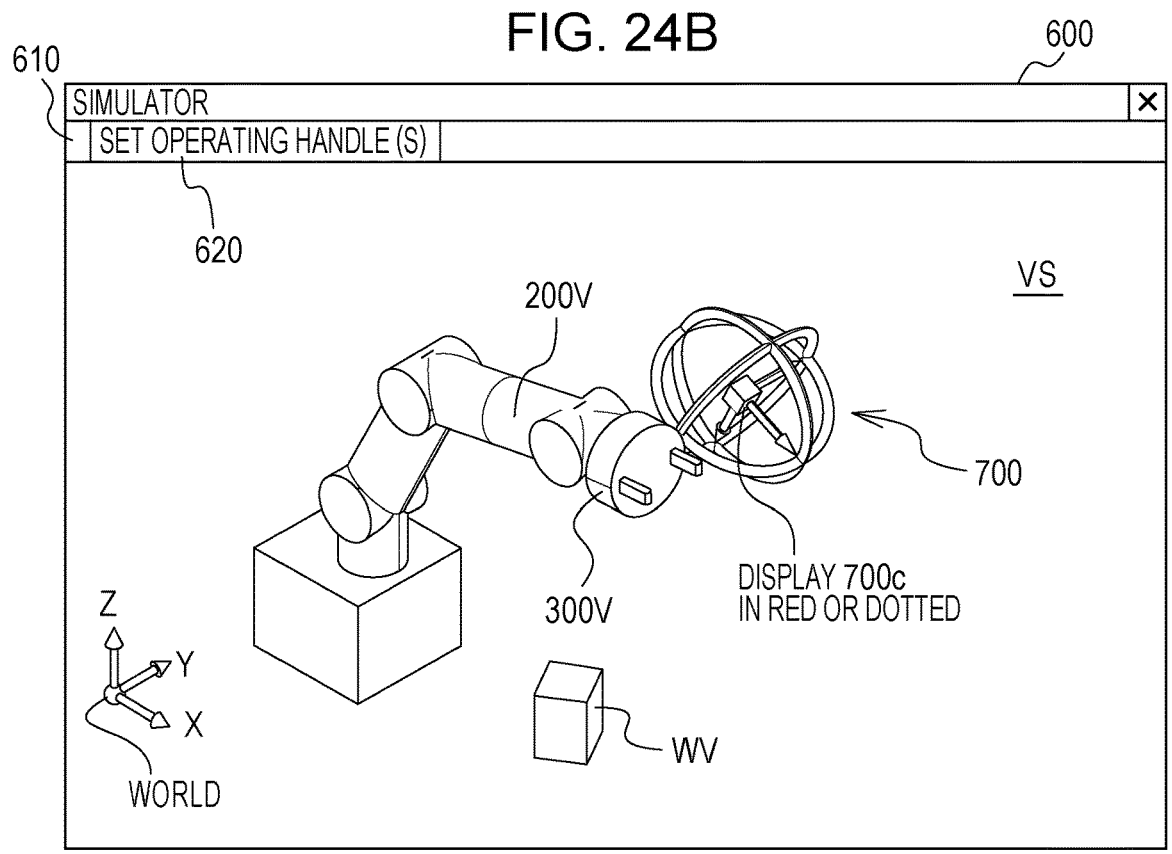

FIG. 24A shows the simulation screen 600 at the time when the virtual robot arm body 200V is near a singular point. In this state, the square model 700c of the operating handle 700 is displayed in yellow as shown in FIG. 22A or in mesh as shown in FIG. 22B. It is assumed that the posture transitions from this state to a posture determined to be a singular point in the virtual robot arm body 200V as shown in FIG. 24B. At this time, in interlocking with changing the posture of the virtual robot arm body 200V by the user, the square model 700c of the operating handle 700 is displayed in red as shown in FIG. 22A or with dots as shown in FIG. 22B. In this way, display of the square model 700c of the operating handle 700 is synchronized (interlocked) with the state of the virtual robot arm body 200V changed by the user. Thus, since the user is operating the operating handle 700, the user is able to instantly understand which state the posture of the virtual robot arm body 200V is in.

Figure 24C:
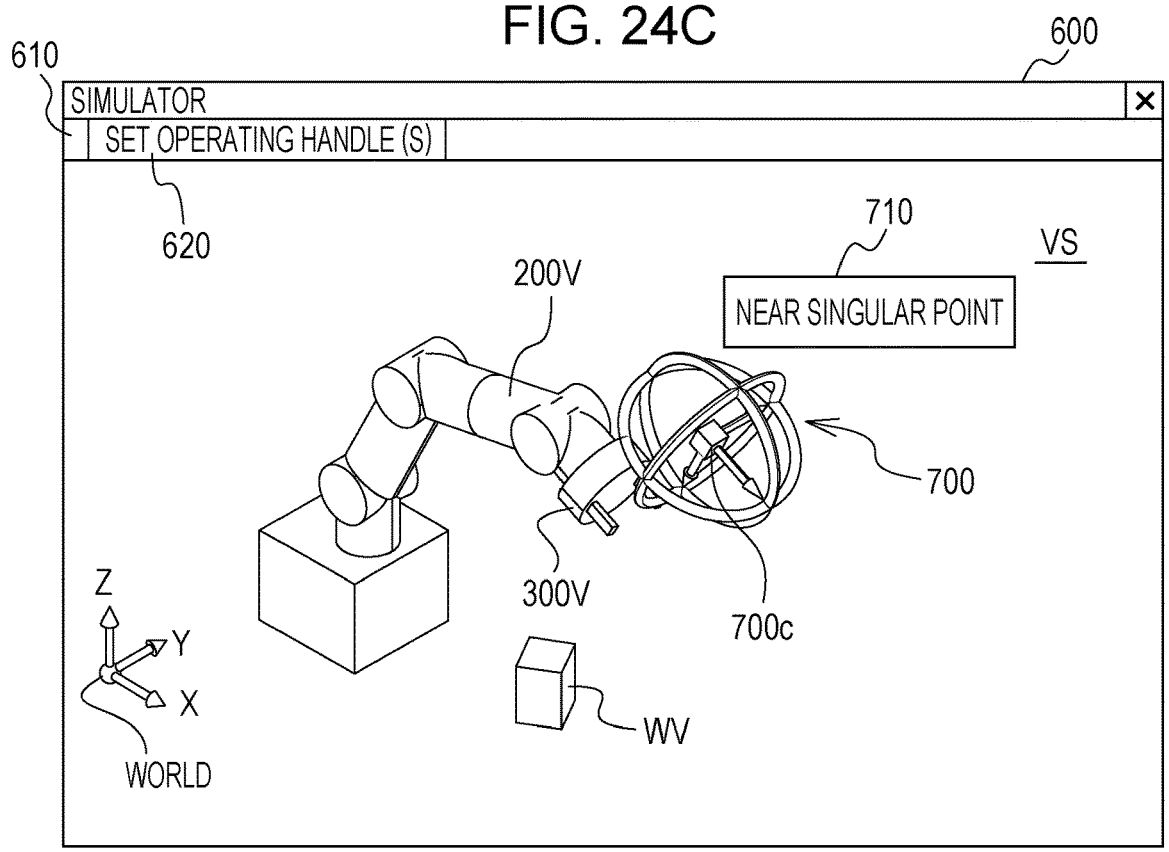
Figure 24D:
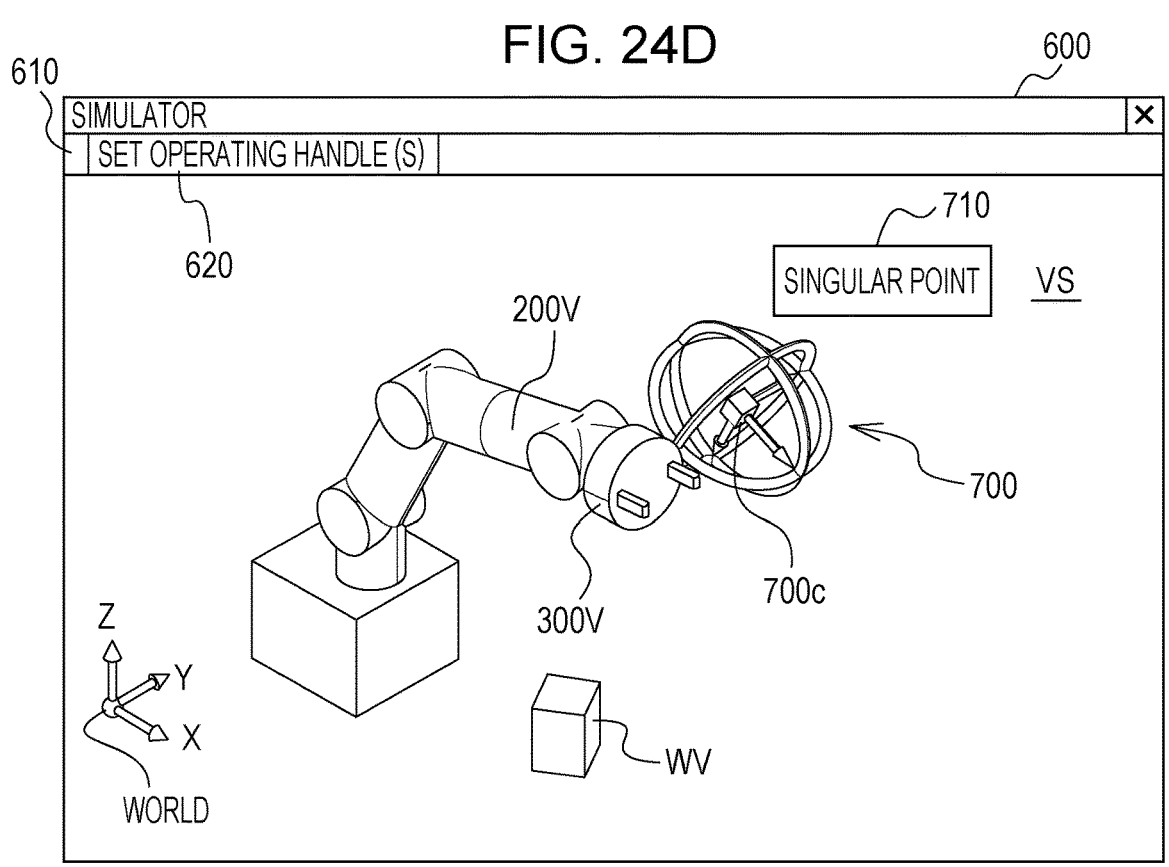

Similarly, FIG. 24C shows the simulation screen 600 at the time when the virtual robot arm body 200V is determined to be near a singular point. In this state, the pop-up 710 displayed as "near a singular point" as shown in FIG. 23A is displayed in interlocking with movement of the operating handle 700. It is assumed that the posture transitions from this state to a posture in which the virtual robot arm body 200V is determined to be a singular point as shown in FIG. 24D. At this time, in interlocking with changing the posture of the virtual robot arm body 200V by the user, the pop-up 710 is displayed with indication of a singular point as shown in FIG. 23B. In this way, display of the pop-up 710 is synchronized (interlocked) with the state of the virtual robot arm body 200V changed by the user. Thus, the user is able to instantly understand which state the posture of the virtual robot arm body 200V is in.

According to the present embodiment, during operation of the robot arm, the display mode of the operating handle is changed to indicate the state of the singular point in the robot arm. With this configuration, it is possible to instantly determine the posture that should not be taught, so it is possible to efficiently perform teaching work. The state of the robot arm is indicated on the model of the operating handle or near the operating handle. Thus, it is possible to make the user operating the operating handle reliably visually recognize the state of the robot arm. In order to allow the user to set whether to indicate a singular point with the operating handle 700, a set button or the like may be displayed on the simulation screen 600 or the operating handle setting screen 800. When setting information on the operating handle 700 itself is allowed to be changed by the user, the operability of the operating handle 700 is improved.

In the present embodiment, the description is made by way of an example in which the robot arm becomes the state of a singular point; however, the configuration is not limited thereto. For example, an interference state where the virtual robot arm body 200V and/or the virtual robot hand body 300V interferes with a surrounding object may be classified into phases and displayed as described above. The interference state may be classified into a normal (neither interference nor near interference) case, a warning (near interference with reference to a threshold set between models) case, and an abnormal (interference that models overlap with each other) case and displayed. An out-of-range state as to whether the virtual robot arm body 200V and/or the virtual robot hand body 300V falls outside an operating range of a mechanical mechanism, such as a motor, a speed reducer, and a link in the robot arm body 200, may classified into phases and displayed as described above. The out-of-range state may be classified into a normal (neither outside the range nor near outside the range) case, a warning (near outside the range with reference to a threshold set) case, and an abnormal (outside the range) case and displayed. The above-described various embodiments and modifications may be implemented in combination with the present embodiment and/or the present modification.

In the present embodiment, the color or pattern of the square model 700c is changed according to multiple phase; however, the configuration is not limited thereto. For example, the shape of the square model 700c may be changed like, in a normal case, the shape of the square model 700c is rectangular; in a warning case, the shape of the square model 700c is triangular; and, in an abnormal case, the shape of the square model 700c is star. In indication of the state of interference, display of the operating handle that operates the virtual workpiece WV may be changed.

Seventh Embodiment

Next, a seventh embodiment of the present disclosure will be described in detail. In the above-described various embodiments, in setting the setting information related to display of the operating handle 700, display of the operating handle 700 is updated by, for example, opening a menu and inputting numeric values. In the present embodiment, a mode in which setting information in display is changed by directly changing with the cursor of the operating handle 700 displayed in the virtual space VS will be described.

Hereinafter, basic parts of the hardware configuration, the configuration of the display screen, and the like are the same as those of the above-described various embodiments, and the detailed description is omitted. In the following embodiment, like reference signs are assigned to the same or substantially the same members, and the detailed description is omitted.

Figure 26A:
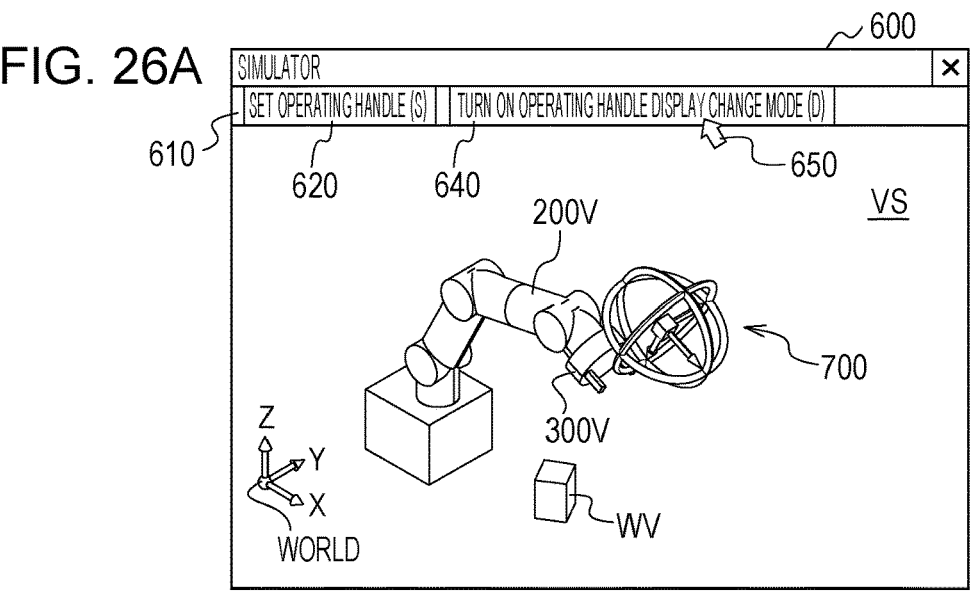
FIGS. 26A to 26C are diagrams showing an example of the simulation screen according to the seventh embodiment.
Figure 26B:
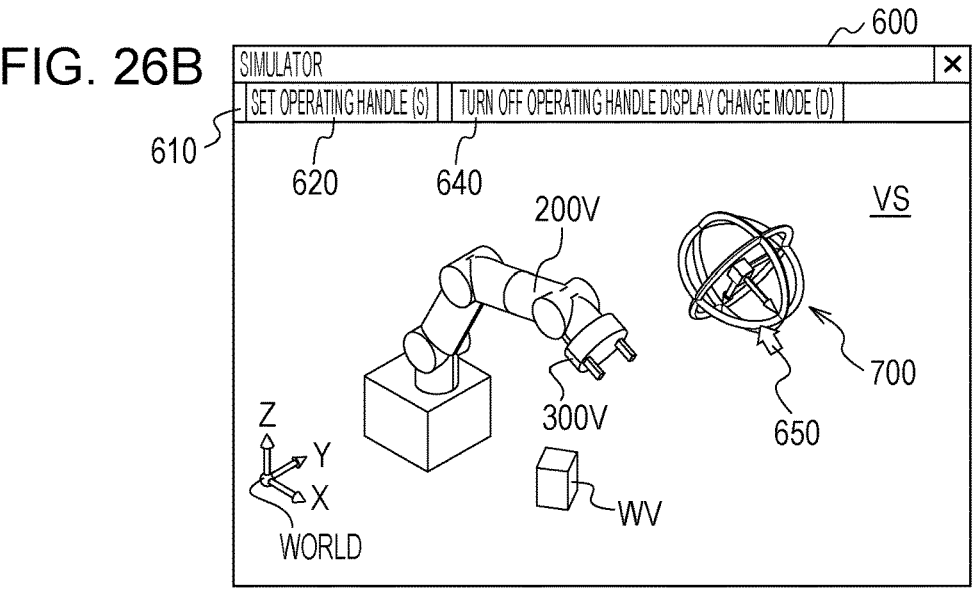
Figure 26C:
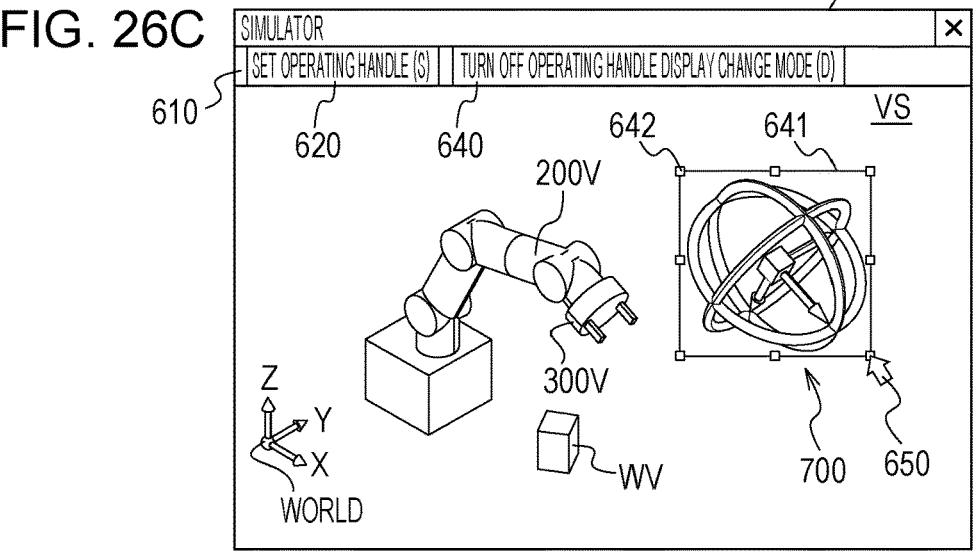

FIG. 25 shows a control flowchart related to display of the operating handle 700 according to the present embodiment. FIGS. 26A to 26C are diagrams illustrating display of the operating handle 700 of which the display position and/or the display magnification is changed according to the present embodiment.

As shown in FIG. 25, initially, in step S61, an operating handle display change mode is set by the user. FIG. 26A is a diagram at the time of setting the operating handle display change mode from an off state to an on state by pressing down an operating handle display change mode button 640 with a cursor 650. The user is able to switch between the on and off states of the operating handle display change mode by pressing down the operating handle display change mode button 640.

Subsequently, in step S62, operation of the arrows 700a and rings 700b in the operating handle 700 with the cursor 650 is disabled. Thus, it is possible to reduce a situation in which the virtual robot arm body 200V and/or the virtual robot hand body 300V is moved by erroneously operating the arrows 700a or the rings 700b although the operating handle 700 itself is intended to be to moved, enlarged, or reduced. A case where the operating handle display change mode is off may be referred to as first mode, and a case where the operating handle display change mode is on may be referred to as second mode.

Subsequently, in step S63, change of the display position and/or the display magnification of the operating handle 700 with the cursor 650 is enabled. Then, in step S64, display of the operating handle 700 is updated with the display position and/or the display magnification set with the cursor 650. FIG. 26B is a diagram at the time when the display position of the operating handle 700 is changed with the cursor 650. When the model representing the operating handle 700 is dragged in a state of being clicked with the cursor 650, the model is allowed to be moved with reference to the coordinate system set in the operating handle setting screen 800. In FIG. 26B, the display position is changed in the absolute coordinate system World.

FIG. 26C is a diagram at the time when the display magnification of the operating handle 700 is enlarged with the cursor 650. When the operating handle 700 is clicked with the cursor 650, sides 641 and squares 642 are displayed. The squares 642 may have any shape, such as a triangular shape, a rectangular shape, a trapezoidal shape, a circular shape, and a star shape. When any one of the squares 642 is dragged in a state of being clicked, the size in display of the operating handle 700 is changed. In FIG. 26C, when the lower right square 642 is dragged in right downward direction on the sheet in a state of being clicked from the state of FIG. 26B, the operating handle 700 is in an enlarged state. On the other hand, when the lower right square 642 is dragged in left upward direction on the sheet in a state of being clicked from the state of FIG. 26C, the operating handle 700 can be reduced.

When the operating handle display change mode button 640 is pressed down again by the user and the operating handle display change mode is cancelled, change of the display position and/or display magnification of the operating handle 700 with the cursor 650 is disabled. Operation of the arrows 700a and rings 700b in the operating handle 700 with the cursor 650 is enabled.

According to the present embodiment, it is possible to allow the user to directly change setting information on the operating handle in the virtual space. Thus, it is possible to make the user intuitively understand the display position and display magnification of the operating handle, so the operability of the operating handle is further improved. When setting information on the operating handle 700 itself is allowed to be changed by the user, the operability of the operating handle 700 is improved.

Figure 27:
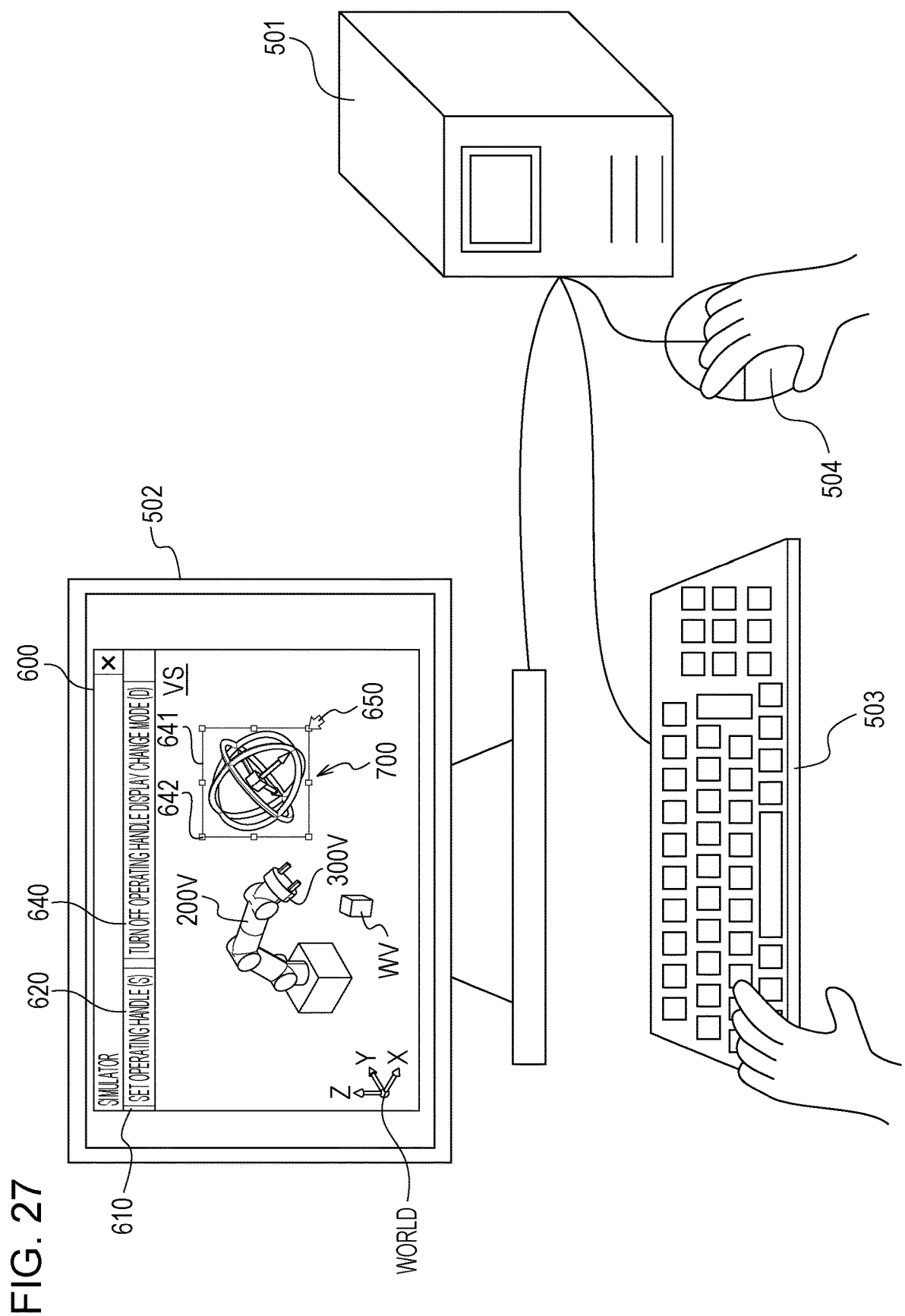
FIG. 27 is a diagram related to display of the operating handle according to the seventh embodiment.

As shown in FIG. 27, the display position and/or display magnification of the operating handle 700 may be changed. In FIG. 27, the cursor 650 is operated while a predetermined key remains pressed down with the keyboard 503. Thus, the display position and/or the display magnification of the operating handle 700 may be changed. In FIG. 27, the cursor 650 is operated with the mouse 504 in a state where the Ctrl key and the D key remain pressed down. Thus, the display position and/or the display magnification of the operating handle 700 is changed. Keys to be input and a combination of keys are not limited to the above configuration.

As shown in FIG. 27, when the Ctrl key and the D key are input, it is determined that the operating handle display change mode is on. Then, operation of the arrows 700a and the rings 700b in the operating handle 700 with the cursor 650 is disabled, and change of the display position and/or display magnification of the operating handle 700 with the cursor 650 is enabled. When the model representing the operating handle 700 is dragged in a state of being clicked with the cursor 650 in this state (the keys remain pressed down), the model is allowed to be moved with reference to the coordinate system set in the operating handle setting screen 800. When the operating handle 700 is clicked with the cursor 650 in this state (the keys remain pressed down), sides 641 and squares 642 are displayed. When any one of the squares 642 is dragged in a state of being clicked, the size in display of the operating handle 700 can be changed.

When pressing down of the Ctrl key and the D key is released (the fingers are released from the keys), change of the display position and/or display magnification of the operating handle 700 with the cursor 650 is disabled. Operation of the arrows 700a and rings 700b in the operating handle 700 with the cursor 650 is enabled.

With the above-described embodiment as well, it is possible to allow the user to directly change display of the operating handle in the virtual space. Thus, it is possible to make the user intuitively understand the display position and display magnification of the operating handle, so the operability of the operating handle is further improved. Since display of the operating handle can be directly changed immediately through key input, further improvement in operability is possible. When setting information on the operating handle 700 itself is allowed to be changed by the user, the operability of the operating handle 700 is improved. The above-described various embodiments and modifications may be implemented in combination with the present embodiment and/or the present modification. The above-described various embodiments and modifications may be implemented in combination with the present embodiment and/or the present modification.

Eighth Embodiment

Next, an eighth embodiment of the present disclosure will be described in detail. In the above-described various embodiments, the description is made in an example in which an apparatus that performs a simulation is the information processing apparatus 500, such as a PC. However, the apparatus that performs a simulation may be a tablet teaching pendant.

Hereinafter, basic parts of the hardware configuration, the configuration of the display screen, and the like are the same as those of the above-described various embodiments, and the detailed description is omitted. In the following embodiment, like reference signs are assigned to the same or substantially the same members, and the detailed description is omitted.

Figure 28:
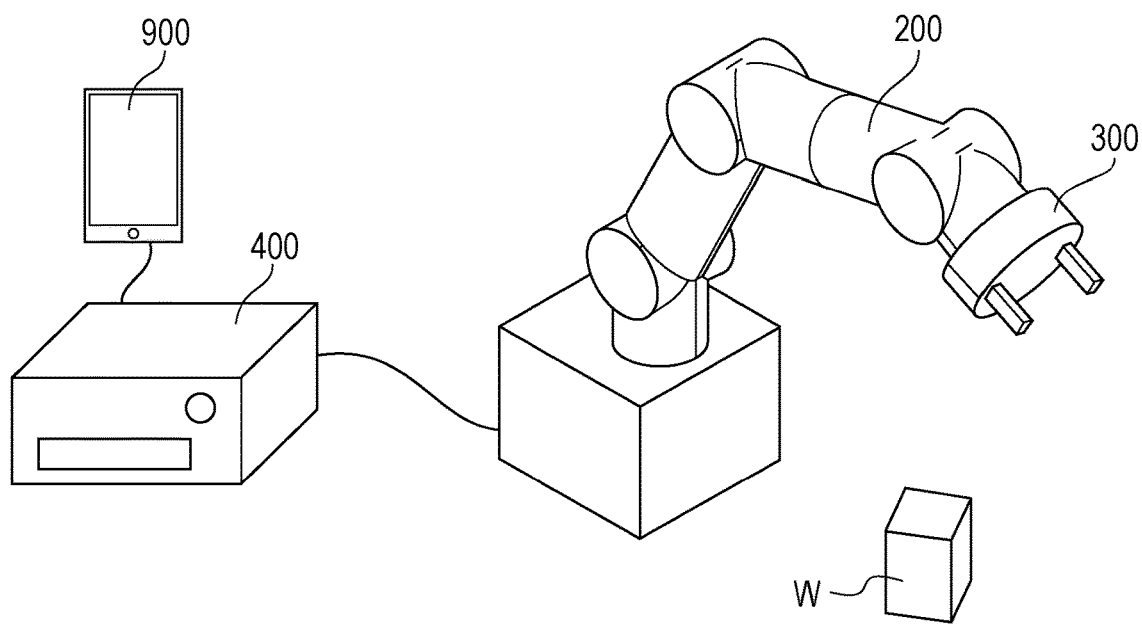
FIG. 28 is a diagram illustrating the robot system according to an eighth embodiment.
Figure 29:
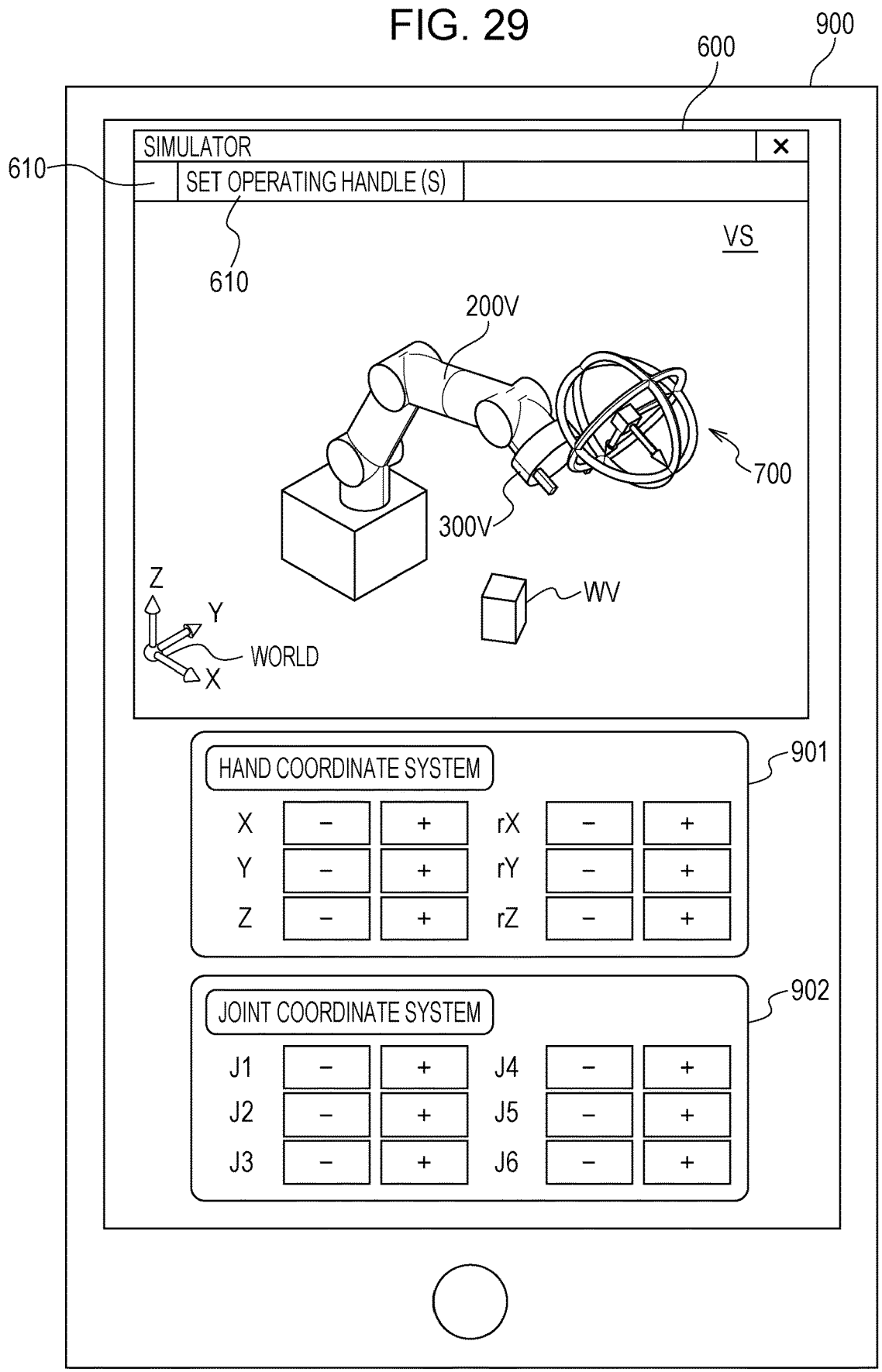
FIG. 29 is a diagram showing an example of the simulation screen according to the eighth embodiment.

FIG. 28 is a diagram illustrating the robot system 1000 that uses a tablet teaching pendant 900 according to the present embodiment. The tablet teaching pendant 900 is connected to the controller 400. FIG. 29 is a diagram showing the simulation screen 600 according to the present embodiment. In FIG. 29, a hand operating portion 901 and a joint operating portion 902 that are used to operate the robot arm body 200 and the robot hand body 300 of the real machine are displayed. The hand operating portion 901 makes it possible to operate the robot hand body 300 and allows the robot hand body 300 to move in three translational directions respectively along three axes orthogonal to one another and three rotation directions respectively around the three axes. The joint operating portion 902 allows the joints of the robot arm body 200 to move in predetermined rotation directions.

According to the above-described present embodiment, the simulation screen 600 is displayed on the teaching pendant 900, and the operating handle 700 is displayed. Thus, with the teaching pendant 900, it is possible to teach the real machine while performing a simulation in the virtual space. Thus, workability is improved. The teaching pendant 900 may be an operator control panel for teaching. The teaching pendant 900 may have the same function as the function of the information processing apparatus 500 or the controller 400 may have a control unit and a calculation unit of the information processing apparatus 500 and a result may be transmitted through communication to the teaching pendant 900. The above-described various embodiments and modifications may be implemented in combination with the present embodiment and/or the present modification.

Ninth Embodiment

A ninth embodiment of the present disclosure will be described in detail. In the above-described various embodiments, the description is made in an example in which an apparatus that performs a simulation is a PC, a tablet, or the like. However, the apparatus that performs a simulation may be an augmented reality (AR) system.

Hereinafter, basic parts of the hardware configuration, the configuration of the display screen, and the like are the same as those of the above-described various embodiments, and the detailed description is omitted. In the following embodiment, like reference signs are assigned to the same or substantially the same members, and the detailed description is omitted.

Figure 30:
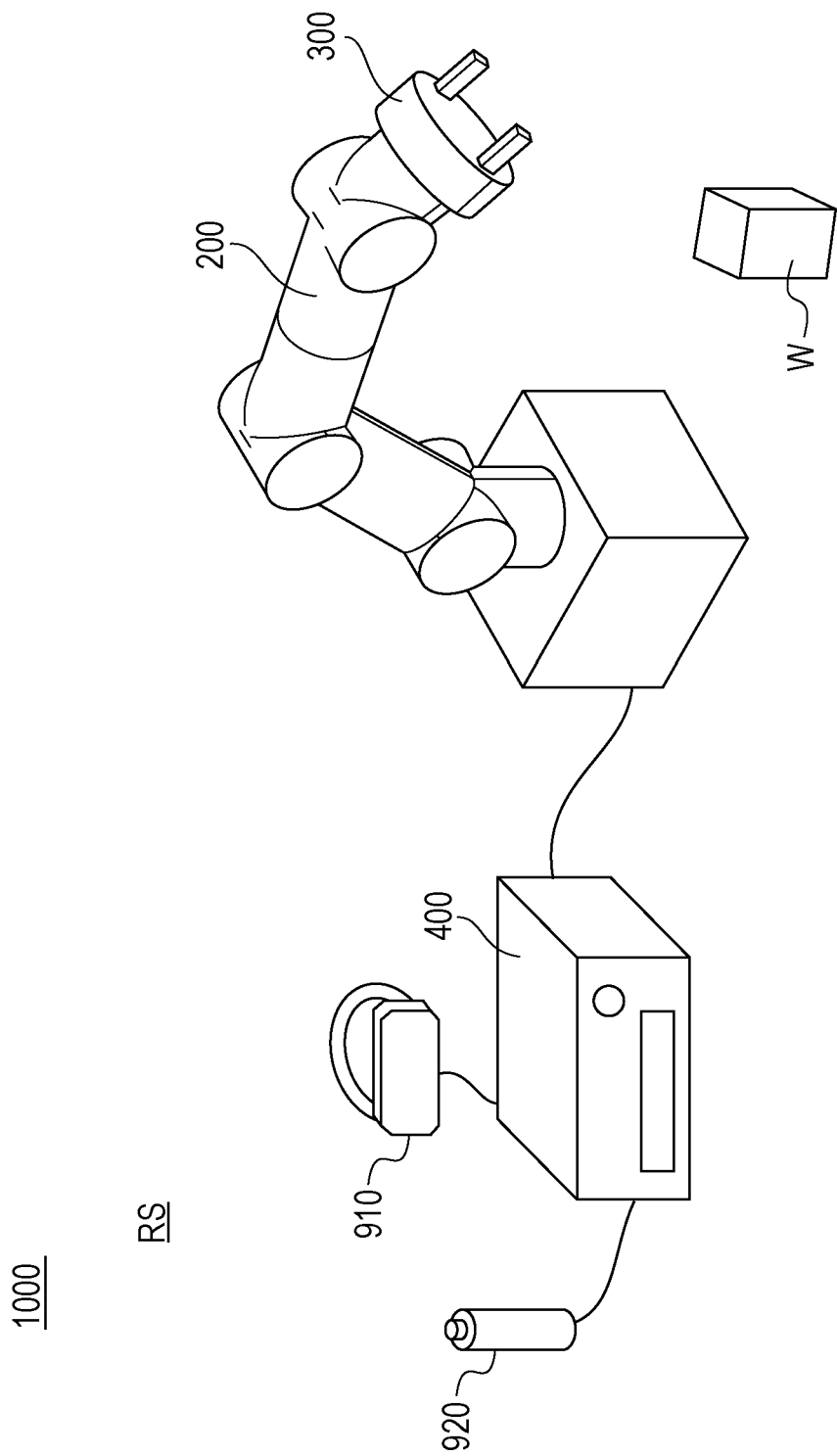
FIG. 30 is a diagram illustrating the robot system according to a ninth embodiment.

FIG. 30 is a diagram illustrating the robot system 1000 using an AR system according to the present embodiment. A head mounted display 910 and an operating piece 920 are connected to the controller 400. In the present embodiment, the head mounted display 910, the operating piece 920, and the controller 400 may be collectively referred to as information processing apparatus. An augmented space AR in which augmented reality is superimposed on the robot arm body 200 of the real machine is displayed on the head mounted display 910. The simulation screen 600 in the present embodiment displays the robot arm body 200 of the real machine such that the operating handle 700 and the cursor 650 are superimposed on the robot arm body 200 by augmented reality. Operation of the operating handle 700 on the simulation screen 600 can be performed by operation of the cursor 650 with the operating piece 920. The AR system is constructed of the head mounted display 910 and the operating piece 920. The details of a screen displayed on the head mounted display 910 will be described later.

Figure 31:
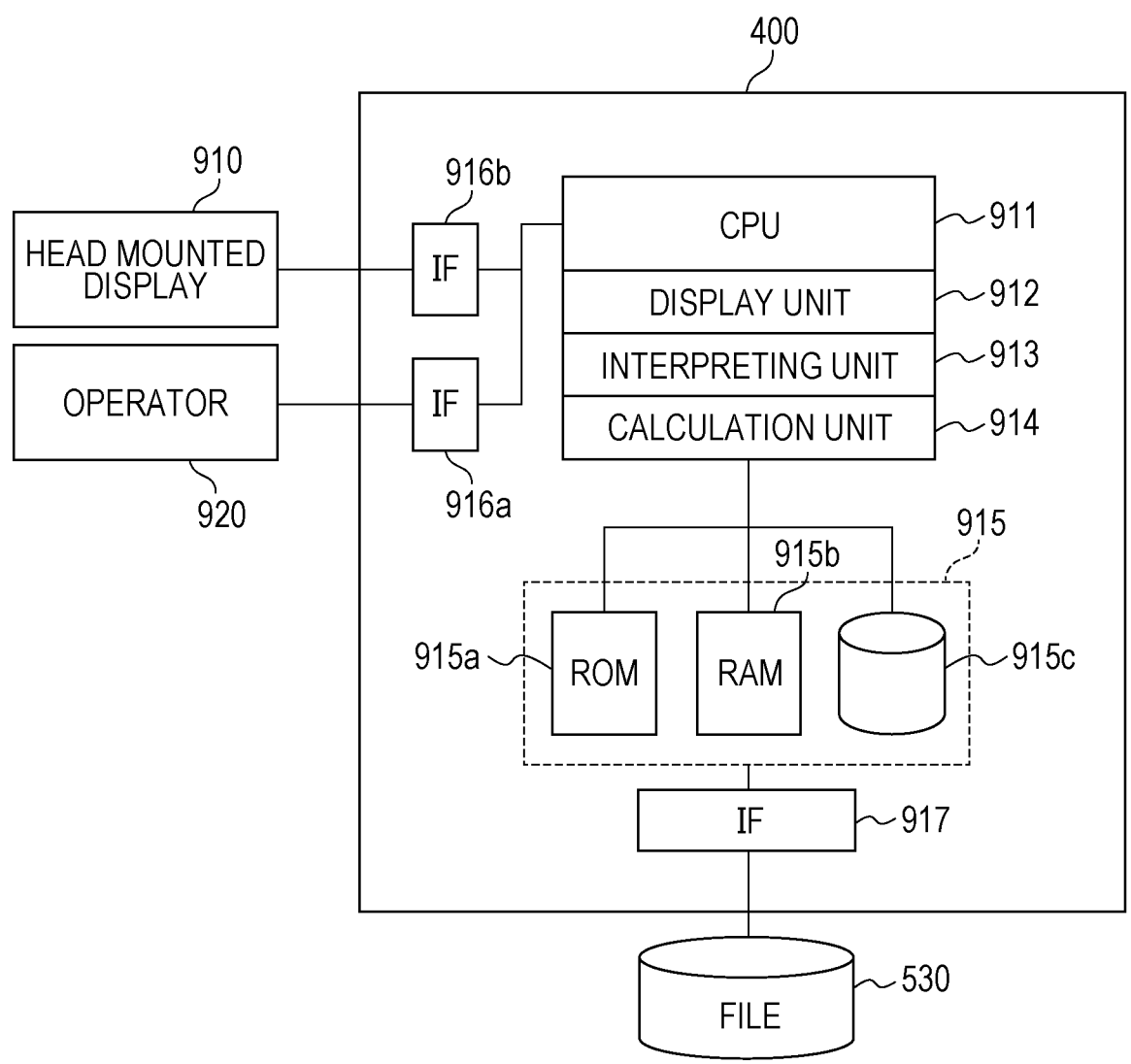
FIG. 31 is a control block diagram of the information processing apparatus according to the ninth embodiment.

FIG. 31 is a control block diagram showing a control system according to the present embodiment. As shown in FIG. 31, the controller 400 includes a CPU 911 as hardware. The controller 400 further includes a storage device 915 made up of a ROM 915a, a RAM 915b, a HDD 915c, and the like. The controller 400 further includes an interface 916a for communicating and connecting with an input device such as the operating piece 920, and an interface 916b for communicating and connecting with the head mounted display 910.

The controller 400 further includes an interface 917 for transmitting and receiving data in form of, for example, the file 530, to or from an external apparatus, such as another simulator apparatus and a robot apparatus. These interfaces each are made up of, for example, a serial bus, a parallel bus, a network interface, or the like.

The ROM 915a is a non-transitory storage device. A basic program read by the CPU 911 at start-up of the computer is stored in the ROM 915a. The RAM 915b is a temporary storage device used in arithmetic operation processing of the CPU 911. The HDD 915c is a non-transitory storage device that stores various data, such as arithmetic operation processing results of the CPU 911.

In the present embodiment, a program that functions as application software is stored in the HDD 915c. The CPU 911 is capable of executing control over the robot arm body 200 and the robot hand body 300 in a real machine environment by running the program.

In the present embodiment, a non-transitory computer-readable storage medium is the HDD 915c, and a program that functions as application software is recorded on the HDD 915c; however, the configuration is not limited thereto. The program may be recorded on any recording medium as long as the recording medium is a non-transitory computer-readable recording medium. Examples of the recording medium for supplying the program to a computer include a flexible disk, an optical disk, a magneto-optical disc, a magnetic tape, and a nonvolatile memory. An SSD may be used.

The CPU 911 controls the overall system of the controller 400. Operation processing units of the CPU 911 include a display unit 912, an interpreting unit 913, and a calculation unit 914. The display unit 912 updates display of an augmented reality screen based on a picture of a camera of the head mounted display 910 and information saved in the storage device 915, and transmits a display command to the head mounted display 910.

The interpreting unit 913 controls operation on the augmented reality screen with the input device such as the operating piece 920. The interpreting unit 913 interprets operation details input by the operating piece 920, makes a request of the calculation unit 914 for necessary calculation, and makes a request of the display unit 912 to update display in accordance with the calculated result. The interpreting unit 913 controls the robot arm body 200 and the robot hand body 300 in accordance with the calculated result. The calculation unit 914 executes calculation processing related to drawing (described later) and the operation of the real machine in accordance with operation information input by the interpreting unit 913. The calculated result is saved in the storage device 915.

The storage device 915 stores display information of the operating handle 700 displayed on the simulation screen 600 that is a screen displayed in augmented reality. The information stored in the storage device 915 is output in response to a request from the CPU 911 or updated in response to a request from the CPU 911. In response to a request from an external apparatus or a specific operation on the operating piece 920, the CPU 911 is capable of transmitting the information saved in the storage device 915 from the interface 917 in form of the file 530. The CPU 911 is capable of reading the file 530 from the outside source via the interface 917 as needed.

For example, at start-up of the controller 400 or in restoration (recovery) processing, the CPU 911 reads the file 530 output in the past from an external apparatus (an external storage device, such as an SSD and a NAS). Then, the CPU 911 can reproduce a previous storage state by updating the storage device 915. In the present embodiment, a storage area of the storage device 915, storing the components, is selectable. For example, a predetermined area on the RAM 915b or a storage area (corresponding to, for example, a predetermined file) of the HDD 915c may be used. An example of the control system of the controller 400 to which the head mounted display 910 and the operating piece 920 are connected is as described above.

Figure 32:
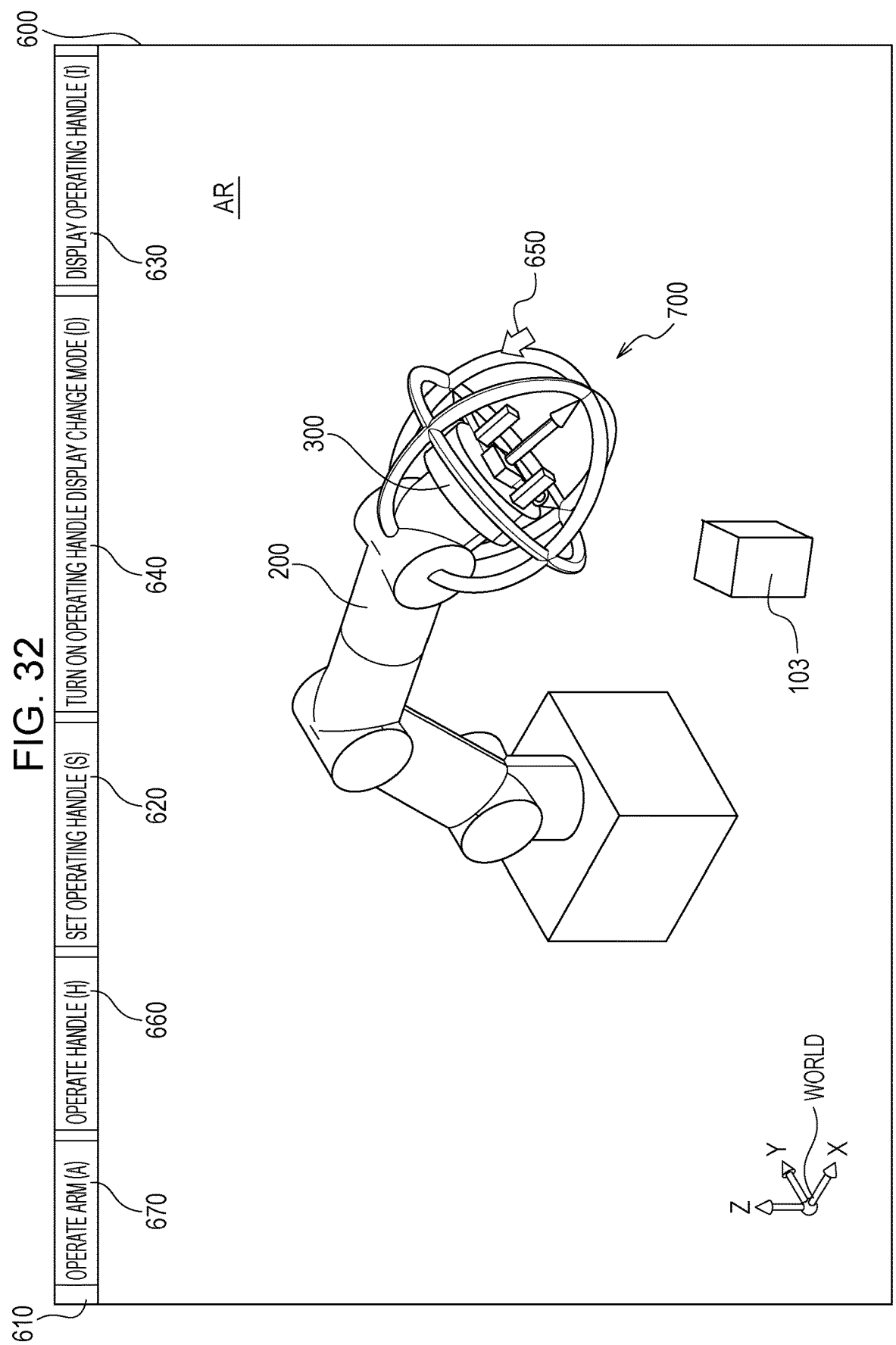
FIG. 32 is a diagram showing an example of the simulation screen according to the ninth embodiment.

FIG. 32 is a diagram illustrating the simulation screen 600 displayed on the head mounted display 910 according to the present embodiment. A picture acquired (filmed) by a camera installed in the head mounted display 910 is displayed on the head mounted display 910 as the augmented space AR, and the robot arm body 200, the robot hand body 300, and the workpiece W are displayed. Furthermore, the menu bar 610 is displayed as augmented reality, and the operating handle setting button 620, the operating handle display change mode button 640, a hand operating button 660, and an arm operating button 670 are displayed. The operating handle 700 and the cursor 650 are displayed in a superimposed manner as augmented reality in the augmented space AR in which the robot arm body 200 and the robot hand body 300 are displayed.

Figure 33:
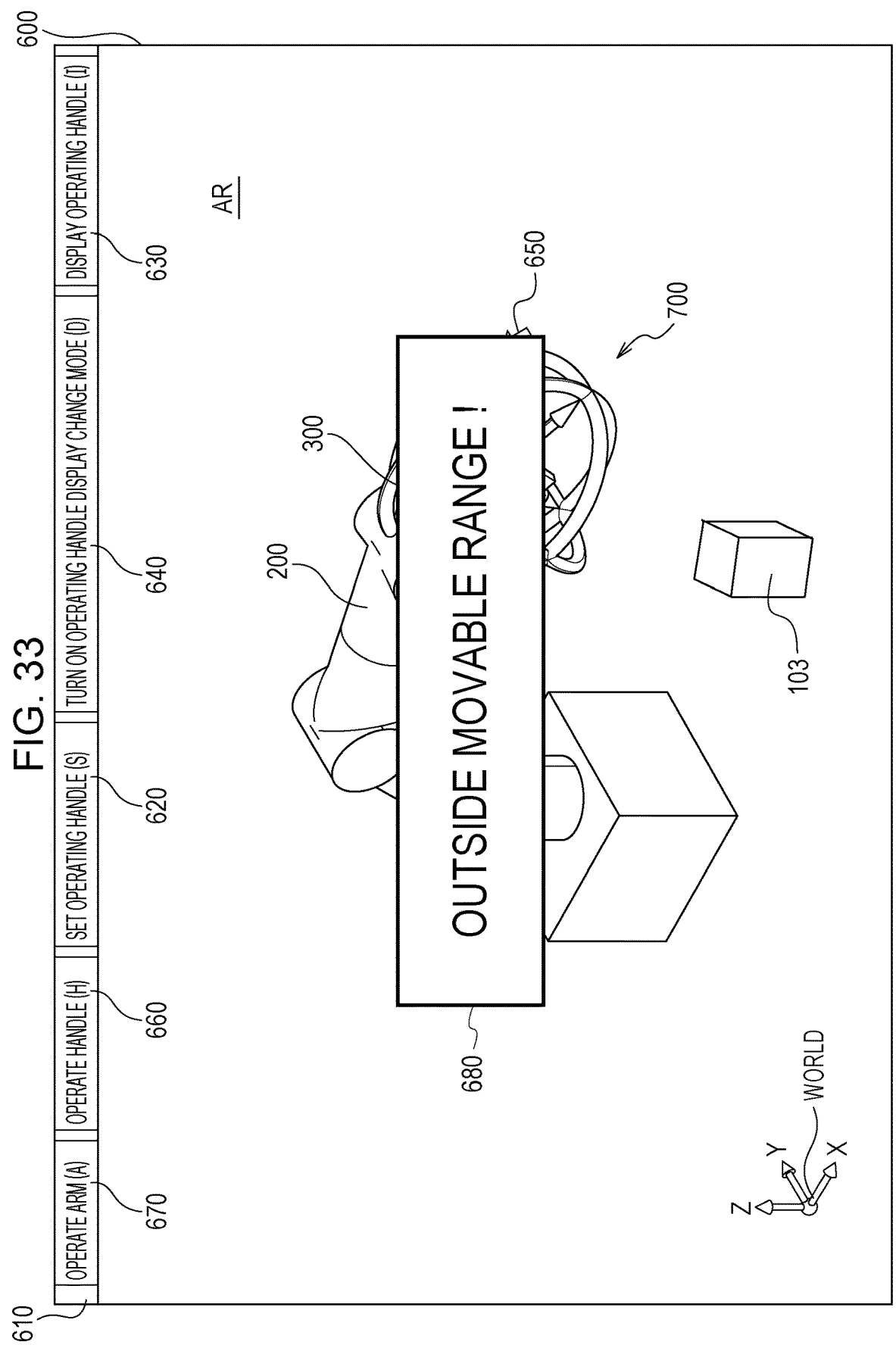
FIG. 33 is a diagram showing an example of the simulation screen according to the ninth embodiment.

The cursor 650 displayed as augmented reality can be operated by using the operating piece 920. The hand operating button 660 or the arm operating button 670 can be pressed down with the cursor 650. When the hand operating button 660 is pressed down, the orientation of the robot hand body 300 can be changed by operating the operating handle 700 with the cursor 650 in a state where the posture of the robot arm body 200 remains unchanged and the position of the robot hand body 300 is fixed. When the posture that cannot be taken by the robot hand body 300 is input by the operating handle 700 in accordance with the movable range of the robot arm body 200, a pop-up 680 is displayed as shown in FIG. 33. In the example shown in FIG. 33, "OUTSIDE MOVABLE RANGE!" is indicated in the pop-up 680 to warn the user. Then, the value input from the user is not output to the robot hand body 300 (the posture of the robot hand body 300 is maintained). Then, after the pop-up 680 is displayed for a predetermined time, the pop-up 680 is hidden, and operation with the operating handle 700 is accepted again.

When the arm operating button 670 is pressed down, the posture of the robot arm body 200 can be changed by operating the operating handle 700 with the cursor 650 such that the posture changed by the robot hand body 300 can be taken. In other words, it is possible to change the position and posture of the robot hand body 300, and the posture of the robot arm body 200 is changed following the changed position and posture of the robot hand body 300. When the posture that cannot be taken by the robot hand body 300 and the robot arm body 200 is input by the operating handle 700 in accordance with the movable range of the robot arm body 200, the pop-up 680 is displayed as shown in FIG. 33. In the example shown in FIG. 33, "OUTSIDE MOVABLE RANGE!" is indicated in the pop-up 680 to warn the user. Then, the value input from the user is not output to the robot arm body 200 and the robot hand body 300 (the posture of the robot arm body 200 and the robot hand body 300 is maintained). Then, after the pop-up 680 is displayed for a predetermined time, the pop-up 680 is hidden, and operation with the operating handle 700 is accepted again.

The pop-up 680 in the present embodiment indicates a state regarding the movable range of the robot arm body 200 and the robot hand body 300; however, the configuration is not limited thereto. The pop-up 680 may indicate, for example, a state regarding a singular point or a state regarding interference. When the robot arm body 200 and/or robot hand body 300 of the real machine is operated with the operating handle 700, the operating handle 700 may indicate outside movable range, singular point, or interference in multiple phases as described in the sixth embodiment.

When the operating handle setting button 620 is pressed down, the operating handle setting screen 800 is displayed on the head mounted display 910 as described in the first to third embodiments, and the display position, display magnification, or display in another area of the operating handle can be performed. When the operating handle display button 630 is pressed down, it is possible to change the show/hide state of the operating handle 700 as described in the fifth embodiment. When the operating handle display change mode button 640 is pressed down, it is possible to directly change the display position and display magnification of the operating handle 700 as described in the seventh embodiment.

Next, zoom operation of the operating handle 700 in a case of being displayed by augmented reality will be described in detail. When augmented reality is used, a procedure differs from that of the fourth embodiment. FIG. 34 is a control flowchart according to the present embodiment.

As shown in FIG. 34, initially, operation of the robot arm body 200 is started in step S71. The operation is started when the arm operating button 670 is pressed down. When the arm operating button 670 is pressed down, the operating handle 700 is displayed in the augmented space AR in step S72.

The operating handle 700 may be displayed at a position of TCP or may be displayed at a relative position that is a predetermined distance away from TCP as described in the first embodiment.

Subsequently, in step S73, the user wearing the head mounted display 910 approaches or moves away from the robot arm body 200. In step S74, zoom magnification is calculated (acquired) such that the display magnification of the operating handle 700 is constant even when the user approaches or moves away from the robot arm body 200. The zoom magnification acquired in step S74 is obtained by performing pattern matching of the virtual robot arm body 200V with the robot arm body 200 of the real machine and acquiring the display magnification of the virtual robot arm body 200V on display.

When, for example, the user moves away from the robot arm body 200 and the robot arm body 200 reduces (zooms out) by 30[%] with respect to the virtual robot arm body 200V, the display magnification is set to 333.33[%] according to the fourth embodiment. On the other hand, when the user approaches the robot arm body 200 and the robot arm body 200 enlarges (zooms in) by 300[%] with respect to the virtual robot arm body 200V, the display magnification is set to 33.33[%] according to the fourth embodiment. For pattern matching, a general technique is used, so the description thereof is omitted. In step S75, display of the operating handle 700 is updated in accordance with the display magnification set in step S74. In order to allow the user to set whether to maintain the display magnification, a set button or the like may be displayed on the simulation screen 600 or the operating handle setting screen 800.

The virtual robot arm body 200V and the virtual robot hand body 300V (not shown) may be displayed in a superimposed manner in the augmented space AR. In this case, the virtual robot arm body 200V and the virtual robot hand body 300V can be operated as a simulation before the robot arm body 200 and the robot hand body 300 of the real machine are operated.

According to the present embodiment, the simulation screen 600 is displayed on the head mounted display 910 by using augmented reality (AR), and the operating handle 700 is displayed. Thus, it is possible to intuitively operate the operating handle 700 while seeing the robot arm body 200 of the real machine, so operability is improved. The above-described various embodiments and modifications may be implemented in combination with the present embodiment and/or the present modification.

Other Embodiments

Procedures of the above-described embodiments are specifically executed by a CPU. Therefore, the CPU may be configured to read a recording medium, on which a program of software capable of executing the above-described functions is recorded, and run the program. In this case, the program itself read from the recording medium implements the functions of the above-described embodiments, and the program itself and the recording medium on which the program is recorded are components of the present disclosure.

In each of the embodiments, a case where a computer-readable recording medium is a ROM or a RAM or a flash ROM and a program is stored in the ROM or the RAM or the flash ROM has been described. However, the present disclosure is not limited to such modes. The program for carrying out the present disclosure may be recorded on any recording medium as long as the recording medium is a computer-readable recording medium.

In the above-described various embodiments, a case where an articulated robot arm in which the robot arm body 200 includes a plurality of joints is used has been described; however, the number of joints is not limited thereto. A vertical multi-axis configuration is described as a form of the robot arm. A configuration equivalent to the above can be implemented even with joints in a different form, such as a horizontal articulated type, a parallel link type, and an orthogonal robot.

The above-described various embodiments are applicable to machines capable of automatically performing extension and contraction, bending and stretching, up and down movements, right and left movements, or swing operation, or a combined operation of them in accordance with information of a storage device provided in a controller.

The present disclosure is not limited to the above-described embodiments and many modifications are applicable within the technical concept of the present disclosure. Advantageous effects described in the embodiments of the present disclosure are only the most favorable advantageous effects obtained from the present disclosure, and advantageous effects of the present disclosure are not limited to those described in the embodiments of the present disclosure. The above-described various embodiments and modifications may be implemented in combination.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-153926, filed Sep. 27, 2022, which is hereby incorporated by reference herein in its entirety.

What is claimed is:

1. An information processing apparatus that executes a simulation by using a virtual model, the information processing apparatus comprising a processing unit, wherein
the processing unit is configured to
display the virtual model and an operating portion on a display unit, the operating portion being used by a user to operate the virtual model, and
change a display magnification of the operating portion in response to input of the user.

2. The information processing apparatus according to claim 1, wherein
the setting information is a display condition on the operating portion at a time when the operating portion is displayed together with the virtual model.

3. The information processing apparatus according to claim 1, wherein
the processing unit is configured to
change a display position of the operating portion in response to input of the user.

4. The information processing apparatus according to claim 3, wherein
the processing unit is configured to
accept setting of a coordinate system at a time of changing the display position.

5. The information processing apparatus according to claim 1, wherein
the processing unit is configured to
when the virtual model is enlarged or reduced by input of the user, maintain a display magnification of the operating portion determined before the virtual model is enlarged or reduced.

6. The information processing apparatus according to claim 1, wherein
the virtual model includes a virtual robot, and
the processing unit is configured to
change a position or posture of the virtual robot by the user operating the operating portion.

7. The information processing apparatus according to claim 1, wherein
the processing unit is configured to
when the virtual model is in a certain state as a result of input of the user, change display of the operating portion to indicate that the virtual model is in the certain state.

8. The information processing apparatus according to claim 7, wherein
the operating portion is a first model displayed by arrows in three-axis directions, a second model to which the first model is connected, and a third model displayed by rings for rotations respectively around the arrows, and
the processing unit is configured to
change a display mode of the second model to indicate that the virtual model is in the certain state.

9. The information processing apparatus according to claim 8, wherein
the processing unit is configured to
identify the certain state by classifying the certain state into multiple phases, and
change the display mode among multiple colors or multiple patterns, according to the phases, to indicate that the virtual model is in the certain state.

10. The information processing apparatus according to claim 9, wherein
the phases include a first phase in which the virtual model is determined to be not in the certain state, a second phase in which the virtual model is determined to be approaching the certain state based on a threshold, and a third phase in which the virtual model is determined to be in the certain state, and
the processing unit is configured to
display the second model in a first color or a first pattern for the first phase, display the second model in a second color or a second pattern for the second phase, and display the second model in a third color or a third pattern for the third phase.

11. The information processing apparatus according to claim 7, wherein
the operating portion is made up of a first model represented by arrows in three-axis directions, a second model to which the first model is connected, and a third model represented by rings for rotations respectively around the arrows, and
the processing unit is configured to
change a shape of the second model to indicate that the virtual model is in the certain state.

12. The information processing apparatus according to claim 7, wherein
the virtual model is a virtual robot arm, and
the certain state includes at least one of a state where the virtual robot arm is a singular point, a state where the virtual robot arm is outside a movable range, and a state where the virtual robot arm interferes with another virtual model.

13. The information processing apparatus according to claim 7, wherein
the processing unit is configured to
change display of the operating portion as interlocking with operation of the virtual model by the user.

14. The information processing apparatus according to claim 1, wherein
the processing unit is configured to,
when the virtual model is in a certain state as a result of input of the user, display a second screen together with the operating portion and indicate in the second screen that the virtual model is in the certain state.

15. The information processing apparatus according to claim 1, wherein
the processing unit is configured to
execute a first mode in which the virtual model is operated with the operating portion and a second mode in which a display position or display magnification of the operating portion is changed.

16. The information processing apparatus according to claim 15, wherein
the processing unit is configured to
when, in the first mode, a virtual button to switch between the first mode and the second mode is operated or a predetermined input from an input device is input, execute the second mode.

17. The information processing apparatus according to claim 15, wherein
the processing unit is configured to
allow the user to directly change a display position or display magnification of the operating portion in the second mode.

18. The information processing apparatus according to claim 1, wherein
at least one of a PC, a teaching pendant, and a head mounted display is provided as the display unit.

19. A robot system comprising a robot of which an operation is set by information processing apparatus according to claim 1.

20. The information processing apparatus according to claim 1, wherein, even when the virtual model is enlarged or reduced by the user, the display magnification of the operating portion is maintained.

21. The information processing apparatus according to claim 1, wherein, the user is allowed to set whether or not to maintain the display magnification of the operating portion when the virtual model is enlarged or reduced by the user.

22. An information processing apparatus that executes a simulation by using a virtual model, the information processing apparatus comprising a processing unit, wherein
the processing unit is configured to
display the virtual model and an operating portion on a display unit, the operating portion being used by a user to operate the virtual model, and
display a new operating portion in an area different from an area in which the operating portion is displayed, in response to input of the user, the new operating portion being interlocked with the operating portion.

23. An information processing apparatus that executes a simulation by using a virtual model, the information processing apparatus comprising a processing unit, wherein
the processing unit is configured to
display the virtual model and an operating portion on a display unit, the operating portion being used by a user to operate the virtual model, and
display the virtual model in a semi-transparent mode in response to input of the user, the virtual model being an object to be operated with the operating portion.

24. An information processing method that executes a simulation by using a virtual model, the information processing method comprising:
displaying the virtual model and an operating portion on a display unit, the operating portion being used by a user to operate the virtual model; and
changing a display magnification of the operating portion in response to input of the user.

25. A non-transitory computer-readable recording medium storing a program capable of executing the information processing method according to claim 24.

26. An article manufacturing method comprising:
executing, as the simulation, a simulation of a robot in a real space corresponding to the virtual model by using the information processing method according to claim 24; and
based on a result of the simulation of the robot, operating a workpiece by using the robot in the real space to manufacture an article.

27. An information processing apparatus for operating a device and displaying a virtual model on a screen capturing the device with augmented reality, the information processing apparatus comprising a processing unit, wherein
the processing unit is configured to
display the screen on a display unit,
display an operating portion on the screen as the virtual model, the operating portion being used by a user to operate the device, and
change a display magnification of the operating portion in response to input of the user.

28. The information processing apparatus according to claim 27, wherein
the processing unit is configured to,
when the virtual model is enlarged or reduced as the user moves away from or approaches the device, maintain a display magnification of the operating portion before the device is enlarged or reduced.

29. An information processing method that operates a device and that displays a virtual model with augmented reality on a screen capturing the device, the information processing method comprising:
displaying the screen on a display unit;
displaying an operating portion on the screen as the virtual model, the operating portion being used by a user to operate the device; and
changing a display magnification of the operating portion in response to input of the user.

30. An information processing method that executes a simulation by using a virtual model, the information processing method comprising:
displaying the virtual model and an operating portion on a display unit, the operating portion being used by a user to operate the virtual model; and
displaying a new operating portion in an area different from an area in which the operating portion is displayed, in response to input of the user, the new operating portion being interlocked with the operating portion.

31. An information processing method that executes a simulation by using a virtual model, the information processing method comprising:
displaying the virtual model and an operating portion on a display unit, the operating portion being used by a user to operate the virtual model; and
displaying the virtual model in a semi-transparent mode in response to input of the user, the virtual model being an object to be operated with the operating portion.

* * * * *